(12) United States Patent
Takahashi et al.

(10) Patent No.: US 8,494,081 B2
(45) Date of Patent: Jul. 23, 2013

(54) TRANSMISSION DEVICE

(75) Inventors: Hiroshi Takahashi, Kanagawa (JP);
Toshiaki Ohnishi, Osaka (JP);
Kazuhiro Ando, Osaka (JP)

(73) Assignee: Panasonic Corporation, Osaka (JP)

( * ) Notice: Subject to any disclaimer, the term of this patent is extended or adjusted under 35 U.S.C. 154(b) by 825 days.

(21) Appl. No.: 12/704,771

(22) Filed: Feb. 12, 2010

(65) Prior Publication Data

US 2010/0202555 A1 Aug. 12, 2010

(30) Foreign Application Priority Data

Feb. 10, 2009 (JP) ................... 2009-028370

(51) Int. Cl.
*H03C 1/52* (2006.01)
*H04L 27/04* (2006.01)

(52) U.S. Cl.
USPC ............ 375/295; 375/300; 375/301; 375/320

(58) Field of Classification Search
USPC ................ 714/100, 1, 48, 52, 746, 798, 799, 714/800, 801; 375/219, 220, 222, 223, 240.22, 375/268–270, 284–285, 295, 300–301, 316, 375/320–321, 340–341, 242, 247, 253, 244, 375/245, 246, 271, 229–239, 240.26–240.29, 375/278, 259, 261, 296, 298, 315, 346–348, 375/353; 341/50, 51, 56, 63, 88, 89, 94, 173, 341/176, 143
See application file for complete search history.

(56) References Cited

U.S. PATENT DOCUMENTS

| 4,486,739 | A | 12/1984 | Franaszek et al. | |
|---|---|---|---|---|
| 2003/0011919 | A1* | 1/2003 | Vasic et al. | 360/39 |
| 2003/0152154 | A1* | 8/2003 | Johnson | 375/259 |
| 2004/0088633 | A1* | 5/2004 | Lida et al. | 714/752 |
| 2006/0139186 | A1 | 6/2006 | Hoyer | |
| 2008/0180287 | A1* | 7/2008 | Widmer | 341/95 |

FOREIGN PATENT DOCUMENTS

| JP | 59-10056 | 1/1984 |
|---|---|---|
| JP | 2008-526170 | 7/2008 |

* cited by examiner

*Primary Examiner* — Sam K Ahn
*Assistant Examiner* — Linda Wong
(74) *Attorney, Agent, or Firm* — Wenderoth, Lind & Ponack, L.L.P.

(57) ABSTRACT

The present invention aims to provide a transmission device that, in a communication system using multilevel modulation with $2^n$ levels (n being an integer greater than or equal to two), limits the run length to a predetermined value or less and guarantees DC balance.

The transmission device, which transmits data to which $2^n$ amplitude modulation has been applied, separates data for transmission into n data sequences; encodes one of the n data sequences to guarantee run length, thereby generating a converted data sequence; generates an intermediate data sequence by either inverting or not inverting a specific data sequence so that, based on candidate data, the next output voltage guarantees DC balance; and applies $2^n$ amplitude modulation to n-bit symbols each of which has a bit in the intermediate data sequence as a most significant bit and bits in the remaining data sequences, excluding the specific data sequence, as subsequent bits.

21 Claims, 25 Drawing Sheets

FIG.10

|                    | #1 | #2 | #3 | #4 |
|--------------------|----|----|----|----|
| Code word disparity | -2 | +8 | -4 | -4 |
| Cumulative disparity | -2 | +6 | +2 | -2 |

FIG.19

| | #1 | #2 | #3 | #4 |
|---|---|---|---|---|
| Code word disparity | 0 | +2 | -8 | +4 |
| Cumulative disparity | 0 | +2 | -6 | -2 |

TRANSMISSION DEVICE

The disclosure of Japanese Patent Application No. 2009-028370 filed Feb. 10, 2009 including specification, drawings and claims is incorporated herein by reference in its entirety.

BACKGROUND OF THE INVENTION (1) Field of the Invention

The present invention relates to a transmission device and transmission method that use a multilevel modulation system to transmit and receive data via a wire or wireless channel.

(2) Description of the Related Art

One type of encoder used in a transmission device that uses a two-level modulation system is the 8B/10B encoder disclosed in Patent Literature 1. For an eight-bit sequence that is input, the 8B/10B encoder limits the maximum number of identical consecutive values to a predetermined value or less (hereinafter, "guarantee the run length") and outputs a 10-bit encoded bit sequence for which the difference in the number of occurrences of two modulation conditions in a specified period of time is limited to a predetermined value or less (hereinafter, "guarantee the DC balance"). This 8B/10B encoder is used in communication systems starting with Ethernet™.

However, when the above 8B/10B encoding system is used with multilevel modulation that has more than two modulation conditions, e.g. when using four-level modulation, then the run length and the DC balance are not guaranteed. For example, an encoded bit sequence "0101010101", whose run length and DC balance are guaranteed in the case of two-level modulation, would in the case of four-level modulation be interpreted as containing the value "01" five times continuously, since one modulation condition is allocated every two bits. Therefore, neither the run length nor the DC balance would be guaranteed.

When the run length is not guaranteed, clock recovery in the reception circuit is not possible since a modulation change does not occur, and thus the problem occurs that demodulation in the reception device cannot be performed properly. Also, when DC balance is not guaranteed, the problem occurs that the identification level in the reception circuit changes due to DC offset, making correct judgment of data impossible, and therefore demodulation in the reception device cannot be performed properly. Another problem occurs in that the scale of the circuit grows larger, since a circuit to compensate for the DC offset becomes necessary in the reception device.

It is an object of the present invention to provide a transmission device, transmission method, and circuit that, in a communication system that uses multilevel modulation with $2^n$ levels (n being an integer greater than or equal to two), limit the run length to a predetermined value or less and guarantee DC balance.

Patent Literature 1

Japanese Patent Application Publication No. 59-10056

SUMMARY OF THE INVENTION

In order to fulfill the above-described object, the present invention is a transmission device for transmitting data to which $2^n$ level amplitude modulation has been applied (n being an integer greater than or equal to two), the transmission device comprising: a separation unit operable to separate a piece of data for transmission into n data sequences; a conversion unit operable to convert a data sequence from among the n data sequences by applying encoding processing to the data sequence so that a same value is continuous a predetermined number of times or less; an inversion control unit operable (i) to determine whether a new cumulative value approaches a standard value, the new cumulative value being calculated from (a) a cumulative value of disparities in output amplitude for one or more transmitted pieces of data up until a present time and (b) a total sum of disparities of a plurality of n-bit symbols of candidate data that includes the converted data sequence and remaining n−1 data sequences, and (ii) to obtain an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and a modulation unit operable to perform $2^n$ level amplitude modulation on n-bit symbols, each of which has a bit in the intermediate data sequence as the most significant bit and corresponding bits in the converted data sequence and the remaining n−1 data sequences, excluding the specific data sequence, as subsequent bits.

With the above-described structure, the transmission device converts one of n data sequences into a converted data sequence by applying encoding processing so that a same value is continuous a predetermined number of times or less. The transmission device then inverts or non-inverts a specific data sequence according to a determination as to whether or not an updated cumulative value approaches a standard value. Since an n-bit symbol to be amplitude modulated includes a bit in the specific data sequence as a most significant bit and always includes a bit in the converted data sequence, the run length of each symbol to be amplitude modulated is guaranteed. Also, by either inverting or non-inverting the specific data sequence in accordance with the determination as to whether the updated cumulative value approaches the standard value, the output amplitude approaches the standard value, which means that the output amplitude is not biased towards a particular value. In other words, the DC balance is also guaranteed for each symbol to be amplitude modulated. Accordingly, the transmission device can guarantee both run length and DC balance for $2^n$ level amplitude modulation.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 10 shows the code word disparity and cumulative disparity in the processing in FIG. 9;

FIG. 11 is a block diagram showing the structure of a transmission device 100a and a reception device 110a in a transmission/reception system 1a;

FIG. 12 is a block diagram showing the structure of an encoding unit 101a;

FIG. 13 is a block diagram showing the structure of a disparity control unit 305a;

FIG. 14 is a flowchart showing processing for data transmission in a transmission device 100a;

FIG. 19 shows the code word disparity and cumulative disparity in the processing in FIG. 18;

DESCRIPTION OF THE PREFERRED EMBODIMENTS

Figure 1:
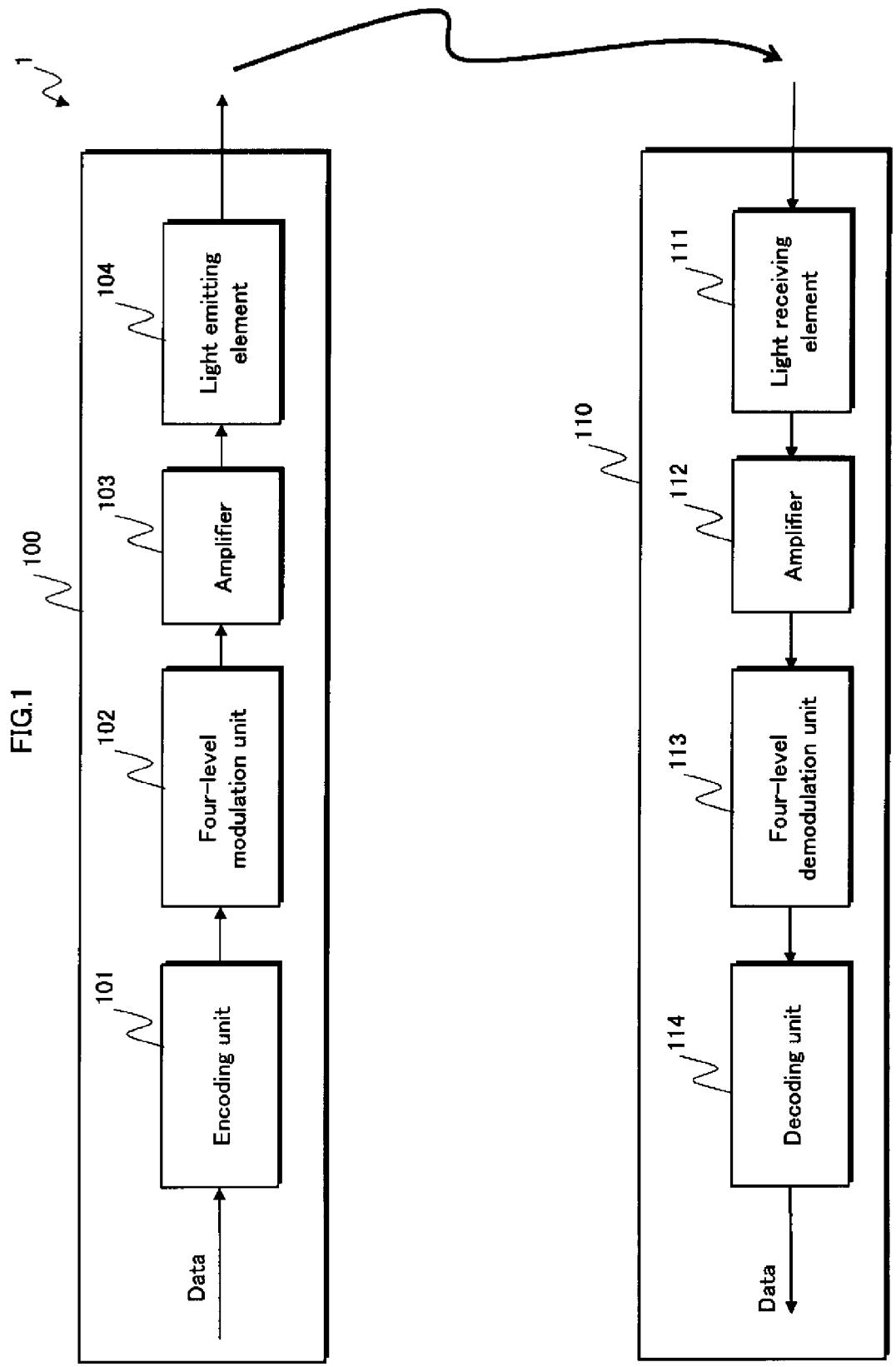
FIG. 1 is a block diagram showing the structure of a transmission device 100 and a reception device 110 in a transmission/reception system 1.

A first transmission device, one embodiment of the present invention, is a transmission device for transmitting data to which $2^n$ level amplitude modulation has been applied (n being an integer greater than or equal to two), the transmission device comprising: a separation unit operable to separate a piece of data for transmission into n data sequences; a conversion unit operable to convert a data sequence from among the n data sequences by applying encoding processing to the data sequence so that a same value is continuous a predetermined number of times or less; an inversion control unit operable (i) to determine whether a new cumulative value approaches a standard value, the new cumulative value being calculated from (a) a cumulative value of disparities in output amplitude for one or more transmitted pieces of data up until a present time and (b) a total sum of disparities of a plurality of n-bit symbols of candidate data that includes the converted data sequence and remaining n−1 data sequences, and (ii) to obtain an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and a modulation unit operable to perform $2^n$ level amplitude modulation on n-bit symbols, each of which has a bit in the intermediate data sequence as the most significant bit and corresponding bits in the converted data sequence and the remaining n−1 data sequences, excluding the specific data sequence, as subsequent bits.

With the above-described structure, the first transmission device converts one of n data sequences into a converted data sequence by applying encoding processing so that a same value is continuous a predetermined number of times or less. The first transmission device then inverts or non-inverts a specific data sequence according to a determination as to whether or not an updated cumulative value approaches a standard value. Since an n-bit symbol to be amplitude modulated includes a bit in the specific data sequence as a most significant bit and always includes a bit in the converted data sequence, the run length of each symbol to be amplitude modulated is guaranteed. Also, by either inverting or non-inverting the specific data sequence in accordance with the determination as to whether the updated cumulative value approaches the standard value, the output amplitude approaches the standard value, which means that the output amplitude is not biased towards a particular value. In other words, the DC balance is also guaranteed for each symbol to be amplitude modulated. Accordingly, the first transmission device can guarantee both run length and DC balance for $2^n$ level amplitude modulation.

A second transmission device, one embodiment of the present invention, is the first transmission device further comprising: an attachment unit operable to generate a first attached data sequence by attaching, to one data sequence among n−1 unprocessed data sequences, a first control data sequence indicating non-inversion of the converted data sequence, and to generate a second attached data sequence by attaching, to the one data sequence, a second control data sequence indicating inversion of the converted data sequence, wherein the specific data sequence is the converted data sequence, the inversion control unit generates the candidate data so as to include the first attached data sequence, n−2 unprocessed data sequences, and the converted data sequence, and generates separate candidate data, which includes the second attached data sequence, the n−2 unprocessed data sequences, and an inverted data sequence which is an inversion of the converted data sequence, calculates a first new cumulative value from the cumulative value and a total sum of disparities of the candidate data and calculates a second new cumulative value from the cumulative value and a total sum of disparities of the separate candidate data, and compares the first new cumulative value and the second new cumulative value to determine if the first new cumulative value approaches the standard value and obtains the intermediate data sequence by inverting the converted data sequence when the determination is negative and not inverting the converted data sequence when the determination is positive, and the modulation unit performs $2^n$ level amplitude modulation on n-bit symbols, each of which includes a bit in the intermediate data sequence and corresponding bits in one of the first and second attached data sequences, in accordance with inversion or non-inversion of the converted data sequence, and in the n−2 unprocessed data sequences.

With the above-described structure, the second transmission device applies control to invert or non-invert the converted data sequence by determining which of the first and second updated cumulative values approaches the standard value. In this way, the same value is guaranteed to be continuous a predetermined number of times or less for the data sequence after it has been inverted or non-inverted. Accordingly, the second transmission device can guarantee both run length and DC balance for $2^n$ level amplitude modulation.

A third transmission device, one embodiment of the present invention, is the second transmission device wherein the value of n is two, the separation unit separates the piece of data for transmission into a first data sequence and a second data sequence, the conversion unit applies the encoding processing to the first data sequence to generate the converted data sequence, the attachment unit uses the second data sequence to generate the first attached data sequence and the second attached data sequence, the inversion control unit generates the candidate data so as to include the converted data sequence and the first attached data sequence and generates the separate candidate data so as to include the inverted data sequence and the second attached data sequence, and the modulation unit performs 2^2 level amplitude modulation on one or more two-bit symbols each having one bit from the intermediate data sequence and another bit, with a same position as the one bit, from the first attached data sequence when the first new cumulative value is determined to approach the standard value and from the second attached data sequence when the first new cumulative value is determined not to approach the standard value.

With the above-described structure, the third transmission device can guarantee both run length and DC balance for four-level amplitude modulation.

A fourth transmission device, one embodiment of the present invention, is the third transmission device wherein the encoding processing uses 8B/10B encoding, the piece of data for transmission is 16 bits, the first and second data sequences are each eight bits, and the first and second control data sequences are each two bits.

With the above-described structure, the fourth transmission device can perform four-level amplitude modulation that uses an 8B/10B encoding scheme and guarantees the run length and the DC balance.

A fifth transmission device, one embodiment of the present invention, is the fourth transmission device wherein the inversion control unit generates the candidate data so as to comprise 10 two-bit symbols, each having a converted bit from the converted data sequence and a bit in the first attached data sequence that has a same position as the converted bit, and generates the separate candidate data to comprise 10 two-bit symbols, each having an inverted bit from the inverted data sequence and a bit in the second attached data sequence that has a same position as the converted bit, calculates a first total disparity indicating a total of disparities for each of the 10 two-bit symbols in the candidate data and a second total disparity indicating a total of disparities for each of the 10 two-bit symbols in the separate candidate data, calculates the first new cumulative total from the cumulative value and the first total disparity and the second new cumulative total from the cumulative value and the second total disparity, and determines that the first new cumulative value approaches the standard value when an absolute value of the first new cumulative value is smaller than an absolute value of the second new cumulative value, otherwise determining that the first new cumulative value does not approach the standard value.

With the above-described structure, the fifth transmission device can perform encoding so that the output amplitude is not biased towards a particular value by using a first and second updated cumulative value.

A sixth transmission device, one embodiment of the present invention, is the fifth transmission device further comprising: a generation unit operable to generate data for modulation by connecting, in order of a position of structural bits in the intermediate data sequence, 10 two-bit symbols that each include a structural bit from the intermediate data sequence and a bit, with a same position as the structural bit, from the first attached data sequence when the first new cumulative value is determined to approach the standard value and from the second attached data sequence when the first new cumulative value is determined not to approach the standard value, wherein the modulation unit obtains the two-bit symbols by dividing the data for modulation every two bits in order from a top and performs 2^2 level amplitude modulation on the obtained symbols in order.

With the above-described structure, the sixth transmission device can consistently generate data for modulation that does not produce a bias towards the output amplitude up until the present.

A seventh transmission device, one embodiment of the present invention, is the sixth transmission device wherein two-bit symbols in the candidate data have, in a most significant bit thereof, a bit included in the converted data sequence, and in a least significant bit thereof, a bit included in the first attached data sequence, two-bit symbols in the separate candidate data have, in a most significant bit thereof, a bit included in the converted data sequence that has been inverted, and in a least significant bit thereof, a bit included in the second attached data sequence, two-bit symbols in the data for modulation have, in a most significant bit thereof, the structural bit from the intermediate data sequence, and in a least significant bit thereof, a bit included in an attached data sequence in accordance with inversion or non-inversion in the inversion control unit, and the modulation unit performs control so that an amplitude exceeds the standard value by an amount corresponding to a value of the least significant bit when the most significant bit is 1, and an amplitude falls below the standard value by an amount corresponding to the value of the least significant bit when the most significant bit is 0.

With the above-described structure, the seventh transmission device includes a structural bit from the intermediate data sequence in a most significant bit of each of 10 two-bit symbols constituting a data sequence to be modulated and a bit in the attached bit sequence, inverted or non-inverted by the inversion control unit, in a least significant bit. Therefore, the direction of the bias (i.e. exceeding or falling below the standard value) in the output amplitude up until the present and the direction of the bias of the current output amplitude are always opposite. In this way, DC balance is consistently guaranteed.

An eighth transmission device, one embodiment of the present invention, is the sixth transmission device wherein the inversion control unit stores the cumulative value, updates the cumulative value by adding the first total disparity to the cumulative value when the converted data sequence is not inverted, and updates the cumulative value by adding the second total disparity to the cumulative value when the converted data sequence is inverted.

With the above-described structure, the eighth transmission device can store the degree of bias in output amplitude for transmitted data, and therefore when transmitting the next piece of data, the eighth transmission device can consistently determine the degree of bias in output amplitude for the next piece of data.

A ninth transmission device, one embodiment of the present invention, is the first transmission device further comprising an attachment unit operable to generate an attached data sequence by attaching, to one data sequence among n−1 data sequences unprocessed by the conversion unit, a control data sequence indicating non-inversion of the converted data sequence, wherein the specific data sequence is the attached data sequence, the inversion control unit does not invert the attached data sequence when the new cumulative value, calculated from the cumulative value and a total sum of disparities of the candidate data that includes the converted data sequence, the attached data sequence and n−2 unprocessed data sequences, is determined to approach the standard value, otherwise inverting the attached data sequence, thereby obtaining the intermediate data sequence, and the modulation unit performs $2^n$ level amplitude modulation on n-bit symbols, each of which includes a bit in the intermediate data sequence and corresponding bits in the converted data sequence and in the n−2 unprocessed data sequences.

With the above-described structure, the ninth transmission device converts one of n data sequences into a converted data sequence by applying encoding processing so that a same value is continuous a predetermined number of times or less. The ninth transmission device then inverts or non-inverts an attached data sequence according to a determination as to whether or not an updated cumulative value approaches a standard value. As a result, the same value is guaranteed to be continuous a predetermined number of times or less for the data sequence after it has been inverted or non-inverted. Accordingly, the ninth transmission device can guarantee both run length and DC balance for $2^n$ level amplitude modulation.

A $10^{th}$ transmission device, one embodiment of the present invention, is the ninth transmission device wherein the value of n is two, the separation unit separates the piece of data for transmission into a first data sequence and a second data sequence, the conversion unit applies the encoding processing to the first data sequence to generate the converted data sequence, the attachment unit attaches the control data sequence to the second data sequence to generate the attached data sequence, and the modulation unit performs $2^2$ level amplitude modulation on one or more two-bit symbols each having one bit from the intermediate data sequence and another bit, with a same position as the one bit, from the converted data sequence.

With the above-described structure, the $10^{th}$ transmission device can guarantee both run length and DC balance for four-level amplitude modulation.

An $11^{th}$ transmission device, one embodiment of the present invention, is the $10^{th}$ transmission device wherein the encoding processing uses 8B/10B encoding, the piece of data for transmission is 16 bits, the first and second data sequences are each eight bits, and the control data sequence is two bits.

With the above-described structure, the $11^{th}$ transmission device can perform four-level amplitude modulation that uses an 8B/10B encoding scheme and guarantees the run length and the DC balance.

A $12^{th}$ transmission device, one embodiment of the present invention, is the $11^{th}$ transmission device wherein the inversion control unit generates the candidate data so as to comprise 10 two-bit symbols, each having a converted bit from the converted data sequence and a bit in the attached data sequence that has a same position as the converted bit, calculates a total disparity indicating a total of disparities for each of the 10 two-bit symbols in the candidate data, calculates a candidate cumulative value indicating the result of multiplying the cumulative value by the total disparity, and determines that the new cumulative value does not approach the standard value when the candidate cumulative value is larger than zero, otherwise determining that the new cumulative value approaches the standard value.

With the above-described structure, the $12^{th}$ transmission device can determine whether or not the updated cumulative value approaches the standard value by using a candidate cumulative value.

A $13^{th}$ transmission device, one embodiment of the present invention, is the $12^{th}$ transmission device further comprising: a generation unit operable to generate data for modulation by connecting, in order of a position of structural bits in the intermediate data sequence, 10 two-bit symbols that each include a structural bit from the intermediate data sequence and a bit, with a same position as the structural bit, from the converted data sequence, wherein the modulation unit obtains the two-bit symbols by dividing the data for modulation every two bits in order from a top and performs $2^2$ level amplitude modulation on the obtained symbols in order.

With the above-described structure, the $13^{th}$ transmission device can consistently generate data for modulation that does not produce a bias towards the output amplitude up until the present.

A $14^{th}$ transmission device, one embodiment of the present invention, is the $13^{th}$ transmission device wherein the inversion control unit stores the cumulative value, updates the cumulative value by subtracting the total disparity from the cumulative value when the attached data sequence is inverted, and updates the cumulative value by adding the total disparity to the cumulative value when the attached data sequence is not inverted.

With the above-described structure, the $14^{th}$ transmission device can store the degree of bias in output amplitude for transmitted data, and therefore when transmitting the next piece of data, the $14^{th}$ transmission device can consistently determine the degree of bias in output amplitude for the next piece of data.

A $15^{th}$ transmission device, one embodiment of the present invention, is the first transmission device further comprising an attachment unit operable to generate an attached data sequence by attaching, to the converted data sequence, a control data sequence indicating non-inversion of the converted data sequence, wherein the specific data sequence is the attached data sequence, the inversion control unit does not invert the attached data sequence when the new cumulative value, calculated from the cumulative value and a total sum of disparities of the candidate data that includes the attached data sequence and n−1 unprocessed data sequences, is determined to approach the standard value, otherwise inverting the attached data sequence, thereby obtaining the intermediate data sequence, and the modulation unit performs $2^n$ level amplitude modulation on n-bit symbols, each of which includes a bit in the intermediate data sequence and corresponding bits in the n−1 unprocessed data sequences.

With the above-described structure, the $15^{th}$ transmission device converts one of n data sequences into a converted data sequence by applying encoding processing so that a same value is continuous a predetermined number of times or less and then generates an attached data sequence from the converted data sequence. The $15^{th}$ transmission device also then inverts or non-inverts the attached data sequence according to a determination as to whether or not an updated cumulative value approaches a standard value. As a result, the same value is guaranteed to be continuous a predetermined number of times or less for the data sequence after it has been inverted or non-inverted. Accordingly, the $15^{th}$ transmission device can guarantee both run length and DC balance for $2^n$ level amplitude modulation.

A $16^{th}$ transmission device, one embodiment of the present invention, is the $15^{th}$ transmission device wherein the value of n is two, the separation unit separates the piece of data for transmission into a first data sequence and a second data sequence, the conversion unit applies the encoding processing to the first data sequence to generate the converted data sequence, and the modulation unit performs $2^2$ level amplitude modulation on one or more two-bit symbols each having one bit from the intermediate data sequence and another bit, with a same position as the one bit, from the second data sequence.

With the above-described structure, the 16$^{th}$ transmission device can guarantee both run length and DC balance for four-level amplitude modulation.

A 17$^{th}$ transmission device, one embodiment of the present invention, is the 16$^{th}$ transmission device wherein the encoding processing uses 8B/10B encoding, the piece of data for transmission is 20 bits, the first data sequence is eight bits, the second data sequence is 12 bits, and the control data sequence is two bits.

With the above-described structure, the 17$^{th}$ transmission device can perform four-level amplitude modulation that uses an 8B/10B encoding scheme and guarantees the run length and the DC balance.

An 18$^{th}$ transmission device, one embodiment of the present invention, is the 17$^{th}$ transmission device wherein the inversion control unit generates the candidate data so as to comprise 12 two-bit symbols, each having a bit from the attached data sequence and a bit in the second data sequence corresponding to a position of the bit in the attached data sequence, calculates a total disparity indicating a total of disparities for each of the 12 two-bit symbols in the candidate data, calculates a candidate cumulative value indicating the result of multiplying the cumulative value by the total disparity, and determines that the new cumulative value does not approach the standard value when the candidate cumulative value is larger than zero, otherwise determining that the new cumulative value approaches the standard value.

With the above-described structure, the 18$^{th}$ transmission device can determine whether or not the updated cumulative value approaches the standard value by using a candidate cumulative value.

A 19$^{th}$ transmission device, one embodiment of the present invention, is the 18$^{th}$ transmission device further comprising: a generation unit operable to generate data for modulation by connecting, in order of a position of structural bits in the intermediate data sequence, 12 two-bit symbols that each include a structural bit from the intermediate data sequence and a bit, with a same position as the structural bit, from the second data sequence, wherein the modulation unit obtains the two-bit symbols by dividing the data for modulation every two bits in order from a top and performs 2^2 level amplitude modulation on the obtained symbols in order.

With the above-described structure, the 19$^{th}$ transmission device can consistently generate data for modulation that does not produce a bias towards the output amplitude up until the present.

A 20$^{th}$ transmission device, one embodiment of the present invention, is a transmission method used in a transmission device for transmitting data to which 2^n level amplitude modulation has been applied (n being an integer greater than or equal to two), the transmission method comprising the steps of: separating a piece of data for transmission into n data sequences; converting a data sequence from among the n data sequences by applying encoding processing to the data sequence so that a same value is continuous a predetermined number of times or less; determining whether a new cumulative value approaches a standard value, the new cumulative value being calculated from (a) a cumulative value of disparities in output amplitude for one or more transmitted pieces of data up until a present time and (b) a total sum of disparities of a plurality of n-bit symbols of candidate data that includes the converted data sequence and remaining n−1 data sequences, and obtaining an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and performing 2^n level amplitude modulation on n-bit symbols, each of which has a bit in the intermediate data sequence as the most significant bit and corresponding bits in the converted data sequence and the remaining n−1 data sequences, excluding the specific data sequence, as subsequent bits.

In this way, the transmission method converts one of n data sequences into a converted data sequence by applying encoding processing so that a same value is continuous a predetermined number of times or less. The transmission method then inverts or non-inverts a specific data sequence according to a determination as to whether or not an updated cumulative value approaches a standard value. Since an n-bit symbol to be amplitude modulated includes a bit in the specific data sequence as a most significant bit and always includes a bit in the converted data sequence, the run length of each symbol to be amplitude modulated is guaranteed. Also, by either inverting or non-inverting the specific data sequence in accordance with the determination as to whether the updated cumulative value approaches the standard value, the output amplitude approaches the standard value, which means that the output amplitude is not biased towards a particular value. In other words, the DC balance is also guaranteed for each symbol to be amplitude modulated. Accordingly, the transmission method can guarantee both run length and DC balance for 2^n level amplitude modulation.

A 21$^{st}$ transmission device, one embodiment of the present invention, is an integrated circuit used in a transmission device for transmitting data to which 2^n level amplitude modulation has been applied (n being an integer greater than or equal to two), the integrated circuit comprising: a separation unit operable to separate a piece of data for transmission into n data sequences; a conversion unit operable to convert a data sequence from among the n data sequences by applying encoding processing to the data sequence so that a same value is continuous a predetermined number of times or less; an inversion control unit operable (i) to determine whether a new cumulative value approaches a standard value, the new cumulative value being calculated from (a) a cumulative value of disparities in output amplitude for one or more transmitted pieces of data up until a present time and (b) a total sum of disparities of a plurality of n-bit symbols of candidate data that includes the converted data sequence and remaining n−1 data sequences, and (ii) to obtain an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and a modulation unit operable to perform 2^n level amplitude modulation on n-bit symbols, each of which has a bit in the intermediate data sequence as the most significant bit and corresponding bits in the converted data sequence and the remaining n−1 data sequences, excluding the specific data sequence, as subsequent bits.

In this way, the integrated circuit converts one of n data sequences into a converted data sequence by applying encoding processing so that a same value is continuous a predetermined number of times or less. The integrated circuit then inverts or non-inverts a specific data sequence according to a determination as to whether or not an updated cumulative value approaches a standard value. Since an n-bit symbol to be amplitude modulated includes a bit in the specific data sequence as a most significant bit and always includes a bit in the converted data sequence, the run length of each symbol to be amplitude modulated is guaranteed. Also, by either inverting or non-inverting the specific data sequence in accordance with the determination as to whether the updated cumulative value approaches the standard value, the output amplitude approaches the standard value, which means that the output amplitude is not biased towards a particular value. In other words, the DC balance is also guaranteed for each symbol to be amplitude modulated. Accordingly, the integrated circuit can guarantee both run length and DC balance for $2^n$ level amplitude modulation.

1. Embodiment 1

The following describes Embodiment 1 of the present invention with reference to the figures.

1.1. Outline of Transmission/Reception System 1

The following is an outline of the transmission/reception system 1, which includes a transmission device according to the present invention.

As shown in FIG. 1, the transmission/reception system 1 is composed of a transmission device 100 and a reception device 110.

The transmission device 100 applies encoding and either two-level ($2^1$) or four-level ($2^2$) amplitude modulation to input data that is to be transmitted, thereafter transmitting the data to the reception device 110.

Figure 2:
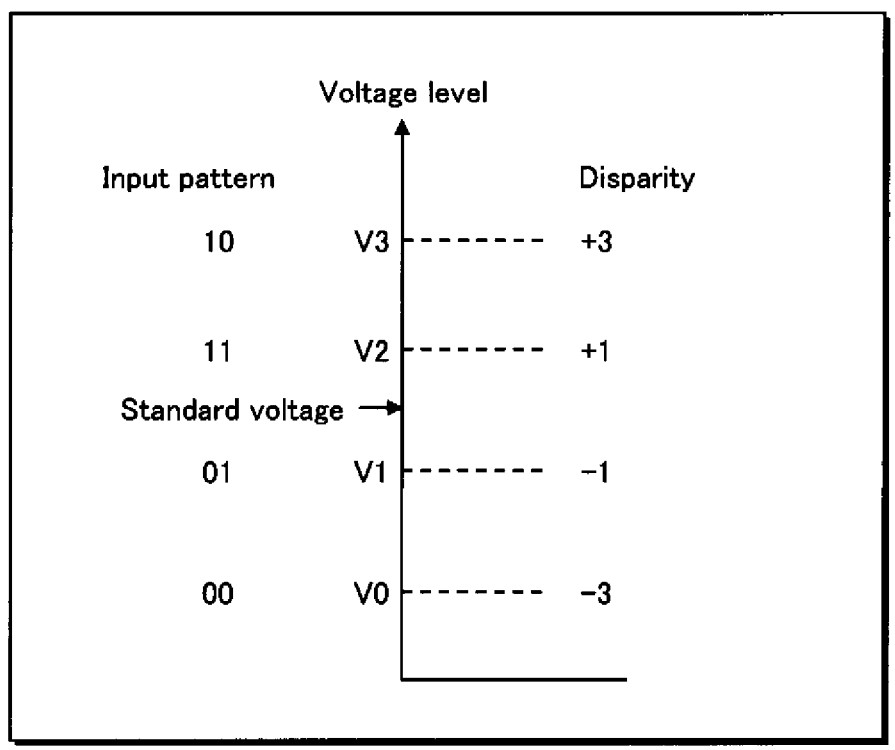
FIG. 2 shows an example of signal mapping when four-level amplitude modulation is performed.

In Embodiment 1, four-level Amplitude Shift Keying (ASK) modulation is used for four-level amplitude modulation. FIG. 2 shows an example of mapping when using four-level ASK modulation. FIG. 2 shows voltage levels (V0, V1, V2, V3) and disparities (−3, −1, +1, +3) corresponding to input patterns (the values "00", "01", "10", "11"). Here, disparity refers to the difference between each voltage level and the standard voltage level (mean voltage level) when each input pattern is input equally.

The reception device 110 receives and demodulates the optical signal transmitted by the transmission device 100.

In this description, the operator ^ refers to exponentiation. For example, when x is greater than 0, A^x indicates A raised to the power of x.

Before actual transmission of data that is to be transmitted, both the transmission device 100 and reception device 110 transmit and receive, as an initialization process, data to establish communication. Specifically, the transmission device 100 transmits request data, which requests communication, to the reception device 110. Upon receiving the request data, the reception device 110 transmits response data, which indicates a response, to the transmission device 100. Furthermore, in accordance with the received power when the request data was received, the reception device 110 transmits modulation designation data, which designates either two-level or four-level amplitude modulation, to the transmission device 100. The transmission device 100 modulates the data to be transmitted according to the amplitude modulation designated by the modulation designation data which it receives.

The following first describes the operations of both the transmission device 100 and the reception device 110 after four-level amplitude modulation is designated by the modulation designation data.

1.2 Structure of the Transmission Device 100

As shown in FIG. 1, the transmission device 100 includes an encoding unit 101, four-level modulation unit 102, amplifier 103, and light emitting element 104.

(1) Encoding Unit 101

The encoding unit 101 encodes an input 2 m bit data sequence that is to be transmitted (m being an integer), thus generating an encoded data sequence C. It then outputs the encoded data sequence C to the four-level modulation unit 102. In Embodiment 1, m is eight, and a 16-bit data sequence is input into the encoding unit 101.

Figure 3:
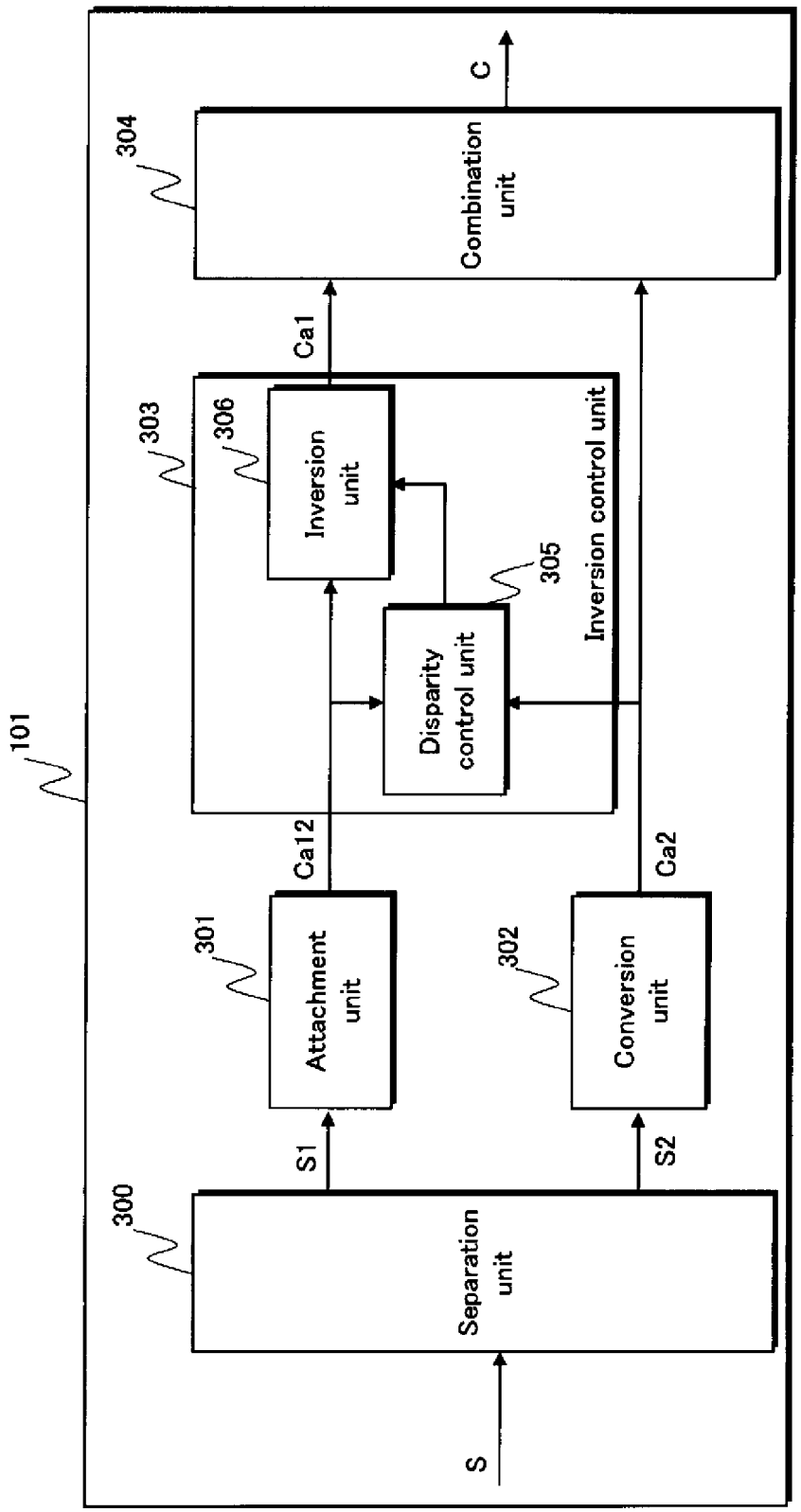
FIG. 3 is a block diagram showing the structure of an encoding unit 101.

As shown in FIG. 3, the encoding unit 101 includes a separation unit 300, attachment unit 301, conversion unit 302, inversion control unit 303, and combination unit 304. As also shown in FIG. 3, the inversion control unit 303 includes a disparity control unit 305 and an inversion unit 306.

When the modulation designation data from the reception device 110 indicates four-level amplitude modulation, operations of the separation unit 300, attachment unit 301, conversion unit 302, inversion control unit 303, and combination unit 304 are all controlled.

(1-1) Separation Unit 300

The 16-bit transmission data sequence S input into the encoding unit 101 is input into the separation unit 300. The separation unit 300 separates the input 16-bit transmission data sequence S (=[S(0), S(1), ..., S(k), ..., S(15)]) into an eight-bit data sequence S1 composed of even-numbered-bits (=[S(0), S(2), ..., S(2k), ..., S(14)]) and an eight-bit data sequence S2 composed of odd-numbered bits (=[S(1), S(3), ..., S(2k−1), ..., S(15)]). The separation unit 300 then outputs the data sequence S1 to the attachment unit 301 and outputs the data sequence S2 to the conversion unit 302.

(1-2) Attachment Unit 301

The attachment unit 301 attaches two control bits "0", "1" to the top of the data sequence S1 input from the separation unit 300, thus generating a 10-bit data sequence Ca12 (=[0, 1, S(0), S(2), ..., S(2k), ..., S(14)]). The attachment unit 301 then outputs the generated 10-bit data sequence Ca12 to the disparity control unit 305 and the inversion unit 306 in the inversion control unit 303.

(1-3) Conversion Unit 302

The conversion unit 302 encodes the data sequence S2 input from the separation unit 300 using an encoding scheme that limits the run length to a predetermined value or less. The 8B/10B encoding scheme is generally known as an encoding scheme that limits the run length to a predetermined value or less (Patent Literature 1). In Embodiment 1, the conversion unit 302 uses this 8B/10B encoding scheme to encode the data sequence S2.

By encoding the data sequence S2 using the 8B/10B encoding scheme, the conversion unit 302 generates a 10-bit data sequence Ca2 (=[Ca(0), Ca(1), ..., Ca(9)]) and outputs the generated data sequence Ca2 to the disparity control unit 305 and the combination unit 304.

(1-4) Inversion Control Unit 303

In order to guarantee DC balance, the inversion control unit 303 performs either inversion or non-inversion on the input data sequence Ca12. In this description, inversion refers to converting an input value of "0" to "1" and an input value of "1" to "0" for all bits in a data sequence. On the other hand, non-inversion refers to outputting, as is, the value input for all bits in the data sequence.

The disparity control unit 305 in the inversion control unit 303 determines whether to invert or non-invert the data sequence Ca12. In accordance with the determination results from the disparity control unit 305, the inversion unit 306 then performs either inversion or non-inversion on the data sequence Ca12.

The following is a description of the disparity control unit 305 and the inversion unit 306.

(1-4-1) Disparity Control Unit 305

In accordance with the input data sequence Ca12 and data sequence Ca2, the disparity control unit 305 determines whether to invert or non-invert the data sequence Ca12, and in accordance with the determination results generates inversion control information. The disparity control unit 305 then outputs the generated inversion control information to the inversion unit 306.

Figure 4:
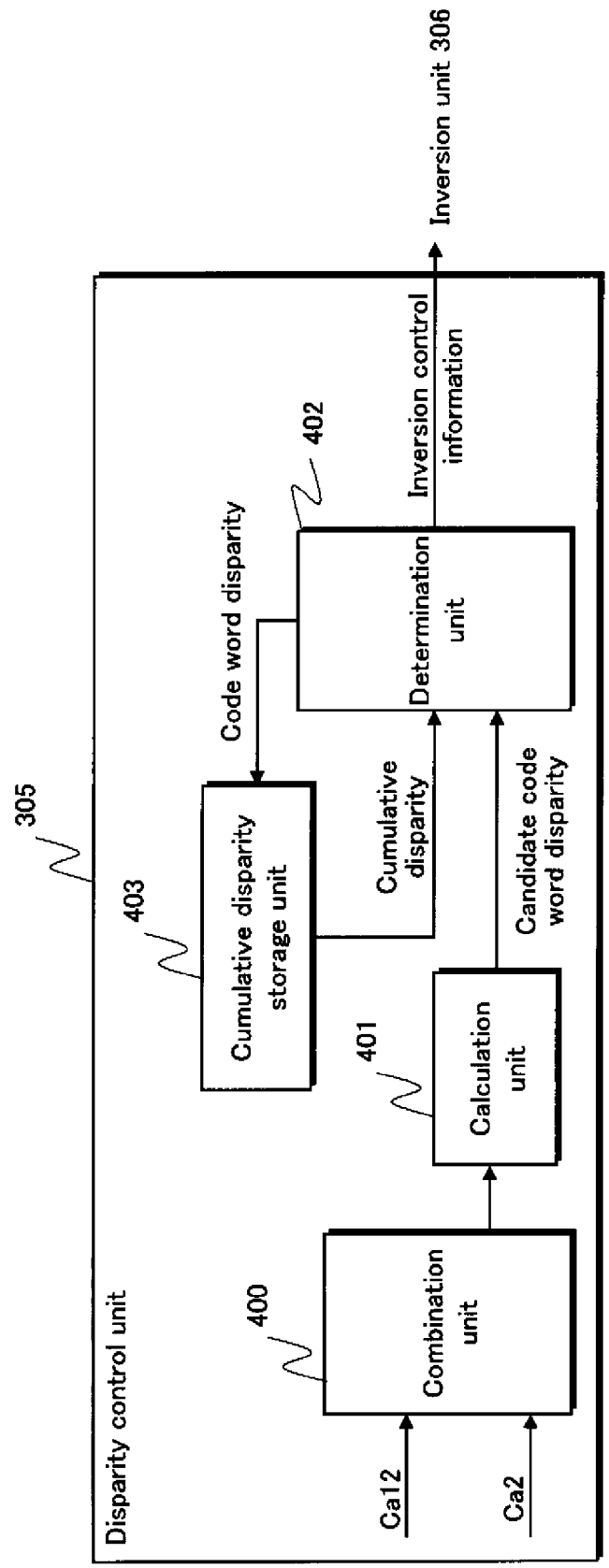
FIG. 4 is a block diagram showing the structure of a disparity control unit 305.

As shown in FIG. 4, the disparity control unit 305 includes a combination unit 400, calculation unit 401, determination unit 402, and cumulative disparity storage unit 403.

(Cumulative Disparity Storage Unit 403)

The cumulative disparity storage unit 403 stores a cumulative disparity, which is the cumulative value of the disparities for data transmitted up until the present moment. Note that at the start of transmission, the value of the cumulative disparity in the cumulative disparity storage unit 403 is set to an initial value of 0 during processing to initialize communication.

(Combination Unit 400)

By alternately combining the data sequence Ca12 (=[0, 1, $S(0), S(2), \ldots, S(2k), \ldots, S(14)$]) input from the attachment unit 301 and the data sequence Ca2 (=[Ca2(0), Ca2(1), ..., Ca2(9)]) input from the conversion unit 302, the combination unit 400 generates a 20-bit data sequence Co (=[0, Ca2(0), 1, Ca2(1), S(0), Ca2(2), ..., S(14), Ca2(9)]). The combination unit 400 then outputs the generated data sequence Co to the calculation unit 401.

(Calculation Unit 401)

The calculation unit 401 divides the data sequence Co input from the combination unit 400 into symbols (two bits each), seeks the disparity corresponding to the value of each symbol thus divided, and calculates the total sum of the resulting disparities of the ten symbols as a candidate code word disparity. In Embodiment 1, in accordance with the input patterns and disparities in FIG. 2, a symbol value of "00" is assigned a disparity of −3, a symbol value of "01" is assigned a disparity of −1, a symbol value of "11" is assigned a disparity of +1, and a symbol value of "10" is assigned a disparity of +3.

The calculation unit 401 outputs the calculated candidate code word disparity to the determination unit 402.

(Determination Unit 402)

In accordance with the candidate code word disparity input from the calculation unit 401 and the cumulative disparity stored in the cumulative disparity storage unit 403, the determination unit 402 determines whether to invert or non-invert the data sequence Ca12.

Specifically, when both the candidate code word disparity and the cumulative disparity are a positive value, or when both are a negative value, the determination unit 402 determines to have the data sequence Ca12 inverted in the inversion unit 306. On the other hand, when one of the candidate code word disparity and the cumulative disparity is positive and the other is negative, then the determination unit 402 determines to have the data sequence Ca12 non-inverted in the inversion unit 306.

When at least one of the candidate code word disparity and the cumulative disparity is 0, then performing either inversion or non-inversion on the data sequence Ca12 poses no problem. In Embodiment 1, non-inversion is performed.

Based on the above-mentioned determination results, the determination unit 402 generates inversion control information and a code word disparity. The inversion control information indicates whether to invert or non-invert the data sequence Ca12, being set to "0" for inversion of the data sequence Ca12, and being set to "1" for non-inversion of the data sequence Ca12. The code word disparity is a value used in updating the cumulative disparity. When the data sequence Ca12 is inverted, the code word disparity is set to a value obtained by inverting the positive and negative codes in the candidate code word disparity, and when the data sequence Ca12 is non-inverted, the code word disparity is set to the value of the candidate code word disparity as is.

The determination unit 402 outputs the generated inversion control information to the inversion unit 306 and updates the cumulative disparity stored in the cumulative disparity storage unit 403 by adding the generated code word disparity to the cumulative disparity.

By thus updating the cumulative disparity while taking into consideration the inversion process performed by the inversion unit 306, it is possible to make the value of the cumulative disparity correspond to the actually transmitted signal.

(1-4-2) Inversion Unit 306

The inversion unit 306 generates a 10-bit data sequence Ca1 by either performing inversion or non-inversion processing on Ca12 input from the attachment unit 301 in accordance with the inversion control information input from the disparity control unit 305.

The inversion unit 306 outputs the generated data sequence Ca1 to the combination unit 304.

For example, for an input data sequence 1001101111, the inversion unit outputs 0110010000 to the combination unit 304 in the case of inversion, and outputs 1001101111 to the combination unit 304 in the case of non-inversion.

(1-5) Combination Unit 304

By alternately combining the data sequence Ca1 (=[Ca1(0), Ca1(1), ..., Ca1(9)]) input from the inversion unit 306 and the data sequence Ca2 (=[Ca2(0), Ca2(1), ..., Ca2(9)]) input from the conversion unit 302, the combination unit 304 generates a 20-bit encoded data sequence C (=[Ca1(0), Ca2(0), Ca1(1), Ca2(1), ..., Ca1(9), Ca2(9)]).

The combination unit 304 outputs the generated encoded data sequence C to the four-level modulation unit 102.

(2) Four-Level Modulation Unit 102

When the modulation designation data indicates four-level amplitude modulation, the four-level modulation unit 102 applies four-level modulation to the input encoded data sequence C and outputs the data sequence.

Specifically, the four-level modulation unit 102 divides the input data sequence into symbols every two bits and outputs an electric signal having voltage levels in accordance with the mapping in FIG. 2.

(3) Amplifier 103 and Light Emitting Element 104

The amplifier 103 amplifies an input electric signal and outputs it to the light emitting element 104.

The light emitting element 104 transforms the amplified electric signal into an optical signal having corresponding amplitude and transmits the optical signal to the reception device 110. A regular Light Emitting Diode (LED) or laser is used as the light emitting element 104.

1.2 Structure of the Reception Device 110

As shown in FIG. 1, the reception device 110 includes a light receiving element 111, an amplifier 112, a four-level demodulation unit 113, and a decoding unit 114.

Until communication is complete, the reception device 110 temporarily stores the modulation designation data transmitted to the transmission device 100 during initialization of communication.

Note that below, as in the explanation of the transmission device 100, an explanation is provided for the operations of each structural element when the modulation designation data indicates four-level amplitude modulation.

(1) Light Receiving Element 111 and Amplifier 112

Upon receiving the optical signal transmitted from the transmission device 100, the light receiving element 111 converts the optical signal into an electric signal and outputs it to the amplifier 112. A regular photodiode is used for the light receiving element 111.

The amplifier 112 amplifies the signal input from the light receiving element 111 and outputs it to the four-level demodulation unit 113.

(2) Four-Level Demodulation Unit 113

When the modulation designation data indicates four-level amplitude modulation, the four-level demodulation unit 113 determines the modulation status (voltage level) of the signal input from the amplifier 112 and, in accordance with the determined modulation status, demaps the signal to two-bit values, thereby generating a demodulated data sequence.

(3) Decoding Unit 114

The decoding unit 114 reconstructs a transmission data sequence S transmitted from the transmission device 100 by performing decoding processing on the demodulated data sequence. This decoding processing is processing opposite to the encoding processing via four-level amplitude modulation performed in the encoding unit 101 in the transmission device 100.

1.4 Operations

The following is an explanation of the processing by the transmission device 100 and the reception device 110.

(1) Transmission Processing

Figure 5:
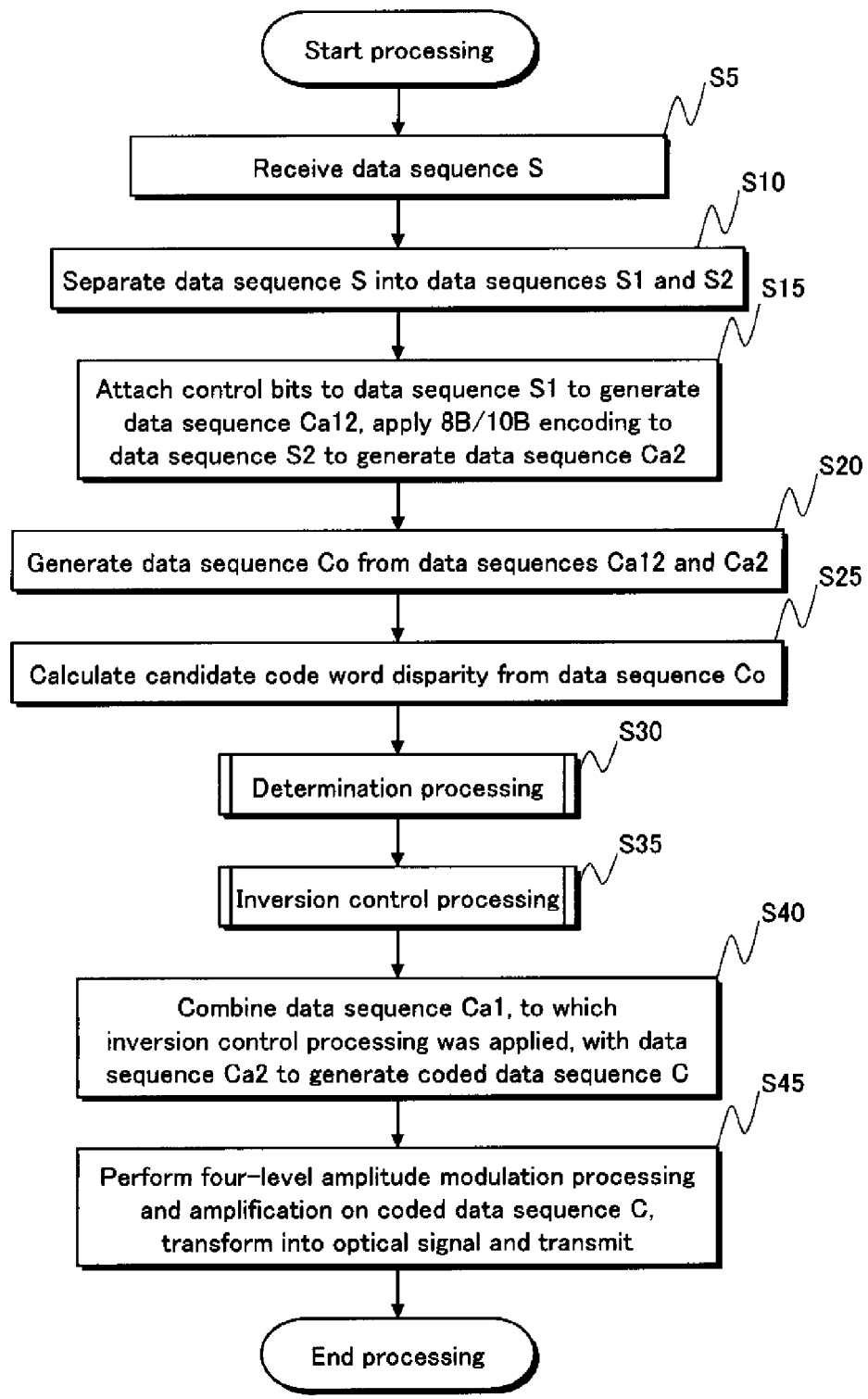
FIG. 5 is a flowchart showing data transmission processing in the transmission device 100.

With reference to the flowchart in FIG. 5, an explanation is provided for the processing operations by which the transmission device 100 performs four-level amplitude modulation on data and transmits the amplitude modulated data to the reception device 110.

The separation unit 300 receives a 16-bit data sequence S (=[S(0), S(1), . . . , S(k), . . . , S(15)]) which is to be transmitted (step S5) and separates the received data sequence S into an eight-bit data sequence S1 composed of even-numbered bits (=[S(0), S(2), . . . , S(2k), . . . , S(14)]) and an eight-bit data sequence S2 composed of odd-numbered bits (=[S(1), S(3), . . . , S(2k−1), . . . , S(15)]) (step S10). The separation unit 300 then outputs the data sequence S1 to the attachment unit 301 and outputs the data sequence S2 to the conversion unit 302.

The attachment unit 301 attaches two control bits "0", "1" to the top of the data sequence S1, thus generating a 10-bit data sequence Ca12 (=[0, 1, S(0), S(2), . . . , S(12), S(14)]). The conversion unit 302 encodes the data sequence S2 using the 8B/10B encoding scheme, thus generating a 10-bit data sequence Ca2 (=[Ca2(0), Ca2(1), Ca2(2), . . . , Ca2(9)]) (step S15). The attachment unit 301 outputs the generated 10-bit data sequence Ca12 to the disparity control unit 305 and the inversion unit 306, and the conversion unit 302 outputs the generated data sequence Ca2 to the disparity control unit 305 and the combination unit 304.

The combination unit 400 in the disparity control unit 305 generates a 20-bit data sequence Co from the data sequence Ca12 input from the attachment unit 301 and the data sequence Ca2 input from the conversion unit 302 (step S20).

The combination unit 400 outputs the generated data sequence Co (=[0, Ca2(0), 1, Ca2(1), S(0), Ca2(2), . . . , S(14), Ca2(9)]) to the calculation unit 401.

The calculation unit 401 in the disparity control unit 305 calculates a candidate code word disparity from the data sequence Co input from the combination unit 400 (step S25). The calculation unit 401 outputs the calculated candidate code word disparity to the inversion control unit 402.

In accordance with the candidate code word disparity and the cumulative disparity stored in the cumulative disparity storage unit 403, the determination unit 402 in the disparity control unit 305 determines whether to invert or non-invert the data sequence Ca12 (step S30).

In accordance with the determination results from the determination processing in step S30, the inversion unit 306 performs processing to either invert or non-invert Ca12 input from the attachment unit 301, thus generating a 10-bit data sequence Ca1 (=[Ca1(0), Ca1(1), . . . , Ca1(9)]) (step S35).

By alternately combining the data sequence Ca1 (=[Ca1(0), Ca1(2), . . . , Ca1(9)]), on which inversion control processing was performed, and the data sequence Ca2 (=[Ca2(0), Ca2(1), . . . , Ca2(9)]) input from the conversion unit 302, the combination unit 304 generates a 20-bit encoded data sequence C (=[Ca1(0), Ca2(0), Ca1(1), Ca2(1), . . . , Ca1(9), Ca2(9)]) (step S40).

The four-level modulation unit 102, the amplifier 103, and the light emitting element 104 perform, on the encoded data sequence C, four-level amplitude modulation processing, amplification processing, and processing for transformation into an optical signal, thus generating an optical signal to be transmitted. The generated optical signal is then transmitted to the reception device 110 (step S45).

(2) Determination Processing

Figure 6:
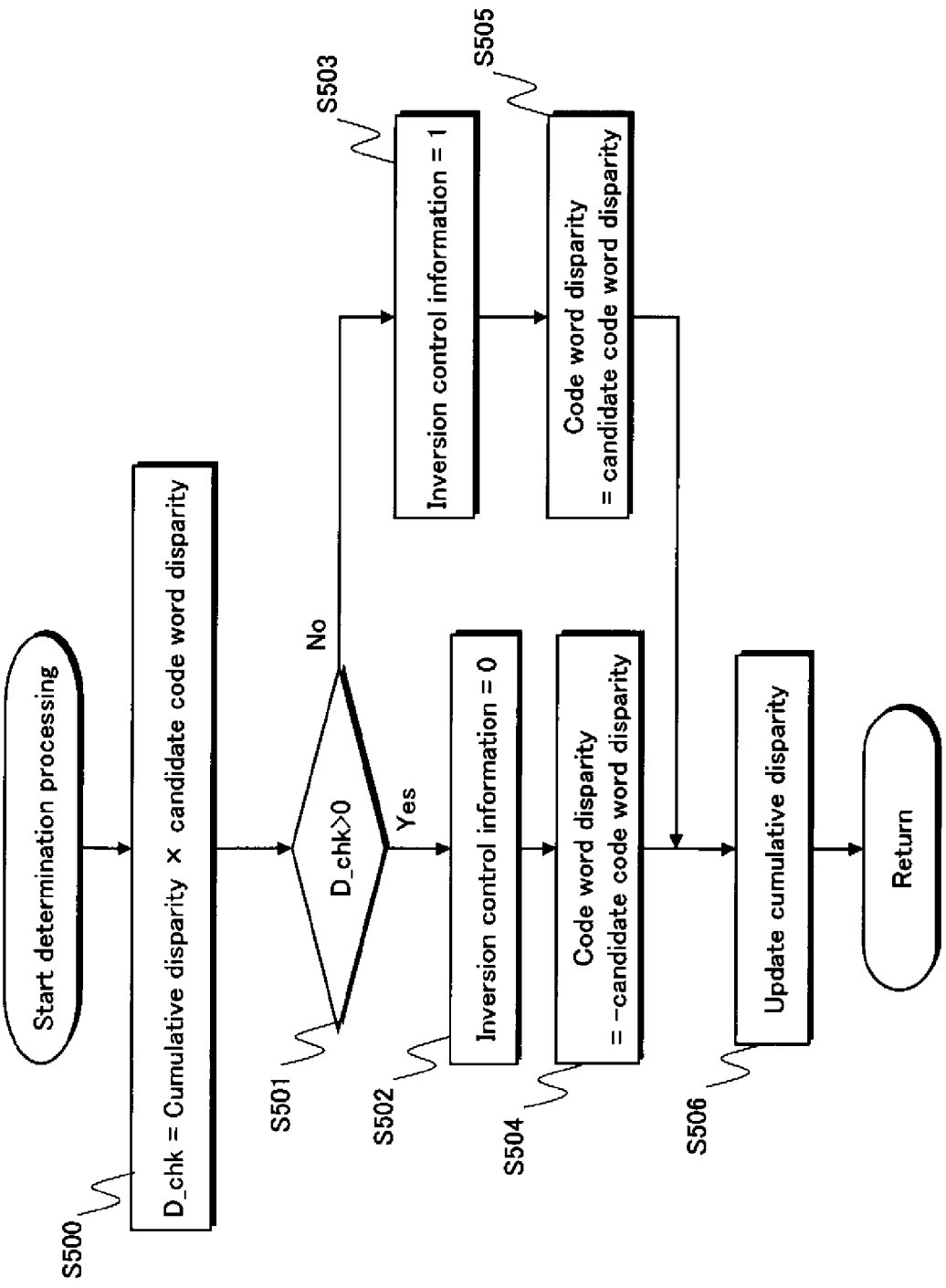
FIG. 6 is a flowchart showing the flow of determination processing.

The following is an explanation of the determination processing performed in step S30 shown in FIG. 5 with reference to the flowchart in FIG. 6.

The determination unit 402 multiplies the cumulative disparity stored in the cumulative disparity storage unit 403 to the candidate code word disparity input from the calculation unit 401, thus calculating D_chk (step S500).

The determination unit 402 determines whether the value of the calculated D_chk is larger than 0 or not (step S501).

When the value of D_chk is determined to be larger than 0 (step S501: "Yes"), then the determination unit 402 outputs "0" to the inversion unit 306 as the inversion control information (step S502), setting the code word disparity to the value of the candidate code word disparity after its code has been inverted (step S504).

If D_chk is determined not to be larger than 0, i.e. 0 or less (step S501: "No"), then the determination unit 402 outputs "1" to the inversion unit 306 as the inversion control information (step S503), setting the code word disparity to the value of the candidate code word disparity as is (step S505).

The determination unit 402 updates the cumulative disparity stored in the cumulative disparity storage unit 403 by adding the code word disparity obtained in step S504 or S505 to the cumulative disparity (step S506).

(3) Inversion Processing

Figure 7:
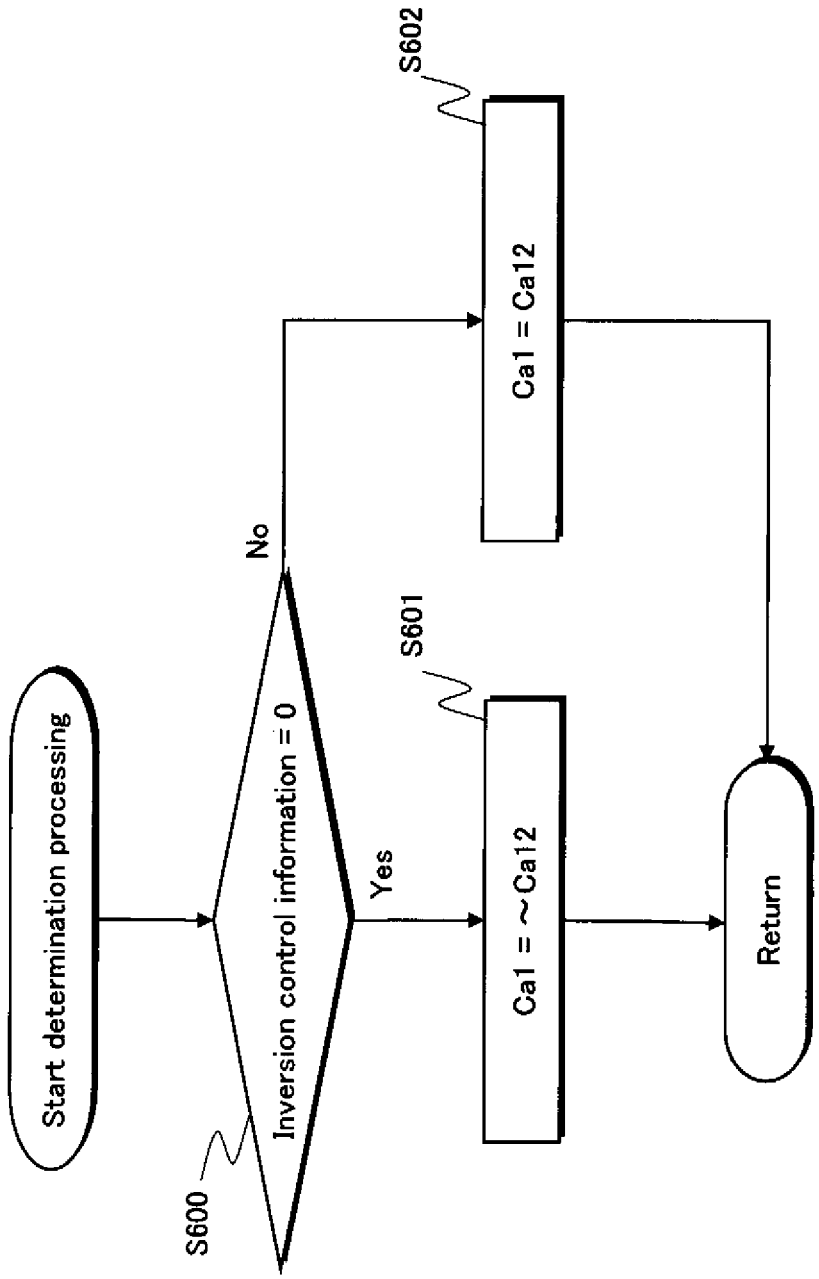
FIG. 7 is a flowchart showing the flow of inversion processing.

The following is an explanation of the inversion processing performed in step S35 of FIG. 5, with reference to the flowchart in FIG. 7.

The inversion unit 306 determines whether the value of the inversion control information input from the disparity control unit 305 is "0" or not (step S600).

If the value of the inversion control information is determined to be "0" (step S600: "Yes"), then the inversion unit 306 inverts the data sequence Ca12 input from the attachment unit 301 to generate Ca1, outputting the generated Ca1 to the combination unit 304 (step S601).

If the value of the inversion control information is determined not to be "0", i.e. if it is "1" (step S600: "No"), then the inversion unit 306 non-inverts the data sequence Ca12 input from the attachment unit 301 to generate Ca1, outputting the generated Ca1 to the combination unit 304 (step S602). The operator~shown in the figure indicates inversion. For example, ~A indicates inversion of the data sequence A.

(4) Decoding Processing

The following is a simple explanation of the decoding processing performed by the reception device 110.

Note that in the present explanation, up to four-level modulation processing is performed on the received signal.

As shown below, decoding processing is performed via procedures opposite to encoding processing.

The decoding unit 114 in the reception device 110 separates the demodulated data sequence, which has been four-level demodulated, into even-numbered bits and odd-numbered bits.

The decoding unit 114 separates the data sequence composed of odd-numbered bits into a plurality of blocks 10-bits each and determines, in accordance with an identification code attached to each block, whether each block was inverted. This identification code is two control bits attached to the data sequence S1 by the transmission device 100 and indicates the results of applying inversion control.

For blocks determined to have been inverted, the decoding unit 114 inverts the data sequence, excluding the control bits allocated in the most significant two bits, thereby reconstructing the data sequence S1.

For blocks determined to have been non-inverted, the decoding unit 114 extracts a data sequence excluding the control bits allocated in the most significant two bits, thereby reconstructing the data sequence S1.

On the other hand, the decoding unit 114 separates the data sequence composed of even-numbered bits into a plurality of blocks 10-bits each and applies 8B/10B decoding processing to each block (10-bit data sequence), thereby reconstructing the data sequence S2.

The decoding unit 114 reconstructs the transmitted data S by alternately arranging the data sequence S1 and data sequence S2.

1.5 Example of Operations

Figure 8:
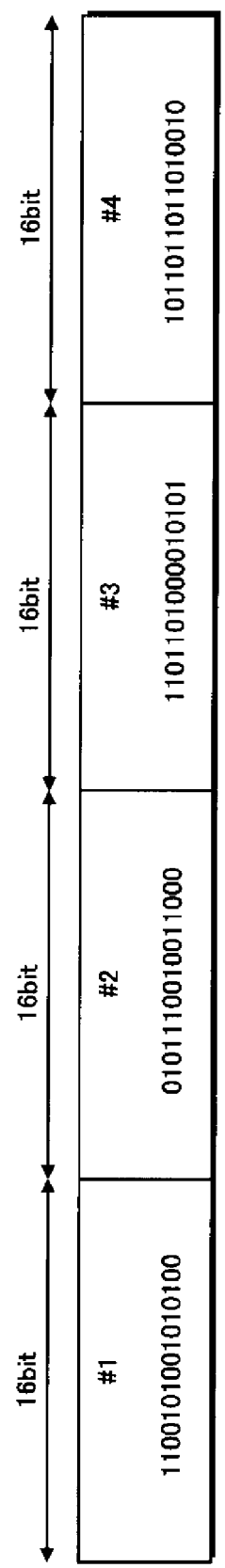
FIG. 8 shows an example of a data sequence input into the encoding unit 101.
Figure 9:
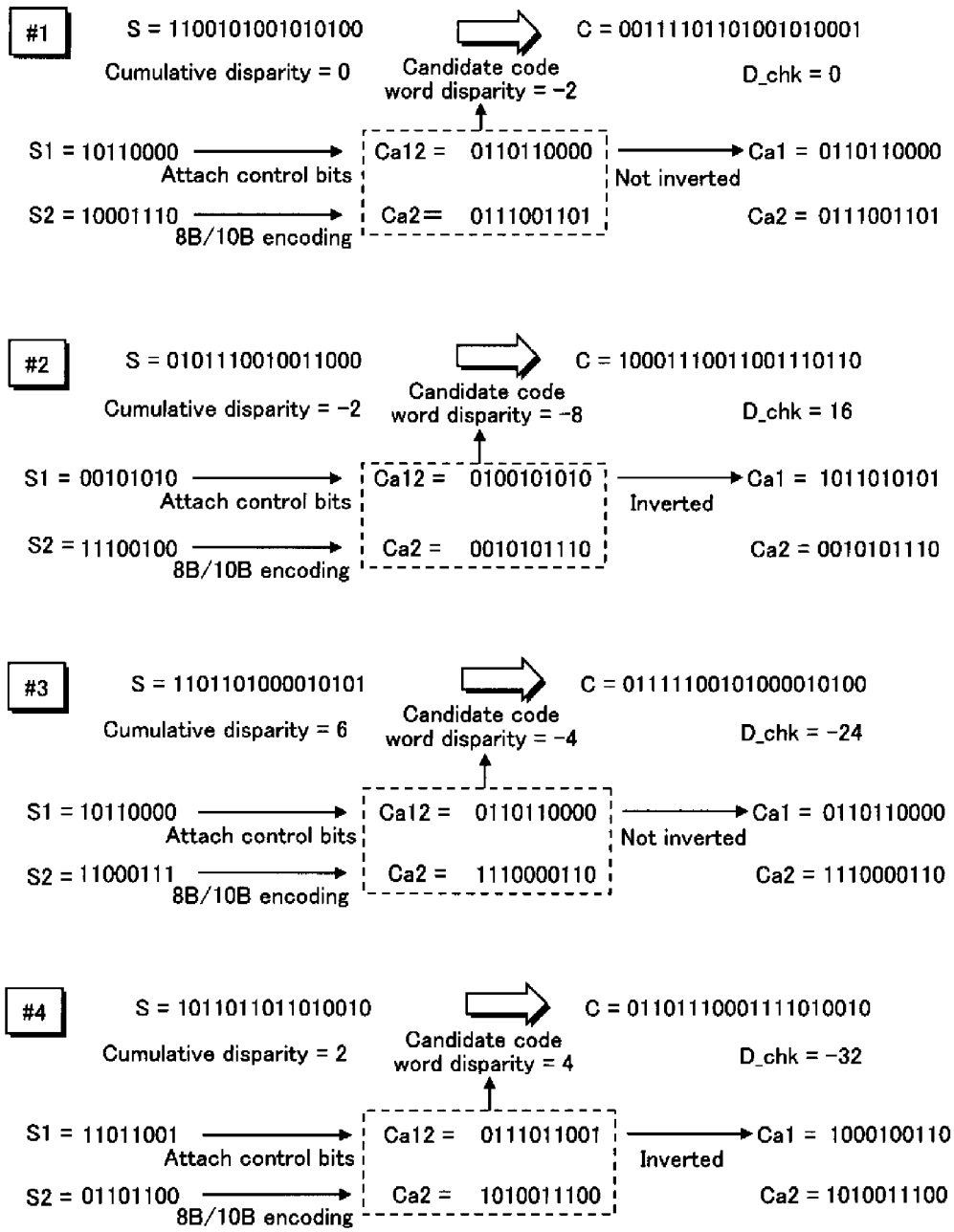
FIG. 9 shows a concrete example of procedures for encoding processing in Embodiment 1.

Explanation is provided for an example of operations in an embodiment of the present invention with reference to FIGS. 8 and 9. An example of a data sequence input into the encoding unit 101 is shown in FIG. 8.

FIG. 8 represents input data totaling 64 bits, divided into 16-bit units as data sequences #1 through #4.

FIG. 9 shows an example of operations inside the encoding unit 101 when the data sequence shown in FIG. 8 is input into the encoding unit 101 in the order of block #1 through block #4.

The following explains the example of the operations of the encoding unit 101 in order, with reference to FIG. 9.

(Data Sequence #1)

First, data sequence #1 (S=1100101001010100) is input into the separation unit 300. In the separation unit 300, the data sequence is divided into data sequence S1 (=10110000) and data sequence S2 (=10001110).

The attachment unit 301 attaches a two control bit sequence "01" to the top of the data sequence S1, thus generating data sequence Ca12 (=0110110000).

Meanwhile, the conversion unit 302 applies 8B/10B encoding to the data sequence S2, thus generating data sequence Ca2 (=0111001101).

The disparity control unit 305 calculates a candidate code word disparity from the data sequences Ca12 and Ca2. In this case, the value of the candidate code word disparity is −2.

Since the value of the candidate code word disparity is −2 and the value of the cumulative disparity is an initial value of 0, the inversion unit 402 calculates D_chk, the product of the candidate code word disparity and the cumulative disparity value, to be 0. Since the value of D_chk is 0, the determination unit 402 determines that non-inversion processing will be performed on the data sequence Ca12, outputs 1 as the inversion control information to the inversion unit 306, sets the code word disparity to −2, and updates the value of the cumulative disparity as −2.

Since the value of the inversion control information input from the disparity control unit 305 is 1, the inversion unit 306 does not invert the data sequence Ca12, outputting Ca1 (=0110110000) to the combination unit 304. The combination unit 304 combines Ca1 and Ca2, thus generating encoded data sequence C (=00111101101001010001). The combination unit 304 then outputs the generated encoded data sequence C to the four-level modulation unit 102.

(Data Sequence #2)

Data sequence #2 (S=0101110010011000) is input into the separation unit 300. In the separation unit 300, the data sequence is divided into data sequence S1 (=00101010) and data sequence S2 (=11100100).

The attachment unit 301 attaches a two control bit sequence "01" to the top of the data sequence S1, thus generating data sequence Ca12 (=0100101010).

Meanwhile, the conversion unit 302 applies 8B/10B encoding to the data sequence S2, thus generating data sequence Ca2 (=0010101110).

The disparity control unit 305 calculates a candidate code word disparity from the data sequences Ca12 and Ca2. In this case, the value of the candidate code word disparity is −8.

Since the value of the candidate code word disparity is −8 and the cumulative disparity value is −2, the inversion unit 402 calculates D_chk, the product of the candidate data disparity and the cumulative disparity value, to be 16. Since the value of D_chk is 16, the determination unit 402 determines that inversion processing will be performed on the data sequence Ca12, outputs 0 as the inversion control information, sets the code word disparity to 8, and updates the value of the cumulative disparity as 6.

Since the value of the inversion control information is 0, the inversion unit 306 inverts the data sequence Ca12, generating Ca1 (=1011010101) and outputting Ca1 to the combination unit 304.

The combination unit 304 combines Ca1 and Ca2, thus generating encoded data sequence C (= 10001110011001110110), which it outputs to the four-level modulation unit 102.

(Data Sequence #3)

Data sequence #3 (S=1101101000010101) is input into the separation unit 300. In the separation unit 300, the data sequence is divided into data sequence S1 (=10110000) and data sequence S2 (=11000111).

The attachment unit 301 attaches a two control bit sequence "01" to the top of the data sequence S1, thus generating data sequence Ca12 (=0110110000).

Meanwhile, the conversion unit 302 applies 8B/10B encoding to the data sequence S2, thus generating data sequence Ca2 (=1110000110).

The disparity control unit 305 calculates a candidate code word disparity from the data sequences Ca12 and Ca2. In this case, the value of the candidate code word disparity is −4.

Since the value of the candidate code word disparity is −4 and the cumulative disparity value is 6, the inversion unit 402 calculates D_chk, the product of the candidate data disparity and the cumulative disparity value, to be −24. Since the value of D_chk is −24, the determination unit 402 determines that non-inversion processing will be performed on the data sequence Ca12, outputs 1 as the inversion control information, sets the code word disparity to −4, and updates the value of the cumulative disparity as 2.

Since the value of the inversion control information is 1, the inversion unit 306 does not invert the data sequence Ca12, outputting Ca1 (=0110110000) to the combination unit 304.

The combination unit 304 combines Ca1 and Ca2, thus generating encoded data sequence C (= 0111110010100010100), which it outputs to the four-level modulation unit 102.

(Data Sequence #4)

Data sequence #4 (S=1011011011010010) is input into the separation unit 300. In the separation unit 300, the data sequence is divided into data sequence S1 (=11011001) and data sequence S2 (=01101100).

The attachment unit 301 attaches a two control bit sequence "01" to the top of the data sequence S1, thus generating data sequence Ca12 (=0111011001).

Meanwhile, the conversion unit 302 applies 8B/10B encoding to the data sequence S2, thus generating data sequence Ca2 (=1010011100).

The disparity control unit 305 calculates a candidate code word disparity from the data sequences Ca12 and Ca2. In this case, the value of the candidate code word disparity is 4.

Since the value of the candidate code word disparity is 4 and the cumulative disparity value is 2, the inversion unit 402 calculates D_chk, the product of the candidate data disparity and the cumulative disparity value, to be 8. Since the value of D_chk is 8, the determination unit 402 determines that inversion processing will be performed on the data sequence Ca12, outputs 0 as the inversion control information, sets the code word disparity to −4, and updates the value of the cumulative disparity as −2.

Since the value of the inversion control information is 0, the inversion unit 306 inverts the data sequence Ca12, generating Ca1 (=1000100110) and outputting Ca1 to the combination unit 304.

The combination unit 304 combines Ca1 and Ca2, thus generating encoded data sequence C (= 0110111000111101001), which it outputs to the four-level modulation unit 102.

FIG. 10 shows the code word disparities and cumulative disparities calculated by the encoding unit 101 from the data sequences shown in FIG. 8. The maximum and minimum values for the code word disparity output by the encoding unit 101 as shown in Embodiment 1 are ±20. Since the code word disparity is controlled in the determination unit 402 so as not to be the same code as the current cumulative disparity, the maximum and minimum values for the updated cumulative disparity are restricted to a range of ±20.

1.6 Regarding Two-Level Amplitude Modulation

The following is an explanation for when the transmission device 100 applies two-level amplitude modulation.

Upon receiving modulation designation data that designates two-level amplitude modulation from the reception device 110, the transmission device 100 prevents the attachment unit 301 and the inversion control unit 303 from operating. That is, only the encoding unit 101, separation unit 300, conversion unit 302, and combination unit 304 operate.

In the case of performing two-level amplitude modulation, when the separation unit 300 receives a 16-bit data sequence S to be transmitted, it outputs the received data sequence S to the conversion unit 302.

The conversion unit 302 applies 8B/10B encoding to the received data sequence S. In this case, the conversion unit 302 divides the data sequence S into two data sequences of eight bits each, applies 8B/10B encoding, and outputs two 10-bit data sequences to the combination unit 304.

The combination unit 304 outputs the 10-bit data sequences to which 8B/10B encoding was applied to the four-level modulation unit 102.

The four-level modulation unit 102 divides the data sequences received from the combination unit 304 into one bit symbols, treats each symbol as the most significant bit, and assigns a fixed bit "0" as the least significant bit to convert each symbol into a two-bit symbol. Then, for each converted symbol, the four-level modulation unit 102 outputs an electric signal having voltage levels in accordance with the mapping in FIG. 2.

Subsequent operations by the amplifier 103 and the light emitting element 104 are the same, and thus an explanation thereof is omitted.

Also, the decoding process in the reception device 110 is the same as a conventional process to decode a two-level amplitude modulation, and thus an explanation thereof is omitted.

1.7 Summary of Embodiment 1

Via the control in the disparity control unit 305, the sign of the cumulative disparity and the sign of the code word disparity are made opposite. Therefore, even if disparity occurs for a single block, over several blocks the respective disparities cancel each other out, and the disparity approaches 0. As a result, it is possible to prevent the occurrence of DC offset due to continual disparity wherein codes have the same sign, which can cause a reception error if the reception device is not able to generate a correct standard value. In other words, DC balance is guaranteed also when performing four-level amplitude modulation.

For locations in the data sequence Ca2 where the same value is not continuous, then also when the data sequence Ca1 and the data sequence Ca2 are changed into multiple levels, the same value is not continuous. Therefore, in multilevel encoding, the length for which the same value is continuous can be limited to a predetermined value or less. As a result, by limiting the occurrences of the same level to a predetermined value or less, clock recovery in the amplifier 112 in the reception device 110 becomes easy, and it is possible to prevent the occurrence of reception errors due to loss of synchronization by the reception device. In this way, the run length is guaranteed.

2. Embodiment 2

The following is an explanation of Embodiment 2 of the present invention with reference to the figures, focusing on the aspects that differ from Embodiment 1. Note that the same labels are used for structural elements that perform the same operations.

Figure 11:
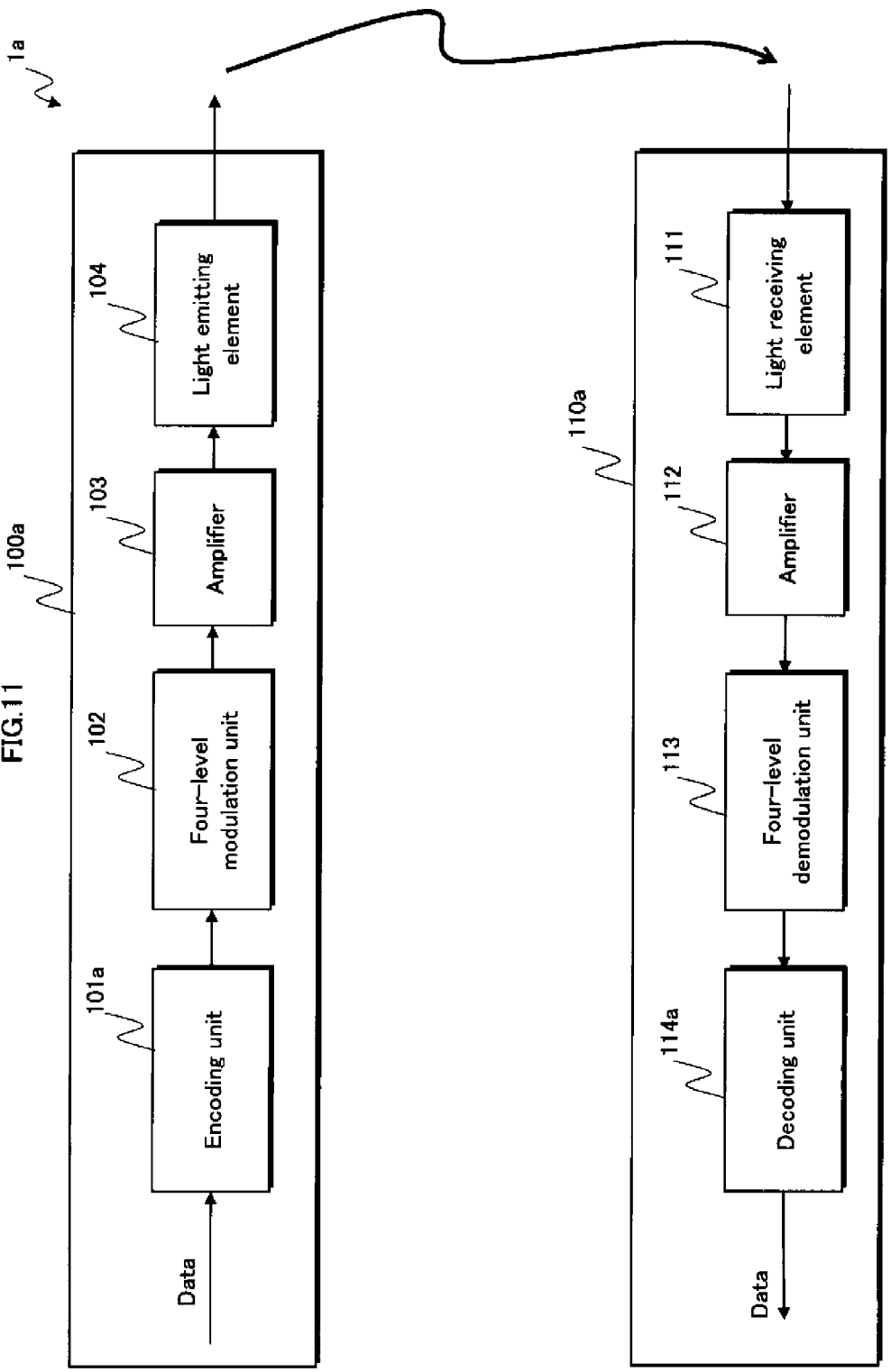

As shown in FIG. 11, the transmission/reception system 1a in Embodiment 2 is composed of a transmission device 100a and a reception device 110a.

As in Embodiment 1, in the following description, before the transmission device 100a actually transmits data that is to be transmitted, both devices transmit and receive, as an initialization process, data to establish communication. Also as in Embodiment 1, the reception device 110a transmits modulation designation data that designates either two-level or four-level amplitude modulation to the transmission device 100a. The transmission device 100a performs modulation on the data to be transmitted in accordance with the amplitude modulation designated by the amplitude designation data that it receives.

2.1 Structure of the Transmission Device 100a

As shown in FIG. 11, the transmission device 100a is composed of an encoding unit 101a, four-level modulation unit 102, amplifier 103, and light emitting element 104.

The following is an explanation of the encoding unit 101a, which differs from the structure in Embodiment 1. Note that the other structures (four-level modulation unit 102, amplifier 103, and light emitting element 104) are the same as in Embodiment 1, and thus an explanation thereof is omitted.

(1) Encoding Unit 101a

Figure 12:
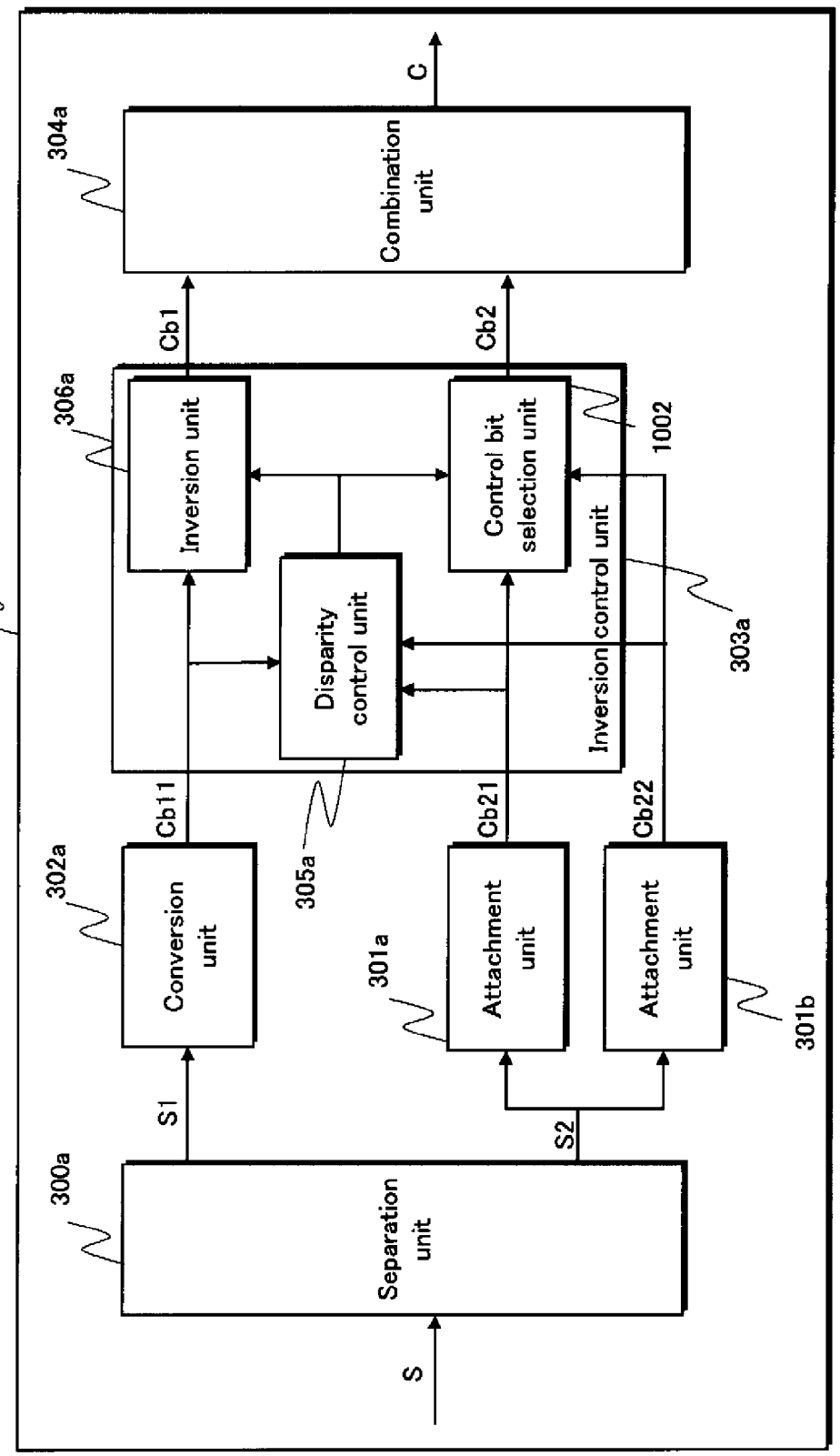

As shown in FIG. 12, the encoding unit 101a comprises a separation unit 300a, attachment units 301a and 301b, conversion unit 302a, inversion control unit 303a, and combination unit 304a. As shown in FIG. 12, the inversion control unit 303a comprises a disparity control unit 305a, inversion unit 306a, and control bit selection unit 1002.

When the modulation designation data indicates four-level amplitude conversion, operations of the separation unit 300a, attachment units 301a and 301b, conversion unit 302a, inversion control unit 303a, and combination unit 304a are all controlled.

(1-1) Separation Unit 300d

The 16-bit transmission data sequence S input into the encoding unit 101a is input into the separation unit 300a. The separation unit 300a separates the input 16-bit transmission data sequence S (=[S(0), S(1), ..., S(k), ..., S(15)]) into an eight-bit data sequence S1 composed of even-numbered bits (=[S(0), S(2), ..., S(2k), ..., S(14)]) and an eight-bit data sequence S2 composed of odd-numbered bits (=[S(1), S(3), ..., S(2k-1), ..., S(15)]). The separation unit 300a then outputs the eight-bit data sequence S1 to the conversion unit 302a and outputs the eight-bit data sequence S2 to the attachment units 301a and 301b.

(1-2) Conversion Unit 302a

The conversion unit 302a encodes the data sequence S1 input from the separation unit 300a using an encoding scheme that limits the run length to a predetermined value or less. As in Embodiment 1, encoding of the data sequence S1 is performed using the 8B/10B encoding scheme.

By encoding the data sequence S1 using the 8B/10B encoding scheme, the conversion unit 302a generates a 10-bit data sequence Cb11 (=[Cb11(0), Cb11(1), ..., Cb11(9)]) and outputs the generated data sequence Cb11 to the disparity control unit 305a and the inversion unit 306a. By adopting this sort of structure, the run length is limited to a predetermined value or less, and clock recovery in the amplifier provided in the reception device becomes easy.

(1-3) Attachment Units 301a, 301b

The attachment unit 301a attaches two control bits "0", "1" to the data sequence S2 input from the separation unit 300a, thus generating a 10-bit data sequence Cb21 (=[0, 1, S(1), S(3), ..., S(2k-1), ..., S(15)]). The attachment unit 301a then outputs the generated 10-bit data sequence Cb21 to the disparity control unit 305a and the control bit selection unit 1002.

The attachment unit 301b attaches two control bits "1", "1", which differ from the two control bits attached by the attachment unit 301a, to the data sequence S2 input from the separation unit 300a, thus generating a 10-bit data sequence Cb22 (=[1, 1, S(1), S(3), ..., S(2k-1), ..., S(15)]). The attachment unit 301b then outputs the generated 10-bit data sequence Cb22 to the disparity control unit 305a and the control bit selection unit 1002.

(1-4) Inversion Control Unit 303a

In order to guarantee DC balance, the inversion control unit 303a performs either inversion or non-inversion on the input data sequence Cb11.

The disparity control unit 305a in the inversion control unit 303a determines whether the data sequence Cb11 was inverted or non-inverted. In accordance with the determination results from the disparity control unit 305a, the inversion unit 306a then performs either inversion or non-inversion on the data sequence Ca1.

The following is a description of the disparity control unit 305a and the inversion unit 306a.

(1-4-1) Disparity Control Unit 305a

In accordance with the input data sequences Cb11, Cb21, and Cb22, the disparity control unit 305a determines whether to invert or non-invert the data sequence Cb11, and in accordance with the determination results generates inversion control information. The disparity control unit 305a then outputs the generated inversion control information to the inversion unit 306a and the control bit selection unit 1002.

Figure 13:
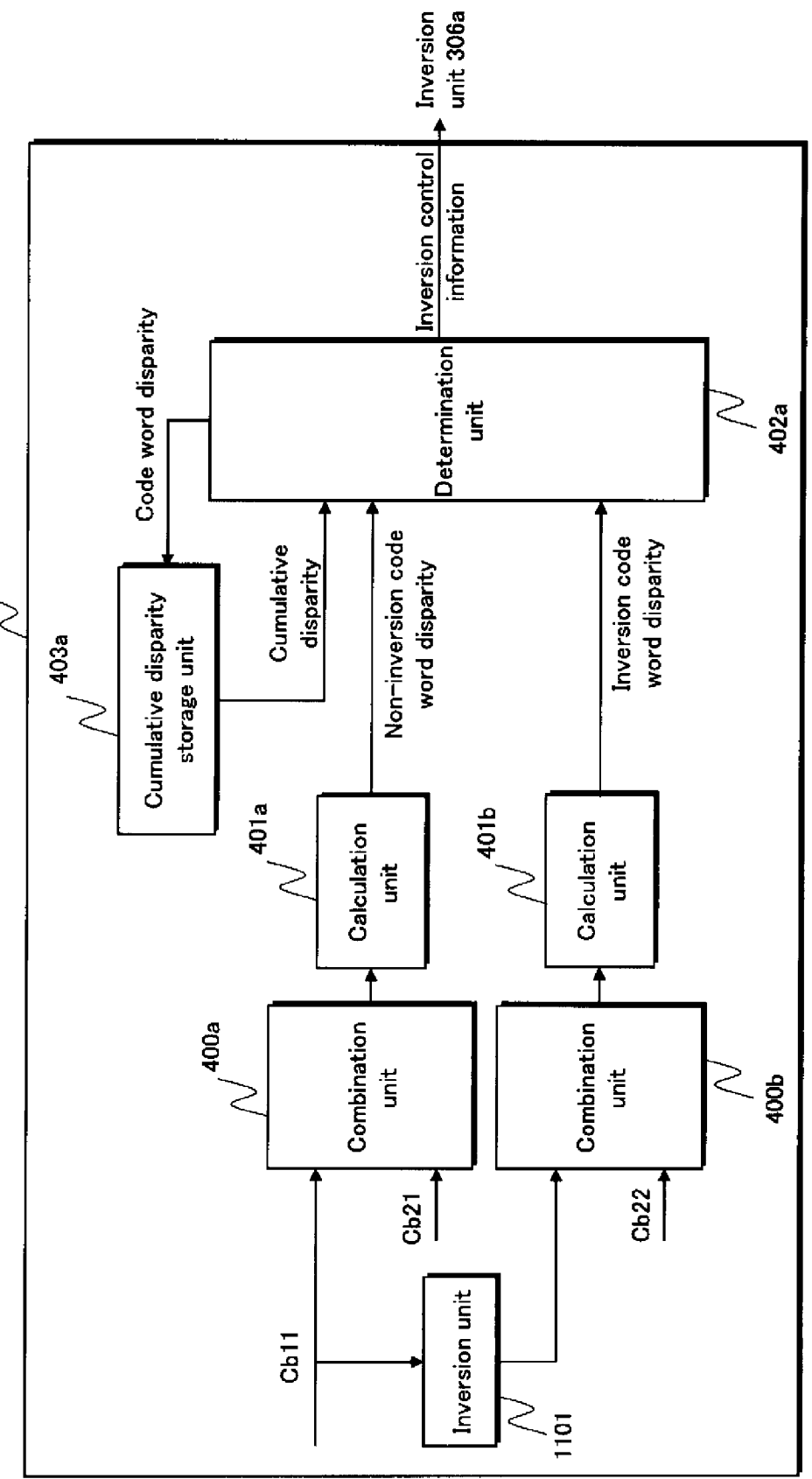

As shown in FIG. 13, the disparity control unit 305a includes an inversion unit 1101, combination units 400a and 400b, calculation units 401a and 401b, determination unit 402a, and cumulative disparity storage unit 403a.

(Cumulative Disparity Storage Unit 403a)

The cumulative disparity storage unit 403a is the same as the cumulative disparity storage unit 403 in Embodiment 1, and thus an explanation thereof is omitted.

(Inversion Unit 1101)

The inversion unit 1101 inverts the input data sequence Cb11, thus generating Cb11' (=[Cb11'(0), Cb11'(1), ..., Cb11'(9)]). The inversion unit 1101 outputs the generated Cb11' to the combination unit 400b.

(Combination Units 400a, 400b)

By alternately combining the data sequence Cb11 (=[Cb11(0), Cb11(1), ..., Cb11(9)]) input from the conversion unit 302a and the data sequence Cb21 (=[0, 1, S(1), S(3), ..., S(2k-1), ..., S(15)]) input from the attachment unit 301a, the combination unit 400a generates a 20-bit data sequence Cb31 (=[Cb11(0), 0, Cb11(1), 1, ..., S(15)]). The combination unit 400a then outputs the generated data sequence Cb31 to the calculation unit 401a.

By alternately combining the data sequence Cb11' (=[Cb11'(0), Cb11'(1), ..., Cb11'(9)]) input from the inversion unit 1101 and the data sequence Cb22 (=[1, 1, S(1), S(3), ..., S(2k-1), ..., S(15)]) input from the attachment unit 301b, the combination unit 400b generates a 20-bit data sequence Cb32 (=[Cb11'(0), 1, Cb11'(1), 1, ..., S(15)]). The combination unit 400b then outputs the generated data sequence Cb32 to the calculation unit 401b.

(Calculation Units 401a, 401B)

The calculation unit 401a divides the data sequence Cb31 input from the combination unit 400a into symbols (two bits each), seeks the disparity corresponding to the value of each symbol thus divided, and calculates the total sum of the resulting disparities of the ten symbols as a non-inversion code word disparity. In Embodiment 2, in accordance with the mapping pattern for the four-level modulation unit 102, a symbol value of "00" is assigned a disparity of −3, a symbol value of "01" is assigned a disparity of −1, a symbol value of "11" is assigned a disparity of +1, and a symbol value of "10" is assigned a disparity of +3. The calculation unit 401a outputs the calculated non-inversion code word disparity to the determination unit 402a.

In the same way as the calculation unit 401a, the calculation unit 401b divides the data sequence Cb32 input from the combination unit 400b into symbols (two bits each), seeks the disparity corresponding to the value of each symbol thus divided, and calculates the total sum of the resulting disparities of the ten symbols as an inversion code word disparity. In Embodiment 2, in accordance with the mapping pattern for the four-level modulation unit 102, a symbol value of "00" is assigned a disparity of −3, a symbol value of "01" is assigned a disparity of −1, a symbol value of "11" is assigned a disparity of +1, and a symbol value of "10" is assigned a disparity of +3. The calculation unit 401b outputs the calculated inversion code word disparity to the determination unit 402a.

(Determination Unit 402a)

In accordance with the non-inversion code word disparity input from the calculation unit 401a, the inversion code word disparity input from the calculation unit 401b, and the cumulative disparity stored in the cumulative disparity storage unit 403a, the determination unit 402a determines whether to have the data sequence Cb11 inverted or non-inverted in the inversion unit 306a.

In accordance with the non-inversion code word disparity input from the calculation unit 401a, the inversion code word disparity input from the calculation unit 401b, and the cumulative disparity stored in the cumulative disparity storage unit 403, the determination unit 402a selects one of the data sequences Cb21 and Cb22.

Specifically, when the absolute value of the sum of the cumulative disparity and the non-inversion code word disparity is smaller than the absolute value of the sum of the cumulative disparity and the inversion code word disparity, the determination unit 402a determines to have the data sequence Cb11 non-inverted in the inversion unit 306a and to make the control bit selection unit 1002 select Cb21. Conversely, when the absolute value of the sum of the cumulative disparity and the non-inversion code word disparity is larger than the absolute value of the sum of the cumulative disparity and the inversion code word disparity, the determination unit 402a determines to have the data sequence Cb11 inverted in the inversion unit 306a and to make the control bit selection unit 1002 select Cb22. The inversion unit 306a and the control bit selection unit 1002 are described later.

In accordance with the determination results indicating whether to invert or non-invert the data sequence Cb11, the determination unit 402a generates inversion control information and a code word disparity. The value of the inversion control information is set to "0" for inversion of the data sequence Cb11 and is set to "1" for non-inversion of the data sequence Cb11. When the data sequence Cb11 is inverted, the code word disparity is set to the inversion code word disparity, and when the data sequence Cb11 is non-inverted, the code word disparity is set to the non-inversion code word disparity as is. The determination unit 402a outputs the generated inversion control information to the inversion unit 306a and the control bit selection unit 1002 and updates the cumulative disparity stored in the cumulative disparity storage unit 403a by adding the generated code word disparity to the cumulative disparity.

(1-4-2) Inversion Unit 306a

The inversion unit 306 generates a 10-bit data sequence Cb1 by either performing inversion or non-inversion processing on Cb11 input from the conversion unit 302a in accordance with the inversion control information input from the disparity control unit 305a.

The inversion unit 306a outputs the generated data sequence Cb1 to the combination unit 304a.

Specifically, when the value of the inversion control information is 1, the inversion unit 306a non-inverts the data sequence Cb11, and when the value of the inversion control information is 0, the inversion unit 306a inverts the data sequence Cb11.

(1-4-3) Control Bit Selection Unit 1002

In accordance with the inversion control information input from the disparity control unit 305a, the control bit selection unit 1002 selects either the data sequence Cb21, input from the attachment unit 301a, or the data sequence Cb22, input from the attachment unit 301b, outputting the selected data sequence to the combination unit 304a as Cb2.

Specifically, when the value of the inversion control information is 1, the control bit selection unit 1002 selects the data sequence Cb21, and when the value of the inversion control information is 0, the control bit selection unit 1002 selects the data sequence Cb22.

(1-5) Combination Unit 304a

As in Embodiment 1, the combination unit 304a generates a 20-bit encoded data sequence C by alternately combining the data sequence Cb1 input from the inversion unit 306a and the data sequence Cb2 input from the control bit selection unit 1002. The combination unit 304a outputs the generated encoded data sequence C to the four-level modulation unit 102.

2.2 Reception Device 110a

As shown in FIG. 11, the reception device 110a includes a light receiving element 111, an amplifier 112, a four-level demodulation unit 113, and a decoding unit 114a.

The decoding unit 114a reconstructs the transmission data sequence S transmitted from the transmission device 100a by performing decoding processing on the demodulated data sequence. This decoding processing is processing opposite to the encoding processing via four-level amplitude modulation performed in the encoding unit 101a.

Note that other structures (the light receiving element 111, amplifier 112, and four-level demodulation unit 113) have the same form as in Embodiment 1, and thus an explanation thereof is omitted.

2.3 Operations

The following is an explanation of the processing by the transmission device 100a and the reception device 110a in Embodiment 2.

(1) Transmission Processing

Figure 14:
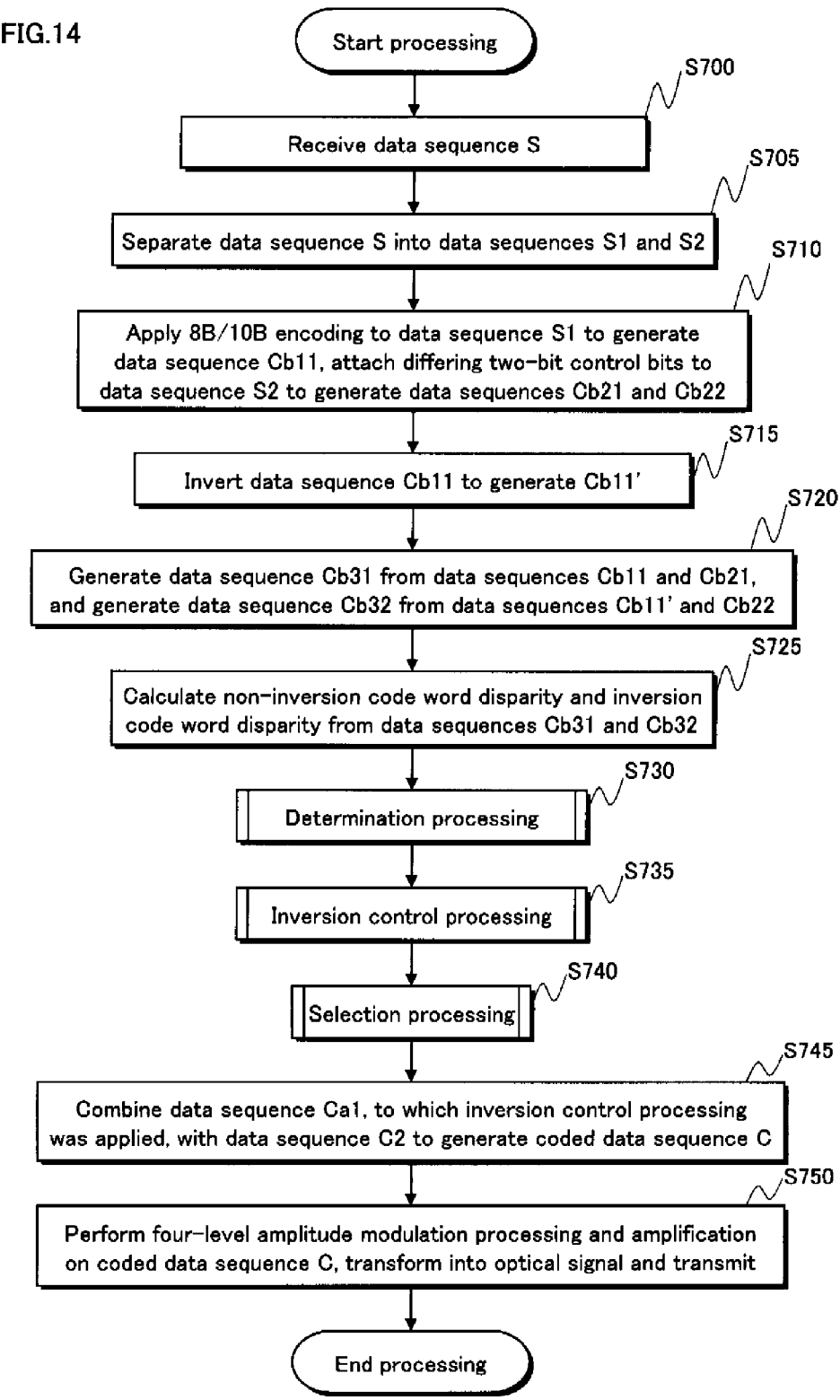

With reference to the flowchart in FIG. 14, an explanation is provided for the processing operations by which the transmission device 100a performs four-level amplitude modulation on data and transmits the amplitude modulated data to the reception device 110a.

The separation unit 300a receives a 16-bit data sequence S (=[S(0), S(1), . . . , S(k), . . . , S(15)]) which is to be transmitted (step S700) and separates the received data sequence S into an eight-bit data sequence S1 composed of even-numbered bits (=[S(0), S(2), . . . , S(2k), . . . , S(14)]) and an eight-bit data sequence S2 composed of odd-numbered bits (=[S(1), S(3), ..., S(2k−1), ..., S(15)]) (step S705). The separation unit 300a then outputs the data sequence S1 to the conversion unit 302a and outputs the data sequence S2 to the attachment units 301a and 301b.

The conversion unit 302a encodes the data sequence S1 using the 8B/10B encoding scheme, thus generating a 10-bit data sequence Cb11 (=[Cb11(0), Cb11(1), ..., Cb11(9)]). The attachment unit 301a attaches two control bits "0", "1" to the top of the data sequence S2, thus generating a 10-bit data sequence Cb21 (=[0, 1, S(0), S(2), ..., S(12), S(14)]). The attachment unit 301b attaches two control bits "1", "1" to the top of the data sequence S2, thus generating a 10-bit data sequence Cb22 (=[1, 1, S(0), S(2), ..., S(12), S(14)]) (step S710). The conversion unit 302a outputs the generated data sequence Cb11 to the disparity control unit 305a and the combination unit 304a. The attachment unit 301a outputs the generated 10-bit data sequence Cb21 to the disparity control unit 305a and the control bit selection unit 1002. The attachment unit 301b outputs the generated 10-bit data sequence Cb22 to the disparity control unit 305a and the control bit selection unit 1002.

The inversion unit 1101 in the disparity control unit 305a inverts the data sequence Cb11 input from the conversion unit 302a, thus generating a data sequence Cb11' (=[Cb11'(0), Cb11'(1), ..., Cb11'(9)]) (step S715). The inversion unit 1101 outputs the generated data sequence Cb11' to the combination unit 400b.

The combination unit 400a in the disparity control unit 305a generates a 20-bit data sequence Cb31 (=[Cb11(0), 0, Cb11(1), 1, ..., S(15)]) from the data sequence Cb21 input from the attachment unit 301a and the data sequence Cb11 input from the conversion unit 302a. The combination unit 400b generates a 20-bit data sequence Cb32 (=[Cb11'(0), 1, Cb11'(1), 1, ..., S(15)]) from the data sequence Cb22 input from the attachment unit 301b and the data sequence Cb11' input from the inversion unit 1101 (step S720). The combination unit 400a outputs the generated data sequence Cb31 to the calculation unit 401a, and the combination unit 400b outputs the generated data sequence Cb32 to the calculation unit 401b.

The calculation unit 401a calculates a non-inversion code word disparity from the data sequence Cb31 input from the combination unit 400a, and the calculation unit 401b calculates an inversion code word disparity from the data sequence Cb32 input from the combination unit 400b (step S725). The calculation unit 401a outputs the calculated non-inversion code word disparity to the determination unit 402a, and the calculation unit 401b outputs the calculated inversion code word disparity to the determination unit 402a.

In accordance with the non-inversion code word disparity, the inversion code word disparity, and the cumulative disparity stored in the cumulative disparity storage unit 403a, the determination unit 402a determines whether to invert or non-invert the data sequence Cb11 (step S730).

In accordance with the determination results from the determination processing in step S730, the inversion unit 306a performs processing to either invert or non-invert Cb11 input from the conversion unit 302a, thus generating a 10-bit data sequence Cb1 (=[Cb1(0), Cb1(1), ..., Cb1(9)]) (step S735).

In accordance with the determination results from step S730, the control bit selection unit 1002 selects either the data sequence Cb21 or the data sequence Cb22 (step S740). The control bit selection unit 1002 then outputs the selected data sequence to the combination unit 304a as the data sequence Cb2.

By alternately combining the data sequence Cb1 (=[Cb1(0), Cb1(2), ..., Cb1(9)]), on which inversion control processing was performed, and the data sequence Cb2 selected by the control bit selection unit 1002, the combination unit 304a generates a 20-bit encoded data sequence C (=[Cb1(0), Cb2(0), Cb1(1), Cb2(1), ..., Cb1(9), Cb2(9)]) (step S745).

The four-level modulation unit 102, the amplifier 103, and the light emitting element 104 perform, on the encoded data sequence C, four-level amplitude modulation processing, amplification processing, and processing for transformation into an optical signal, thus generating an optical signal to be transmitted. The generated optical signal is then transmitted to the reception device 110a (step S750).

(2) Determination Processing

Figure 15:
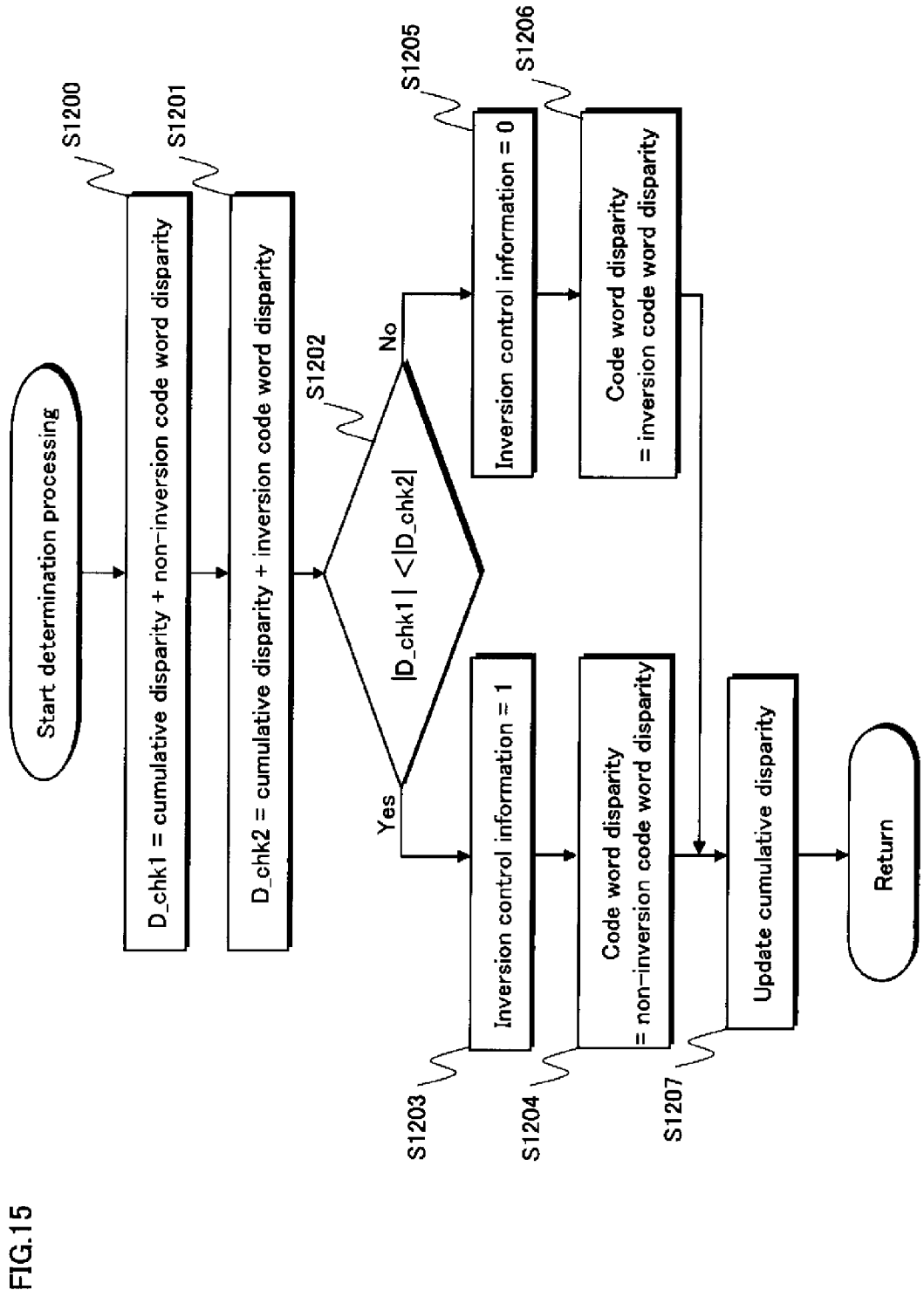
FIG. 15 is a flowchart showing the flow of determination processing.

The following is an explanation of the determination processing performed in step S730 shown in FIG. 14 with reference to the flowchart in FIG. 15.

The determination unit 402a adds the cumulative disparity stored in the cumulative disparity storage unit 403a to the non-inversion code word disparity input from the calculation unit 401a, thus calculating D_chk1 (step S1200).

The determination unit 402b adds the cumulative disparity stored in the cumulative disparity storage unit 403a to the inversion code word disparity input from the calculation unit 401b, thus calculating D_chk2 (step S1201).

The determination unit 402a determines which is larger: |D_chk1|, the absolute value of the calculated D_chk1, or |D_chk2|, the absolute value of the calculated D_chk2 (step S1202).

When the value of |D_chk1| is determined to be smaller than the value of |D_chk2| (step S1202: "Yes"), then the determination unit 402a outputs "1" to the inversion unit 306a and the control bit selection unit 1002 as the inversion control information (step S1203). The determination unit 402a sets the code word disparity to the non-inversion code word disparity (step S1204) and updates the cumulative disparity stored in the cumulative disparity storage unit 403a by adding the code word disparity to the cumulative disparity (step S1207).

When the value of |D_chk1| is determined not to be smaller than the value of |D_chk2|, i.e. |D_chk1| is greater than or equal to |D_chk2| (step S1202: "No"), then the determination unit 402a outputs "0" to the inversion unit 306a and the control bit selection unit 1002 as the inversion control information (step S1205). The determination unit 402a sets the code word disparity to the inversion code word disparity (step S1204) and updates the cumulative disparity stored in the cumulative disparity storage unit 403a by adding the code word disparity to the cumulative disparity (step S1207).

(3) Inversion Processing

Figure 16:
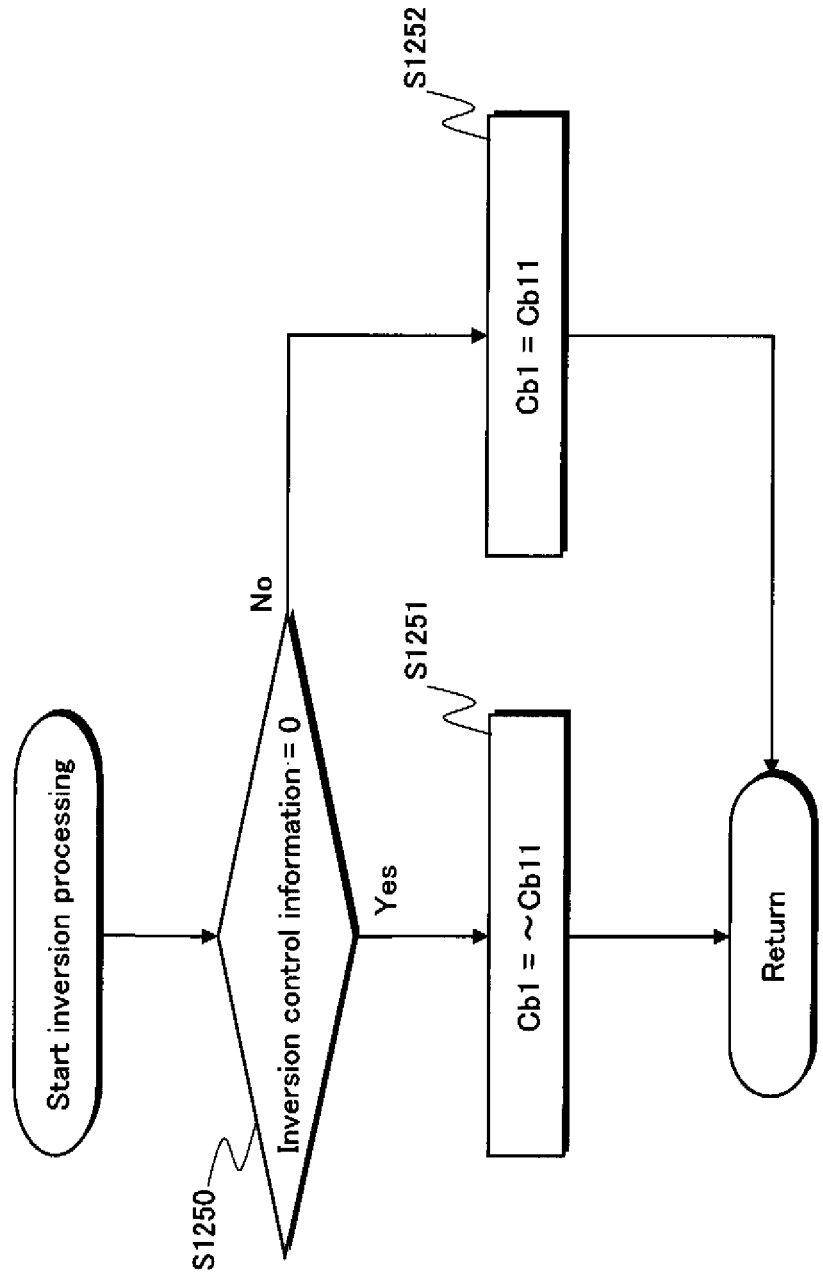
FIG. 16 is a flowchart showing the flow of inversion processing.

The following is an explanation of the inversion processing performed in step S735 of FIG. 14, with reference to the flowchart in FIG. 16.

The inversion unit 306a determines whether the value of the inversion control information input from the disparity control unit 305a is "0" or not (step S1250).

If the value of the inversion control information is determined to be "0" (step S1250: "Yes"), then the inversion unit 306a inverts the data sequence Cb11 input from the conversion unit 302a to generate Cb1, outputting the generated Cb1 to the combination unit 304a (step S1251).

If the value of the inversion control information is determined not to be "0", i.e. if it is "1" (step S1250: "No"), then the inversion unit 306a non-inverts the data sequence Cb11 input from the conversion unit 302a to generate Cb1, outputting the generated Cb1 to the combination unit 304a (step S1252). The operator ~ shown in the figure indicates inversion, as in Embodiment 1.

(4) Selection Processing

Figure 17:
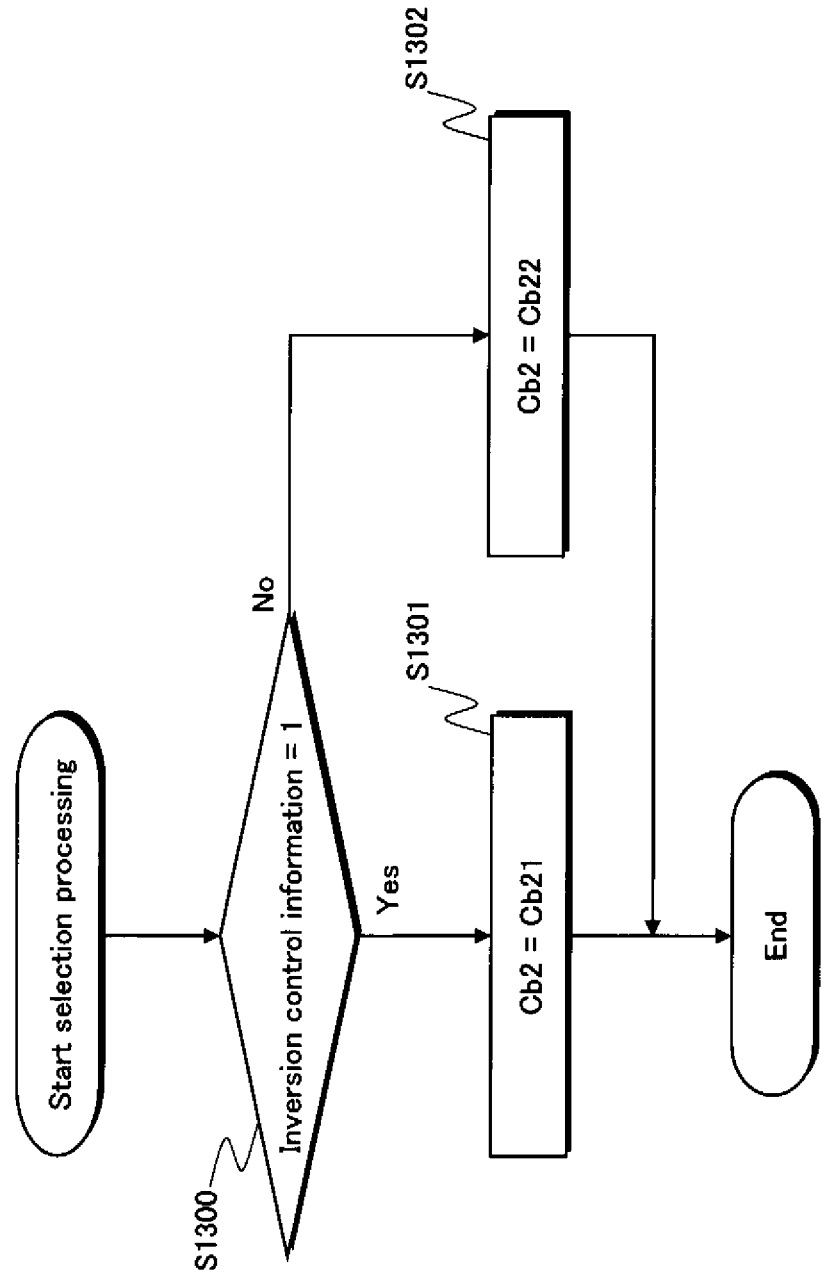
FIG. 17 is a flowchart showing the flow of selection processing.

The following is an explanation of the selection processing performed in step S740 of FIG. 14, with reference to the flowchart in FIG. 17.

The control bit selection unit 1002 determines whether the inversion control information input from the disparity control unit 305a is "1" (step S1300). If the inversion control information is determined to be "1" (step S1300: "Yes"), then the control bit selection unit 1002 outputs Cb21 to the combination unit 304a as Cb2 (step S1301). If the inversion control information is determined not to be "1", i.e. if the inversion control information is "0" (step S1300: "No"), then the control bit selection unit 1002 outputs Cb22 to the combination unit 304a as Cb2 (step S1302).

(5) Decoding Processing

The following is a simple explanation of the decoding processing performed by the reception device 110a.

Note that in the present explanation, up to four-level modulation processing is performed on the received signal.

As shown below, decoding processing is performed via procedures opposite to encoding processing.

The decoding unit 114a separates the demodulated data sequence, which has been four-level demodulated, into even-numbered bits and odd-numbered bits.

The decoding unit 114a separates the data sequence composed of odd-numbered bits into a plurality of blocks 10-bits each and determines, in accordance with an identification code attached to each block, whether the 10-bit block composed of even-numbered bits corresponding to each block was inverted. This identification code is a two control bit attached to the data sequence S2 by the transmission device 100a. When the control bits are "01", the corresponding 10-bit block composed of even-numbered bits was non-inverted, and when the control bits are "11", the corresponding 10-bit block composed of even-numbered bits was inverted.

For each block determined to have been inverted, the decoding unit 114a inverts the data sequence constituting the block and further applies 8B/10B decoding processing on the block after inversion, thereby reconstructing the data sequence S1. Also, for each block determined to have been non-inverted, i.e. blocks that were not inverted, the decoding unit 114a performs 8B/10B decoding processing on the block, thereby reconstructing the data sequence S1.

On the other hand, the decoding unit 114a extracts data sequences by stripping the control bits allocated in the most significant two bits of the 10-bit blocks composed of odd-numbered bits, thereby reconstructing the data sequence S2.

The decoding unit 114 reconstructs the transmitted data S by alternately arranging the data sequence S1 and data sequence S2.

2.4 Example of Operations

Figure 18:
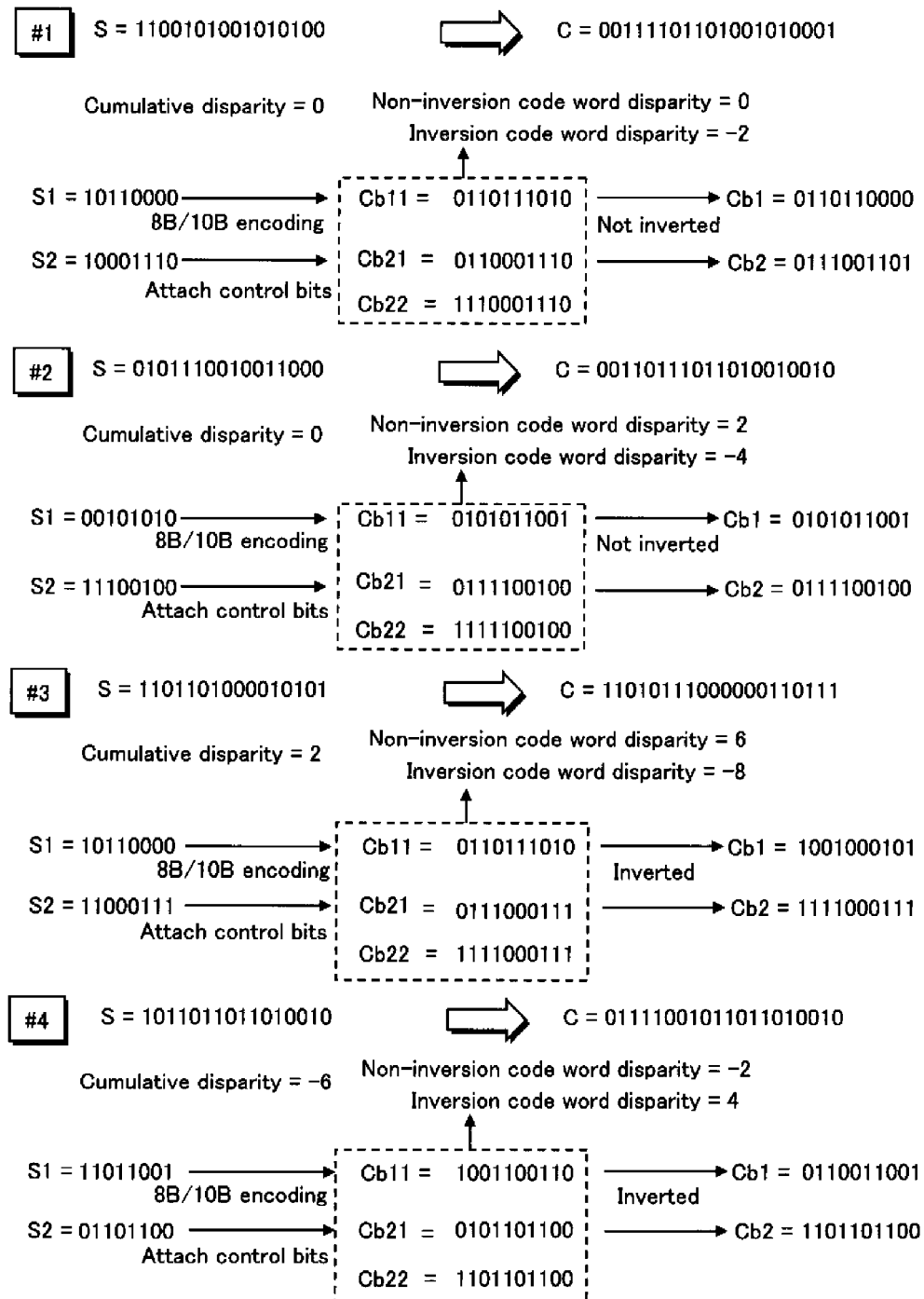
FIG. 18 shows a concrete example of procedures for encoding processing in Embodiment 2.

Explanation is provided for an example of operations in an embodiment of the present invention with reference to FIG. 18. The same data as shown in FIG. 7 is used as the data that is input (input data).

FIG. 18 shows an example of operations inside the encoding unit 101a when the data sequence shown in FIG. 8 is input into the encoding unit 101a in the order of block #1 through block #4.

The following explains the example of the operations of the encoding unit 101a in order, with reference to FIG. 18.

(Data Sequence #1)

First, data sequence #1 (S=1100101001010100) is input into the separation unit 300a. In the separation unit 300a, the data sequence is divided into data sequence S1 (=10110000) and data sequence S2 (=10001110).

The conversion unit 302a applies 8B/10B encoding to the data sequence S1 input from the separation unit 300a, thus generating a 10-bit data sequence Cb11 (=0110111010).

Meanwhile, the attachment unit 301a attaches a two control bit sequence "01" to the top of the data sequence S2 input from the separation unit 300a, thus generating data sequence Cb21 (=0110001110). Also, the attachment unit 301b attaches a two control bit sequence "11" to the top of the data sequence S2 input from the separation unit 300a, thus generating data sequence Cb22 (=1110001110).

The disparity control unit 305a calculates a non-inversion code word disparity and an inversion code word disparity from Cb11 input from the conversion unit 302a, Cb21 input from the attachment unit 301a, and Cb22 input from the attachment unit 301b. In this case, the value of the non-inversion code word disparity is 0, and the value of the inversion code word disparity is −2.

Since the value of the non-inversion code word disparity is 0, the value of the inversion code word disparity is −2, and the value of the cumulative disparity is an initial value of 0, the determination unit 402a calculates |D_chk1| to be 0 by taking the absolute value of the sum of the cumulative disparity and the non-inversion code word disparity. Next, since the value of the inversion code word disparity is −2 and the value of the cumulative disparity is an initial value of 0, the determination unit 402a calculates |D_chk2| to be 2 by taking the absolute value of the sum of the cumulative disparity and the inversion code word disparity. Since |D_chk1| is smaller than |D_chk2|, the determination unit 402a determines that non-inversion processing will be performed on the data sequence Cb11 and outputs 1 as the inversion control information to the inversion unit 306a and the control bit selection unit 1002. The determination unit 402a also sets the code word disparity to 0 and updates the value of the cumulative disparity as 0.

Since the value of the inversion control information input from the disparity control unit 305a is 1, the inversion unit 306a does not invert the data sequence Cb11 input from the conversion unit 302a, outputting Cb11 to the combination unit 304a as Cb1 (=0110110000). Since the value of the inversion control information input from the disparity control unit 305a is 1, the control bit selection unit 1002 selects Cb21, outputting Cb21 to the combination unit 304a as Cb2 (=0111001101). The combination unit 304a combines Cb1 and Cb2, thus generating encoded data sequence C (=00111101101001010001). The combination unit 304a then outputs the generated encoded data sequence C to the four-level modulation unit 102.

(Data Sequence #2)

Data sequence #2 (S=0101110010011000) is input into the separation unit 300a. In the separation unit 300a, the data sequence is divided into data sequence S1 (=00101010) and data sequence S2 (=11100100).

The conversion unit 302a applies 8B/10B encoding to the data sequence S1 input from the separation unit 300a, thus generating a 10-bit data sequence Cb11 (=0101011001).

Meanwhile, the attachment unit 301a attaches a two control bit sequence "01" to the top of the data sequence S2 input from the separation unit 300a, thus generating data sequence Cb21 (=0111100100). Also, the attachment unit 301b attaches a two control bit sequence "11" to the top of the data sequence S2 input from the separation unit 300a, thus generating data sequence Cb22 (=1111100100).

The disparity control unit 305*a* calculates a non-inversion code word disparity and an inversion code word disparity from Cb11 input from the conversion unit 302*a*, Cb21 input from the attachment unit 301*a*, and Cb22 input from the attachment unit 301*b*. In this case, the value of the non-inversion code word disparity is 2, and the value of the inversion code word disparity is −4.

Since the value of the non-inversion code word disparity is 2, the value of the inversion code word disparity is −4, and the value of the cumulative disparity is 0, the determination unit 402*a* calculates |D_chk1| to be 2 by taking the absolute value of the sum of the cumulative disparity and the non-inversion code word disparity. Next, since the value of the inversion code word disparity is −4 and the value of the cumulative disparity is 0, the determination unit 402*a* calculates |D_chk2| to be 4 by taking the absolute value of the sum of the cumulative disparity and the inversion code word disparity. Since |D_chk1| is smaller than |D_chk2|, the determination unit 402*a* determines that non-inversion processing will be performed on the data sequence Cb11 and outputs 1 as the inversion control information to the inversion unit 306*a* and the control bit selection unit 1002. The determination unit 402*a* also sets the code word disparity to 2 and updates the value of the cumulative disparity as 2.

Since the value of the inversion control information input from the disparity control unit 305*a* is 1, the inversion unit 306*a* does not invert the data sequence Cb11 input from the conversion unit 302*a*, outputting Cb11 (=0101011001) to the combination unit 304*a* as Cb1. Since the value of the inversion control information input from the disparity control unit 305*a* is 1, the control bit selection unit 1002 selects Cb21, outputting Cb21 to the combination unit 304*a* as Cb2 (=0111100100). The combination unit 304*a* combines Cb1 and Cb2, thus generating encoded data sequence C (=00110111011010010010). The combination unit 304*a* then outputs the generated encoded data sequence C to the four-level modulation unit 102.

(Data Sequence #3)

Data sequence #3 (S=1101101000010101) is input into the separation unit 300*a*. In the separation unit 300*a*, the data sequence is divided into data sequence S1 (=10110000) and data sequence S2 (=11000111).

The conversion unit 302*a* applies 8B/10B encoding to the data sequence S1 input from the separation unit 300*a*, thus generating a 10-bit data sequence Cb11 (=0110111010).

Meanwhile, the attachment unit 301*a* attaches a two control bit sequence "01" to the top of the data sequence S2 input from the separation unit 300*a*, thus generating data sequence Cb21 (=0111000111). Also, the attachment unit 301*b* attaches a two control bit sequence "11" to the top of the data sequence S2 input from the separation unit 300*a*, thus generating data sequence Cb22 (=1111000111).

The disparity control unit 305*a* calculates a non-inversion code word disparity and an inversion code word disparity from Cb11 input from the conversion unit 302*a*, Cb21 input from the attachment unit 301*a*, and Cb22 input from the attachment unit 301*b*. In this case, the value of the non-inversion code word disparity is 6, and the value of the inversion code word disparity is −8.

Since the value of the non-inversion code word disparity is 6, the value of the inversion code word disparity is −8, and the value of the cumulative disparity is 2, the determination unit 402*a* calculates |D_chk1| to be 8 by taking the absolute value of the sum of the cumulative disparity and the non-inversion code word disparity. Next, since the value of the inversion code word disparity is −8 and the value of the cumulative disparity is 2, the determination unit 402*a* calculates |D_chk2| to be 6 by taking the absolute value of the sum of the cumulative disparity and the inversion code word disparity. Since |D_chk2| is smaller than |D_chk1|, the determination unit 402*a* determines that inversion processing will be performed on the data sequence Cb11 and outputs 0 as the inversion control information to the inversion unit 306*a* and the control bit selection unit 1002. The determination unit 402*a* also sets the code word disparity to −8 and updates the value of the cumulative disparity as −6.

Since the value of the inversion control information input from the disparity control unit 305*a* is 0, the inversion unit 306*a* inverts the data sequence Cb11 input from the conversion unit 302*a* to generate Cb1 (=1001000101) which it outputs to the combination unit 304*a*.

Since the value of the inversion control information input from the disparity control unit 305*a* is 0, the control bit selection unit 1002 selects Cb22, outputting Cb22 to the combination unit 304*a* as Cb2 (=1111000111).

The combination unit 304*a* combines Cb1 and Cb2, thus generating encoded data sequence C (=11010111000000110111). The combination unit 304*a* then outputs the generated encoded data sequence C to the four-level modulation unit 102.

(Data Sequence #4)

Data sequence #4 (S=1011011011010010) is input into the separation unit 300*a*. In the separation unit 300*a*, the data sequence is divided into data sequence S1 (=11011001) and data sequence S2 (=01101100).

The conversion unit 302*a* applies 8B/10B encoding to the data sequence S1 input from the separation unit 300*a*, thus generating a 10-bit data sequence Cb11 (=1001100110).

Meanwhile, the attachment unit 301*a* attaches a two control bit sequence "01" to the top of the data sequence S2 input from the separation unit 300*a*, thus generating data sequence Cb21 (=0101101100). Also, the attachment unit 301*b* attaches a two control bit sequence "11" to the top of the data sequence S2 input from the separation unit 300*a*, thus generating data sequence Cb22 (=1101101100).

The disparity control unit 305*a* calculates a non-inversion code word disparity and an inversion code word disparity from Cb11 input from the conversion unit 302*a*, Cb21 input from the attachment unit 301*a*, and Cb22 input from the attachment unit 301*b*. In this case, the value of the non-inversion code word disparity is −2, and the value of the inversion code word disparity is 4.

Since the value of the non-inversion code word disparity is −2, the value of the inversion code word disparity is 4, and the value of the cumulative disparity is −6, the determination unit 402*a* calculates |D_chk1| to be 8 by taking the absolute value of the sum of the cumulative disparity and the non-inversion code word disparity. Next, since the value of the inversion code word disparity is 4 and the value of the cumulative disparity is −6, the determination unit 402*a* calculates |D_chk2| to be 2 by taking the absolute value of the sum of the cumulative disparity and the inversion code word disparity. Since |D_chk2| is smaller than |D_chk1|, the determination unit 402*a* determines that inversion processing will be performed on the data sequence Cb11 and outputs 0 as the inversion control information to the inversion unit 306*a* and the control bit selection unit 1002. The determination unit 402*a* also sets the code word disparity to 4 and updates the value of the cumulative disparity as −2.

Since the value of the inversion control information input from the disparity control unit 305*a* is 0, the inversion unit 306*a* inverts the data sequence Cb11 input from the conversion unit 302*a* to generate Cb1 (=0110011001) which it outputs to the combination unit 304*a*.

Since the value of the inversion control information input from the disparity control unit 305a is 0, the control bit selection unit 1002 selects Cb22, outputting Cb22 to the combination unit 304a as Cb2 (=1101101100).

The combination unit 304a combines Cb1 and Cb2, thus generating encoded data sequence C (= 0111100101101010010). The combination unit 304a then outputs the generated encoded data sequence C to the four-level modulation unit 102.

FIG. 19 shows the code word disparities and cumulative disparities generated by the encoding unit 101a from the data sequences shown in FIG. 8. The maximum and minimum values for the code word disparity output by the encoding unit 101a as shown in Embodiment 2 are ±14. Since the code word disparity is controlled in the inversion control unit 402a so as not to be the same code as the current cumulative disparity, the maximum and minimum values for the updated cumulative disparity are restricted to a range of ±14.

2.5 Regarding Two-Level Amplitude Modulation

The following is an explanation for when the transmission device 100a applies two-level amplitude modulation.

Upon receiving modulation designation data that designates two-level amplitude modulation from the reception device 110a, the transmission device 100a prevents the attachment units 301a and 301b and the inversion control unit 303a from operating. That is, only the encoding unit 101a, separation unit 300a, conversion unit 302a, and combination unit 304a operate. Note that the operations of each structural element are the same as when performing two-level amplitude modulation in Embodiment 1, and thus an explanation thereof is omitted.

2.6 Summary of Embodiment 2

As described above, the maximum and minimum values of the cumulative disparity in Embodiment 2 are ±14, which are smaller than the maximum and minimum values of the cumulative disparity in Embodiment 1, i.e. ±20. In other words, Embodiment 2 is capable of making the dynamic range of the cumulative disparity smaller than in Embodiment 1 and of improving the DC balance. The maximum and minimum values of the cumulative disparity are determined by the maximum and minimum values of the code word disparity. Limiting the maximum and minimum values of the code word disparity in Embodiment 2 to ±14 contributes towards reducing the dynamic range of the cumulative disparity and to improving the DC balance.

The reason why the range of the code word disparity in Embodiment 2 is narrower than the range of the code word disparity in Embodiment 1 is that the encoding unit 101a in Embodiment 2 applies 8B/10B encoding to the even-numbered bits of the data sequence S1. The 8B/10B encoding scheme is characterized by the run length of an encoded 10-bit sequence being five or less, and by the difference in the number of "1" bits and "0" bits being two or less. Whether the disparity of each symbol input into the four-level modulation unit 102 is positive or negative is determined by the even-numbered bits. In Embodiment 2, since 8B/10B encoding is applied to data sequence S1, which consists of even-numbered bits, the 10-bit data sequence Cb1 input into the combination unit 304a is restricted so that the difference in the number of "1" bits and of "0" bits is two or less. As a result, when the code disparity is positive, the disparity of at least four symbols is negative, balancing out the positive disparity of the remaining six symbols. Therefore, compared to when 8B/10B encoding is not applied to the data sequence S1 consisting of even-numbered bits, the range of the code word disparity is reduced. Similarly, when the code disparity is negative, the disparity of at least four symbols is positive, balancing out the negative disparity of the remaining six symbols. Therefore, compared to when 8B/10B encoding is not applied to the data sequence S1 consisting of even-numbered bits, the range of the code word disparity is reduced.

In Embodiment 2, by thus applying encoding to the bits in the bit sequence input into the four-level modulation unit 102 that determine whether the disparity of each symbol will be positive or negative, the encoding limiting the difference in the number of "1" bits and "0" bits to be a predetermined value or less, as does 8B/10B encoding, it is possible to reduce the dynamic range of the cumulative disparity and to improve the DC balance.

3. Modifications

The present invention is not limited to the above embodiments, and may for example be modified in the following ways.

3.1 Modification 1

In Embodiment 1 above, the separation unit 300 separates the 16-bit transmission data sequence S (=[S(0), S(1), ..., S(k), ..., S(15)]) into an eight-bit data sequence S1 composed of even-numbered bits (=[S(0), S(2), ..., S(2k), ..., S(14)]) and an eight-bit data sequence S2 composed of odd-numbered bits (=[S(1), S(3), ..., S(2k–1), ..., S(15)]), but the present invention is not limited in this way.

Other separation methods may be used. For example, the separation unit 300 may separate the input 16-bit data sequence S into a data sequence S1 composed of the most significant eight bits (=[S(0), S(1), S(2), ..., S(7)]) and a data sequence S2 composed of the least significant eight bits (=[S(8), S(9), S(10), ..., S(15)]).

In this case, as in Embodiment 1, the attachment unit 301 adds control bits "01" to the data sequence S1 (=[S(0), S(1), S(2), ..., S(7)]) to generate data sequence Ca12 (=[0, 1, S(0), S(1), S(2), ..., S(7)]). The conversion unit 302 applies 8B/10B encoding to data sequence S2 (=[S(8), S(9), S(10), ..., S(15)]) to generate data sequence Ca2 (=[Ca(0), Ca(1), ..., Ca(9)]). The inversion control unit 303 determines whether or not to invert the data sequence Ca12 using the data sequence Ca12 (=[0, 1, S(0), S(1), S(2), ..., S(7)]), the data sequence Ca2 (=[Ca(0), Ca(1), ..., Ca(9)]), and the cumulative disparity. In accordance with the determination results, the inversion control unit 303 also performs either inversion or non-inversion on the data sequence Ca12 to generate the data sequence Ca1. Operating as in Embodiment 1, the combination unit 304 generates an encoded data sequence C from the data sequences Ca1 and Ca2.

By the same procedures as in Embodiment 1, upon reconstructing the data sequences S1 and S2, the reception device 110 reconstructs the 16-bit data sequence S whose most significant eight bits are the data sequence S1 and whose least significant eight bits are the data sequence S2.

As above, in Embodiment 2 as well, the separation unit 300 may separate the input 16-bit data sequence S into a data sequence S1 composed of the most significant eight bits (=[S(0), S(1), S(2), ..., S(7)]) and a data sequence S2 composed of the least significant eight bits (=[S(8), S(9), S(10), ..., S(15)]). In this case, the transmission device 100a generates data sequences Cb1 and Cb2 from the two separated data sequences S1 (=[S(0), S(1), S(2), ..., S(7)]) and S2 (=[S(8), S(9), S(10), ..., S(15)]). Using the same combination method as in Embodiment 2, the combination unit 304a generates an encoded data sequence C. By the same procedures as in Embodiment 1, upon reconstructing the data sequences S1 and S2, the reception device 110a reconstructs the 16-bit data sequence S whose most significant eight bits are the data sequence S1 and whose least significant eight bits are the data sequence S2.

3.2 Modification 2

In Embodiments 1 and 2, the data sequences to which 8B/10B encoding was applied and to which control bits were attached were different, but 8B/10B encoding may be performed on the same data sequence to which control bits are attached.

Figure 20:
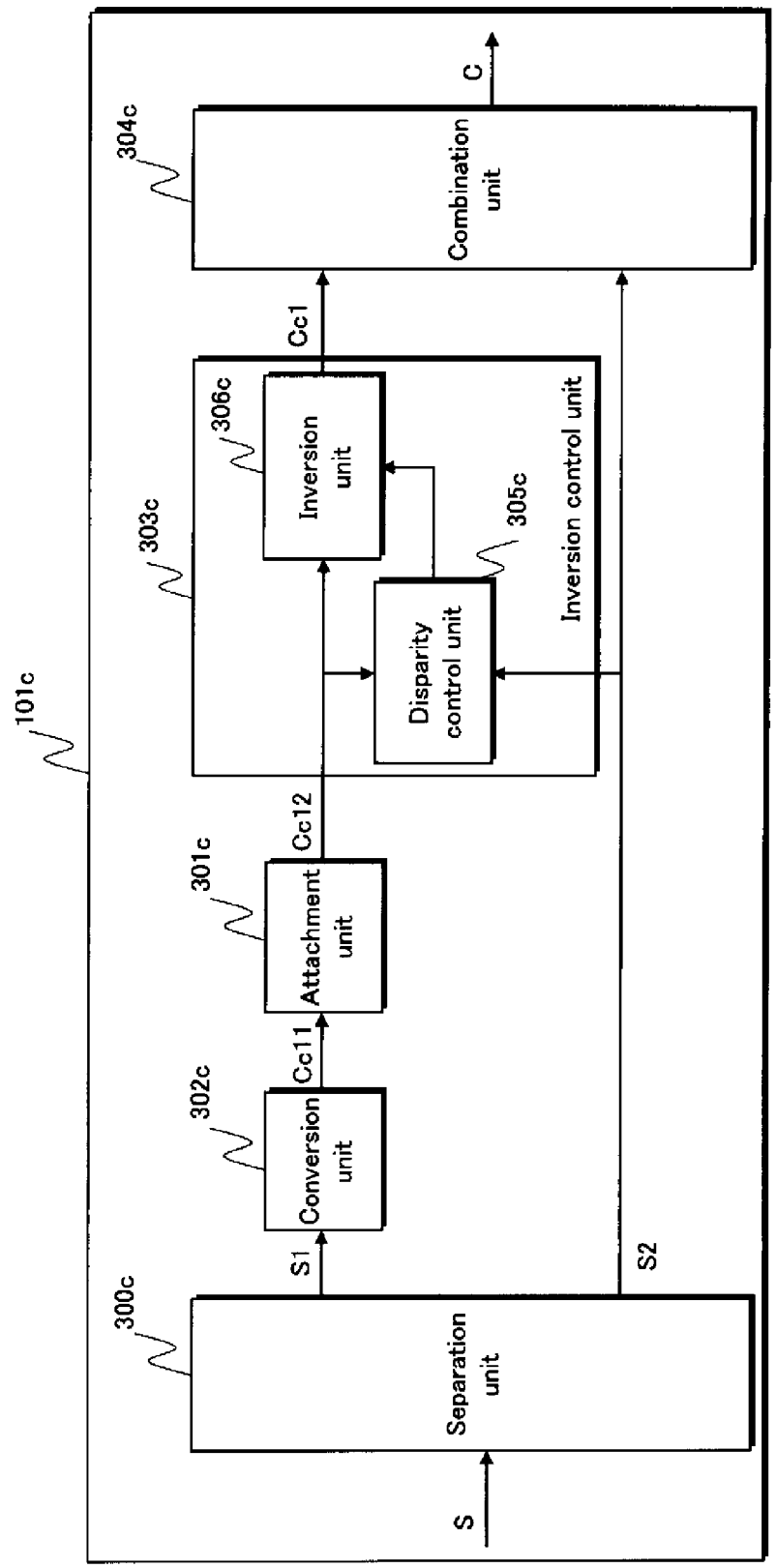
FIG. 20 is a block diagram showing the structure of an encoding unit 101c.

FIG. 20 shows an encoding unit 101c.

As shown in FIG. 20, the encoding unit 101c is composed of a separation unit 300c, attachment unit 301c, conversion unit 302c, inversion control unit 303c, and combination unit 304c. Also, the inversion control unit 303c is composed of a disparity control unit 305c and an inversion unit 306c.

The separation unit 300c receives a 20-bit transmission data sequence S (=[S(0), S(1), ..., S(k), ..., S(19)]) and separates the data sequence S into a data sequence S1 composed of the most significant eight bits (=[S(0), S(1), S(2), ..., S(7)]) and a data sequence S2 composed of the least significant twelve bits (=[S(8), S(9), ..., S(19)]). The separation unit 300c outputs the data sequence S1 to the conversion unit 302c and outputs the data sequence S2 to the disparity control unit 305c and the combination unit 304c.

The conversion unit 302c applies 8B/10B encoding to the data sequence S1 to generate a 10-bit data sequence Cc11 (=[Cc(0), Cc(1), ..., Cc(9)]), outputting the generated data sequence Cc11 to the attachment unit 301c.

The attachment unit 301c attaches two control bits "0", "1" to the top of the data sequence Cc11 input from the separation unit 300c, thus generating a 12-bit data sequence Cc12 (=[0, 1, Cc(0), Cc(1), ..., Cc(9)]). The attachment unit 301c then outputs the generated data sequence Cc12 to the disparity control unit 305c and the inversion unit 306c.

Using the data sequences Cc12 and S2, the disparity control unit 305c determines whether to invert or non-invert the data sequence Cc12 with the same determination method as in Embodiment 1.

In accordance with the value indicated by the inversion control information, i.e. the determination results from the disparity control unit 305c, the inversion unit 306c performs either inversion or non-inversion control on the data sequence Cc12 to generate data sequence Cc1.

With the same combination method as in Embodiment 1, the combination unit 304c combines the data sequences Cc1 and S2 to generate a 24-bit encoded data sequence C. Specifically, the combination unit 304c outputs a 24-bit data sequence C in which a bit sequence after inversion control by the inversion control unit 303c and the data sequence S2 are alternately arranged.

Subsequent operations are the same as in Embodiment 1, and thus a description thereof is omitted.

Also, operations of the reception device are the same as the operations shown in Modification 1, and therefore a description thereof is omitted.

3.3 Modification 3

In Embodiments 1 and 2 above, explanation was provided using an example of multilevel (four ($2^2$) level) amplitude modulation in which each symbol consists of two bits, but the present invention is not limited in this way.

The present invention may be adapted to $2^n$ level amplitude modulation (n being an integer greater than or equal to two).

(1) Concrete Example of Modifications to Embodiment 1

As a concrete example of modifications to Embodiment 1, the following is an explanation of performing n=3, i.e. eight-level amplitude modulation.

Figure 21:
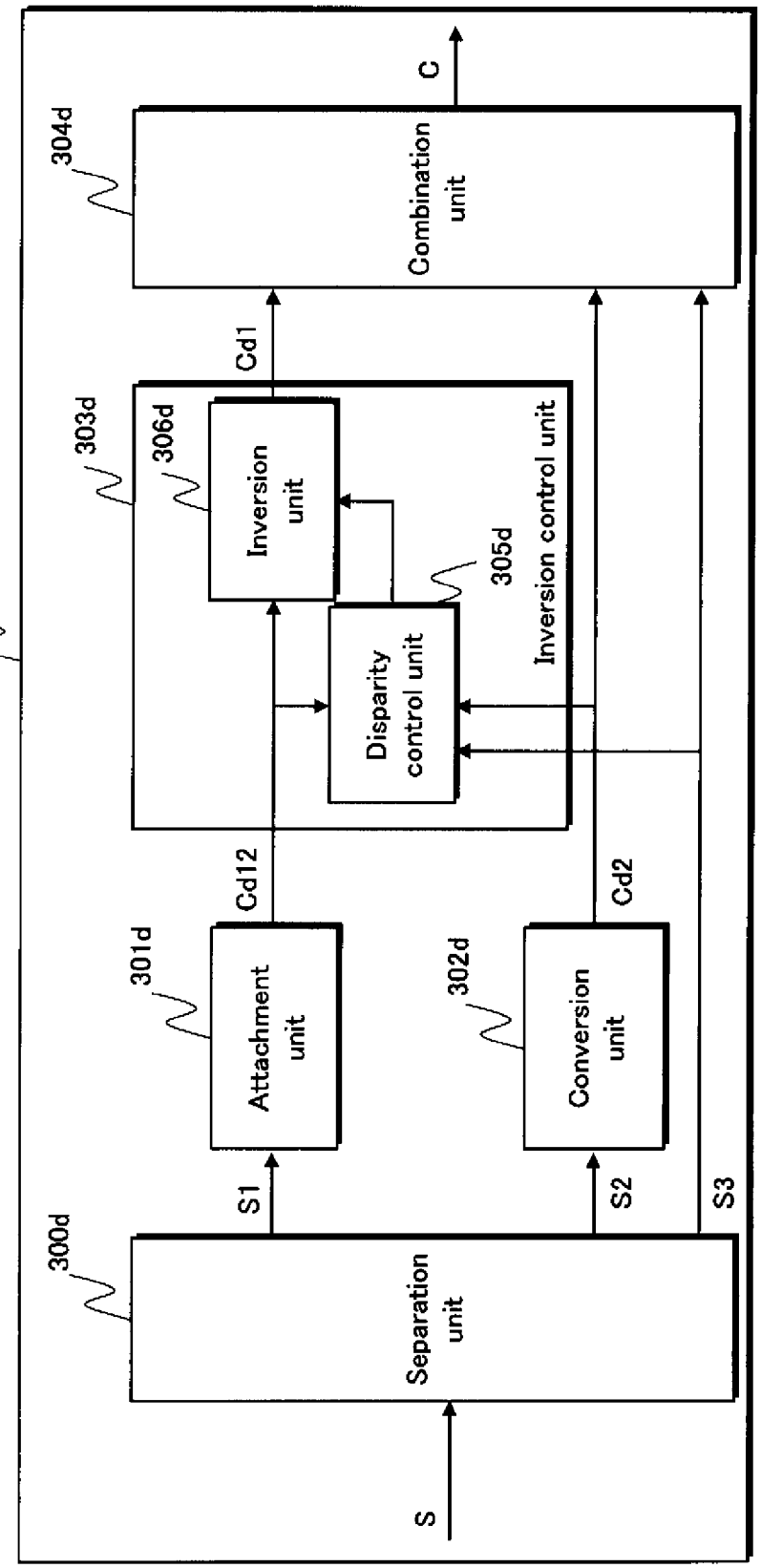
FIG. 21 is a block diagram showing the structure of an encoding unit 101d.

In this case, as shown in FIG. 21, an encoding unit 101d is composed of a separation unit 300d, attachment unit 301d, conversion unit 302d, inversion control unit 303d, and combination unit 304d. Also, as shown in FIG. 21, the inversion control unit 303d is composed of a disparity control unit 305d and an inversion unit 306d.

(1-1) Separation Unit 300d

A 26 (=8×3+2) bit transmission data sequence S (=[S(0), S(1), ..., S(k), ..., S(25)]) input into an attachment unit 101d is input into the separation unit 300d. The separation unit 300d separates the input transmission data sequence S into an eight-bit data sequence S1 consisting of the most significant eight bits (=[S(0), S(1), S(2), ..., S(7)]), an eight-bit data sequence S2 consisting of the ninth through $16^{th}$ bits (=[S(8), S(9), S(10), ..., S(15)]), and a 10-bit data sequence S3 consisting of the remaining bits (=[S(16), S(17), S(18), ..., S(25)]). The separation unit 300d then outputs the data sequence S1 to the attachment unit 301d, the data sequence S2 to the conversion unit 302d, and the data sequence S3 to the disparity unit 305d and the combination unit 304d.

(1-2) Attachment Unit 301d

As in Embodiment 1, the attachment unit 301d attaches two control bits "01" to the top of the data sequence S1, thus generating a 10-bit data sequence Cd12 (=[0, 1, S(0), S(1), ..., S(7)]). The attachment unit 301d then outputs the generated 10-bit data sequence Cd12 to the disparity control unit 305d and the inversion unit 306d.

(1-3) Conversion Unit 302d

As in Embodiment 1, the conversion unit 302d applies the 8B/10B encoding scheme to the data sequence S2 to generate a 10-bit data sequence Cd2 (=[Cd(0), Cd(1), ..., Cd(9)]), outputting the generated data sequence Cd2 to the disparity control unit 305d and the combination unit 304d.

(1-4) Inversion Control Unit 303d

As in Embodiment 1, in order to guarantee DC balance, the inversion control unit 303d performs either inversion or non-inversion on the input data sequence Cd12.

The following is an explanation of the disparity control unit 305d and the inversion unit 306d.

(Disparity Control Unit 305d)

Figure 22:
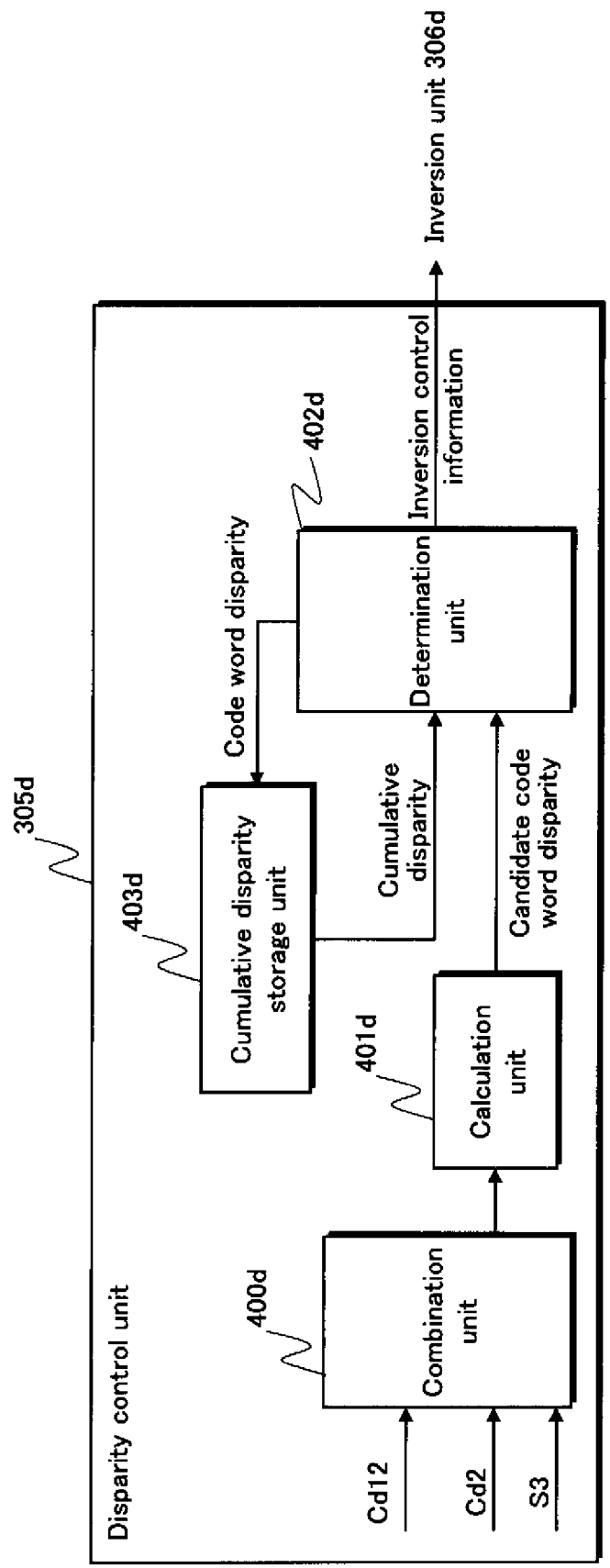
FIG. 22 is a block diagram showing the structure of a disparity control unit 305d.

In accordance with the input data sequences Cd12, Cd2, and S3, the disparity control unit 305d determines whether to invert or non-invert the data sequence Cd12. In accordance with the determination results, the disparity control unit 305d generates inversion control information, outputting the generated inversion control information to the inversion unit 306d. As shown in FIG. 22, the disparity control unit 305d includes a combination unit 400d, calculation unit 401d, determination unit 402d, and cumulative disparity storage unit 403d.

Since the cumulative disparity storage unit 403d is the same as Embodiment 1, an explanation thereof is omitted here.

The combination unit 400d alternately combines the data sequence Cd12 (=[0, 1, S(0), S(2), ..., S(7)]), the data sequence Cd2 (=[Cd2(0), Cd2(1), ..., Cd2(9)]), and the data sequence S3 (=[S(16), S(17), ..., S(25)]) to generate a 30-bit data sequence Co (=[0, Cd2(0), S(16), 1, Cd2(1), S(17), S(0), Cd2(2), S(18), ..., S(7), Cd2(9), S(25)]). The combination unit 400*d* outputs the generated data sequence Co to the calculation unit 401*d*.

The calculation unit 401*d* divides the data sequence Co into symbols (three bits each), seeks the disparity corresponding to the value of each symbol thus divided, and calculates the total sum of the resulting disparities of the ten symbols as a candidate code word disparity. In this modification, mapping is performed so that a symbol value of "000" is assigned a disparity of −7, a symbol value of "001" is assigned a disparity of −5, a symbol value of "011" is assigned a disparity of −3, a symbol value of "010" is assigned a disparity of −1, a symbol value of "110" is assigned a disparity of +1, a symbol value of "111" is assigned a disparity of +3, a symbol value of "101" is assigned a disparity of +5, and a symbol value of "100" is assigned a disparity of +7. The calculation unit 401*d* outputs the calculated candidate code word disparity to the determination unit 402*d*.

Using the same method as in Embodiment 1, the determination unit 402*d* determines whether to invert or non-invert the data sequence Cd12. In accordance with the determination results, the determination unit 402*d* generates inversion control information and a code word disparity. Since the methods for generating inversion control information and code word disparity are the same as in Embodiment 1, an explanation thereof is omitted. The determination unit 402*d* outputs the generated inversion control information to the inversion unit 306*d* and updates the cumulative disparity stored in the cumulative disparity storage unit 403*d* by adding the generated code word disparity to the cumulative disparity.

(Inversion Unit 306D)

The inversion unit 306*d* generates a 10-bit data sequence Cd1 (=[Cd1(0), Cd1(1), ..., Cd1(9)]) by either performing inversion or non-inversion processing on the data sequence Cd12 in accordance with the inversion control information. The inversion unit 306*d* outputs the generated data sequence Cd1 to the combination unit 304*d*.

(1-5) Combination Unit 304*d*

By alternately combining the data sequence Cd1 (=[Cd1(0), Cd1(1), ..., Cd1(9)]), the data sequence Cd2 (=[Cd2(0), Cd2(1), ..., Cd2(9)]), and the data sequence S3 (=[S(16), S(17), ..., S(25)]), the combination unit 304*d* generates a 30-bit encoded data sequence C (=[Cd1(0), Cd2(0), S(16), Cd1(1), Cd2(1), S(17), ..., Cd1(9), Cd2(9), S(25)]). The combination unit 304*d* outputs the encoded data sequence C to a modulation unit that performs eight-level modulation.

(1-6) Reception Device

The reception device only differs from Embodiment 1 in that one symbol is three bits; other processing follows similar procedures as in Embodiment 1. Namely, upon reconstructing the data sequences S1, S2, and S3, the reception device reconstructs the 26-bit data sequence S whose most significant eight bits are the data sequence S1, whose middle eight bits are the data sequence S2, and whose least significant 10 bits are the data sequence S3.

(1-7) Summary

From the above description, it is clear that when performing $2^n$ level amplitude modulation, the following operations are performed.

The separation unit in the transmission device separates an 8×n+2 (n−2) bit data sequence into first and second eight-bit data sequences and n−2 10-bit data sequences.

The attachment unit attaches two control bits to the first data sequence to generate a 10-bit attached data sequence.

The conversion unit applies 8B/10B encoding processing to the second data sequence to generate a 10-bit encoded data sequence.

The combination unit in the disparity control unit alternately combines the attached data sequence, the encoded data sequence, and the n−2 10-bit data sequences to generate an 8×n+2n bit data sequence Co. The calculation unit calculates a candidate code word disparity for the data sequence Co. The determination unit determines whether to perform inversion using the same determination method as in Embodiment 1 and generates inversion control information and a code word disparity using the same generation methods for inversion control information and code word disparity as in Embodiment 1. The determination unit then updates the cumulative disparity using the same updating method as in Embodiment 1.

In accordance with the value shown by the inversion control information, the inversion unit performs inversion or non-inversion on the attached data sequence to generate a data sequence C1.

The combination unit, which corresponds to the combination unit 304 in Embodiment 1, generates an 8×n+2n bit data sequence C by alternately combining the data sequence C1, encoded data sequence, and n−2 10-bit data sequences.

(2) Concrete Example of Modifications to Embodiment 2

As a concrete example of modifications to Embodiment 2, the following is an explanation of performing n=3, i.e. eight-level amplitude modulation.

Figure 23:
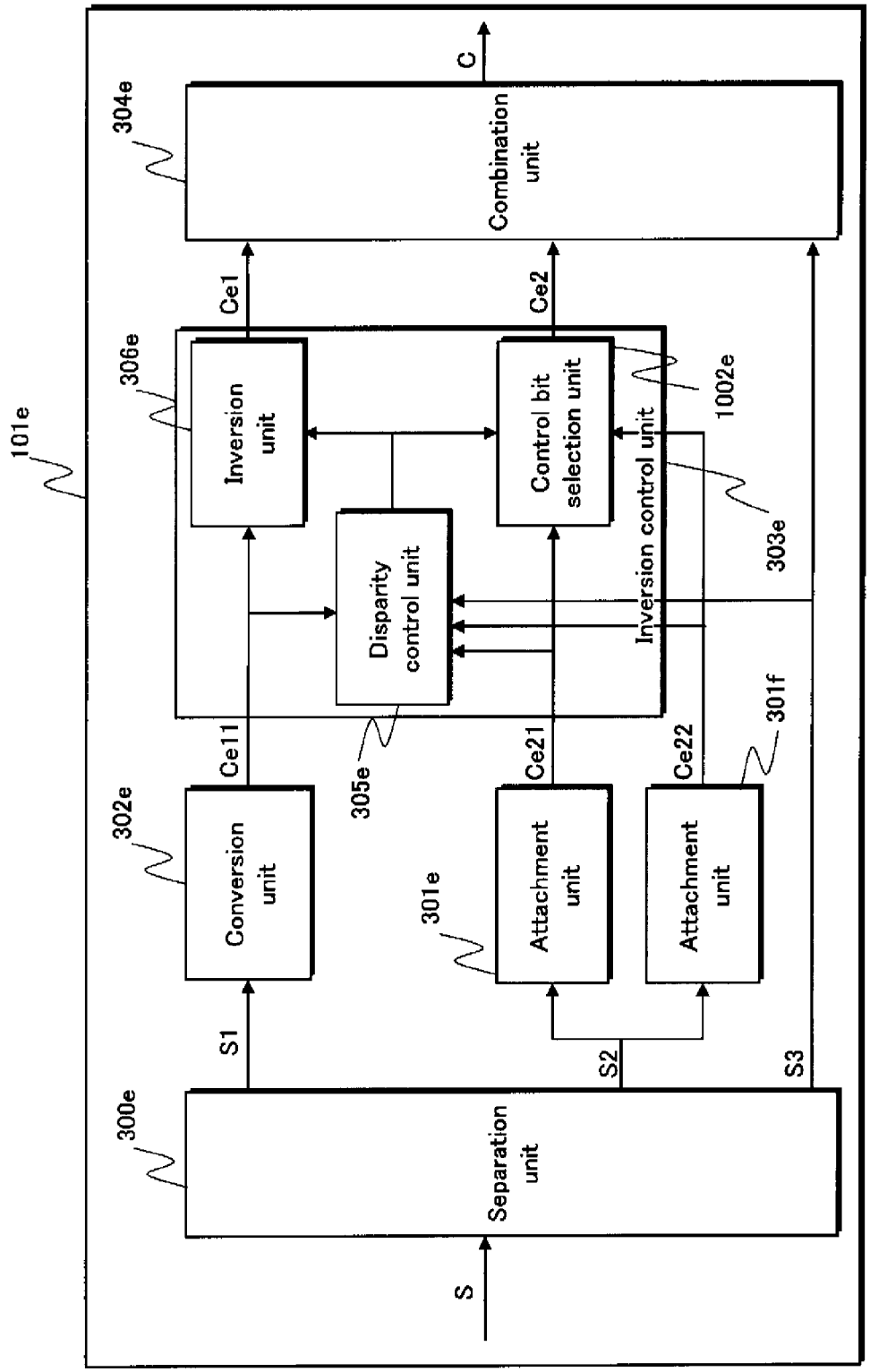
FIG. 23 is a block diagram showing the structure of an encoding unit 101e.

In this case, as shown in FIG. 23, an encoding unit 101*e* includes a separation unit 300*e*, attachment units 301*e* and 301*f*, conversion unit 302*e*, inversion control unit 303*e*, and combination unit 304*e*. Also, as shown in FIG. 23, the inversion control unit 303*e* includes a disparity control unit 305*e* and an inversion unit 306*e*.

(2-1) Separation Unit 300*e*

A 26 (=8×3+2) bit transmission data sequence S (=[S(0), S(1), ..., S(k), ..., S(25)]) input into an attachment unit 101*e* is input into the separation unit 300*e*. The separation unit 300*e* separates the input transmission data sequence S into an eight-bit data sequence S1 consisting of the most significant eight bits (=[S(0), S(1), S(2), ..., S(7)]), an eight-bit data sequence S2 consisting of the ninth through 16$^{th}$ bits (=[S(8), S(9), S(10), ..., S(15)]), and a 10-bit data sequence S3 consisting of the remaining bits (=[S(16), S(17), S(18), ..., S(25)]). The separation unit 300*e* then outputs the data sequence S1 to the conversion unit 302*e*, the data sequence S2 to the attachment units 301*e* and 301*f*, and the data sequence S3 to the disparity unit 305*e* and the combination unit 304*e*.

(2-2) Conversion Unit 302*e*

The conversion unit 302*e* applies the 8B/10B encoding scheme to the data sequence S1 to generate a 10-bit data sequence Ce11 (=[Ce11(0), Ce11(1), ..., Ce11(9)]), outputting the generated data sequence Ce11 to the disparity control unit 305*e* and the inversion unit 306*e*.

(2-3) Attachment Units 301*e*, 301*f*

The attachment unit 301*e* attaches two control bits "0", "1" to the data sequence S2, thus generating a 10-bit data sequence Ce21 (=[0, 1, S(8), S(9), S(10), ..., S(15)]). The attachment unit 301*e* then outputs the generated 10-bit data sequence Ce21 to the disparity control unit 305*e* and the control bit selection unit 1002*e*.

The attachment unit 301*f* attaches two control bits "1", "1" to the data sequence S2, thus generating a 10-bit data sequence Ce22 (=[1, 1, S(8), S(9), S(10), ..., S(15)]). The attachment unit 301*f* then outputs the generated 10-bit data sequence Ce22 to the disparity control unit 305*e* and the control bit selection unit 1002*e*.

(2-4) Inversion Control Unit 303e

As in Embodiment 2, in order to guarantee DC balance, the inversion control unit 303e performs either inversion or non-inversion on the input data sequence Ce11.

The following is an explanation of the disparity control unit 305e and the inversion unit 306e.

(Disparity Control Unit 305E)

In accordance with the input data sequences Ce11, Ce21, Ce22, and S3, the disparity control unit 305e determines whether to invert or non-invert the data sequence Ce11. In accordance with the determination results, the disparity control unit 305e generates inversion control information, outputting the generated inversion control information to the inversion unit 306e and the control bit selection unit 1002e.

Figure 24:
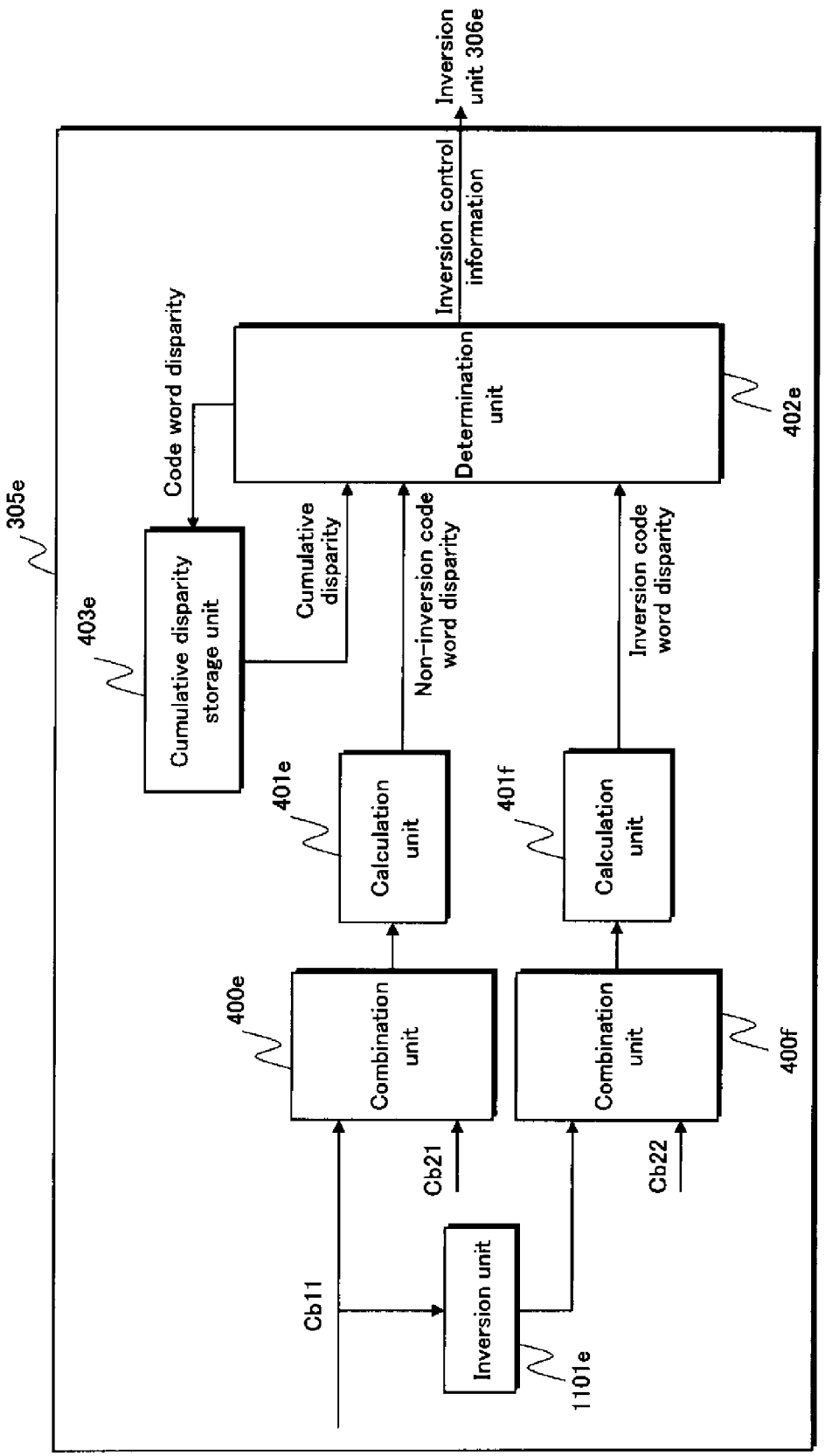
FIG. 24 is a block diagram showing the structure of a disparity control unit 305e.

As shown in FIG. 24, the disparity control unit 305e is composed of an inversion unit 1101e, combination units 400e and 400f, calculation units 401e and 401f, determination unit 402e, and cumulative disparity storage unit 403e.

Since the cumulative disparity storage unit 403e is the same as Embodiment 1, an explanation thereof is omitted here.

The inversion unit 1101e inverts the data sequence Ce11 to generate Ce11' (=[Ce11'(0), Ce11'(1), ..., Ce11'(9)]). The inversion unit 1101e outputs the generated Ce11' to the combination unit 400f.

The combination unit 400e alternately combines the data sequence Ce11 (=[Ce11(0), Ce11(1), ..., Ce11(9)]), the data sequence Ce21 (=[0, 1, S(8), S(9), S(10), ..., S(15)]) input from the attachment unit 301e, and the data sequence S3 (=[S(16), S(17), ..., S(25)]) to generate a 30-bit data sequence Ce31 (=[Ce11(0), 0, S(16), Ce11(1), 1, S(17), ..., Ce11(9), S(15), S(25)]). The combination unit 400e outputs the generated data sequence Ce31 to the calculation unit 401e.

The combination unit 400f alternately combines the data sequence Ce11' (=[Ce11'(0), Ce11'(1), ..., Ce11'(9)]), the data sequence Ce22 (=[1, 1, S(8), S(9), S(10), ..., S(15)]) input from the attachment unit 301f, and the data sequence S3 (=[S(16), S(17), ..., S(25)]) to generate a 30-bit data sequence Ce32 (=[Ce11'(0), 1, S(16), Ce11'(1), 1, S(17), ..., Ce11'(9), S(15), S(25)]). The combination unit 400f outputs the generated data sequence Ce32 to the calculation unit 401f.

The calculation unit 401e divides the data sequence Ce31 into symbols (three bits each), seeks the disparity corresponding to the value of each symbol thus divided, and calculates the total sum of the resulting disparities of the ten symbols as a non-inversion code word disparity. In this modification, mapping is performed so that a symbol value of "000" is assigned a disparity of −7, a symbol value of "001" is assigned a disparity of −5, a symbol value of "011" is assigned a disparity of −3, a symbol value of "010" is assigned a disparity of −1, a symbol value of "110" is assigned a disparity of +1, a symbol value of "111" is assigned a disparity of +3, a symbol value of "101" is assigned a disparity of +5, and a symbol value of "100" is assigned a disparity of +7. The calculation unit 401e outputs the calculated non-inversion code word disparity to the determination unit 402e.

The calculation unit 401f divides the data sequence Ce32 into symbols (three bits each) as does the calculation unit 401e, seeks the disparity corresponding to the value of each symbol thus divided, and calculates the total sum of the resulting disparities of the ten symbols as an inversion code word disparity. Disparities for the three-bit values are allocated in the same way as above.

In accordance with the non-inversion code word disparity, the inversion code word disparity, and the cumulative disparity stored in the cumulative disparity storage unit 403e, the determination unit 402e determines whether to have the data sequence Ce11 inverted or non-inverted in the inversion unit 306e.

In accordance with the non-inversion code word disparity, the inversion code word disparity, and the cumulative disparity, the determination unit 402e selects one of the data sequences Ce21 and Ce22. Note that the determination method and selection method are the same as in Embodiment 2, and thus an explanation thereof is omitted.

The determination unit 402e outputs generated inversion control information to the inversion unit 306e and the control bit selection unit 1002e and updates the cumulative disparity by adding the generated code word disparity to the cumulative disparity stored in the cumulative disparity storage unit 403e.

The inversion unit 306e generates a 10-bit data sequence Ce1 in the same way as in Embodiment 2 by either performing inversion or non-inversion processing on the data sequence Ce11 in accordance with the inversion control information. The inversion unit 306e outputs the generated data sequence Ce1 to the combination unit 304e.

In accordance with the inversion control information, the control bit selection unit 1002e selects either the data sequence Ce21 or Ce22, outputting the selected data sequence to the combination unit 304e as Ce2.

(2-5) Combination Unit 304e

The combination unit 304e generates a 30-bit encoded data sequence C by alternately combining the data sequences Ce1, Ce2, and S3. The combination unit 304e outputs the generated encoded data sequence C to a modulation unit that performs eight-level modulation.

(2-6) Reception Device

The reception device only differs from Embodiment 2 in that one symbol is three bits; other processing follows similar procedures as in Embodiment 2. Namely, upon reconstructing the data sequences S1, S2, and S3, the reception device reconstructs the 26-bit data sequence S whose most significant eight bits are the data sequence S1, whose middle eight bits are the data sequence S2, and whose least significant 10 bits are the data sequence S3.

(2-7) Summary

From the above description, it is clear that when performing $2^n$ level amplitude modulation, the following operations are performed.

The separation unit in the transmission device separates an 8×n+2 (n−2) bit data sequence into first and second eight-bit data sequences and n−2 10-bit data sequences.

The conversion unit applies 8B/10B encoding processing to the first data sequence to generate a 10-bit encoded data sequence.

The attachment units attach two control bits "01" to the second data sequence to generate a first 10-bit attached data sequence and attach two control bits "11" to the second data sequence to generate a second 10-bit attached data sequence.

The first combination unit in the disparity control unit (corresponding to combination unit 400e above) alternately combines the encoded data sequence, the first attached data sequence, and the n−2 10-bit data sequences to generate an 8×n+2n bit data sequence Ce31.

The second combination unit (corresponding to combination unit 400f above) alternately combines the inverted encoded data sequence, the second attached data sequence, and the n−2 10-bit data sequences to generate an 8×n+2n bit data sequence Ce32.

The first calculation unit (corresponding to calculation unit 401e above) calculates a non-inversion code word disparity for the data sequence Ce31.

The second calculation unit (corresponding to calculation unit 401f above) calculates an inversion code word disparity for the data sequence Ce32.

The determination unit determines whether to perform inversion using the same determination method as in Embodiment 2 and generates inversion control information and a code word disparity using the same generation methods for inversion control information and code word disparity as in Embodiment 2. The determination unit then updates cumulative disparity using the same updating method as in Embodiment 2.

In accordance with the value shown by the inversion control information, the control bit selection unit selects one attached data sequence from either the first or the second attached data sequence, as in Embodiment 2.

In accordance with the value shown by the inversion control information, the inversion unit performs either inversion or non-inversion control on the converted data sequence to generate a data sequence C1.

The combination unit, which corresponds to the combination unit 304e, generates an 8×n+2n bit data sequence C by alternately combining the data sequence C1, selected attached data sequence, and n−2 10-bit data sequences.

(3) Concrete Example of Modifications to Modification 2

As a concrete example of modifications to Modification 2, the following is an explanation of performing n=3, i.e. eight-level amplitude modulation.

Figure 25:
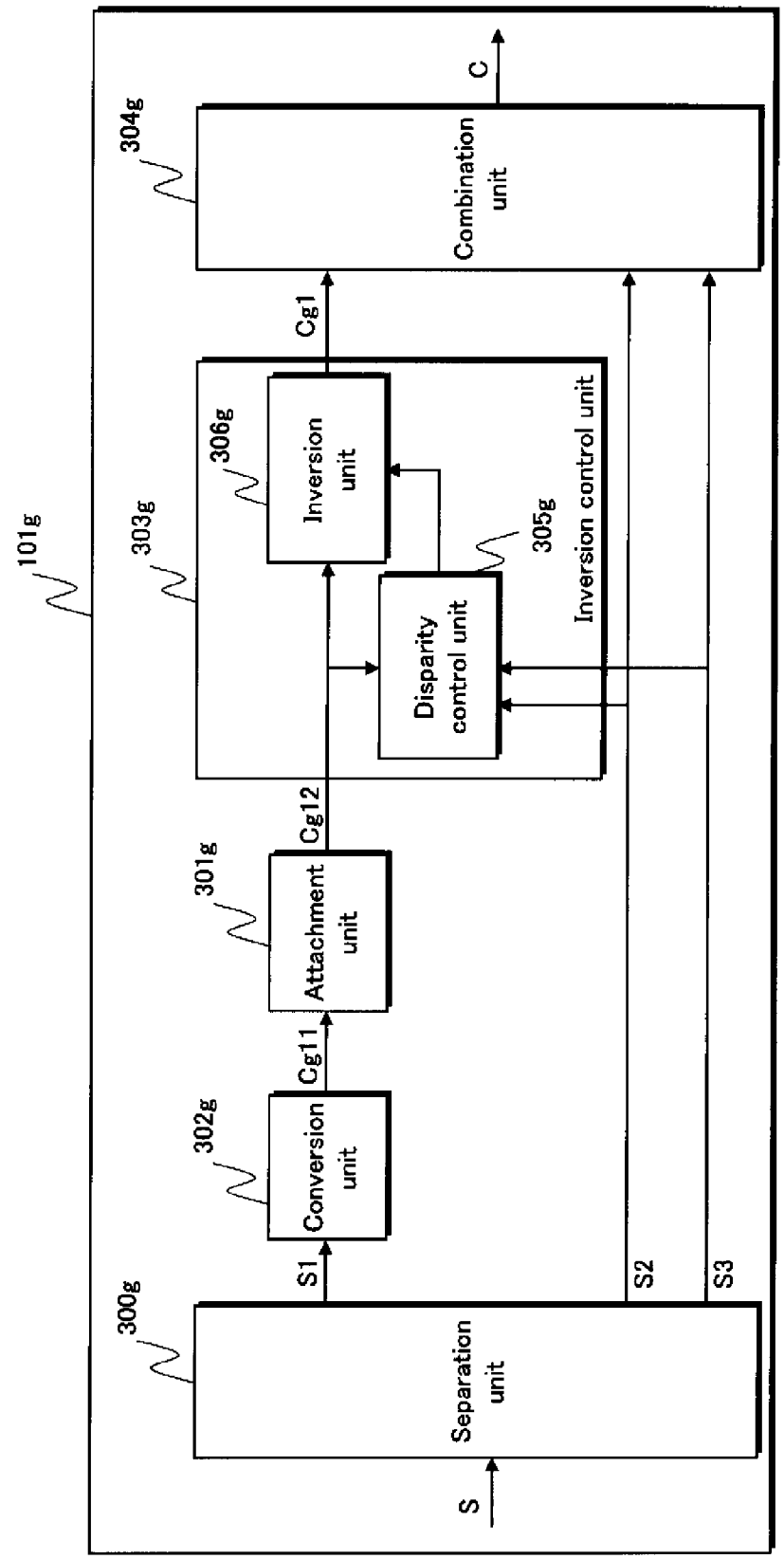
FIG. 25 is a block diagram showing the structure of an encoding unit 101g.

An encoding unit 101g in this case is shown in FIG. 25.

As shown in FIG. 25, the encoding unit 101f is composed of a separation unit 300g, attachment unit 301g, conversion unit 302g, inversion control unit 303g, and combination unit 304g. Also, the inversion control unit 303g is composed of a disparity control unit 305g and an inversion unit 306g.

(3-1) Separation Unit 300g

The separation unit 300g receives a 32 (=8×3+8) bit transmission data sequence S (=[S(0), S(1), ..., S(k), ..., S(31)]). The separation unit 300g separates the input transmission data sequence S into an eight-bit data sequence S1 consisting of the most significant eight bits (=[S(0), S(1), S(2), ..., S(7)]), a 12-bit data sequence S2 consisting of the ninth through $20^{th}$ bits (=[S(8), S(9), S(10), ..., S(19)]), and a 12-bit data sequence S3 consisting of the remaining bits (=[S(20), S(21), S(22), ..., S(31)]). The separation unit 300g then outputs the data sequence S1 to the conversion unit 302g, and the data sequences S2 and S3 to the disparity unit 305e and the combination unit 304e.

(3-2) Conversion Unit 302g

The conversion unit 302g encodes the data sequence S1 using the 8B/10B encoding scheme to generate a 10-bit data sequence Cg11 (=[Cg(0), Cg(1), ..., Cg(9)]), outputting the generated data sequence Cg11 to the attachment unit 301g.

(3-3) Attachment Unit 301g The attachment unit 301g attaches two control bits "0", "1" to the top of the data sequence Cg11, thus generating a 12-bit data sequence Cg12 (=[0, 1, Cg(0), Cg(1), ..., Cg(9)]). The attachment unit 301g then outputs the generated 12-bit data sequence Cg12 to the disparity control unit 305g and the inversion unit 306g.

(3-4) Inversion Control Unit 303g

As in Embodiment 1, in order to guarantee DC balance, the inversion control unit 303g performs either inversion or non-inversion on the input data sequence Cg12.

The following is an explanation of the disparity control unit 305g and the inversion unit 306g.

(Disparity Control Unit 305G)

The disparity control unit 305g alternately combines the data sequences Cg12, S2, and S3 to generate a 3 6-bit data sequence Co (=[0, S(8), S(20), 1, S(9), S(21), Cg(0), S(10), S(22), ..., Cg(9), S(19), S(31)].

The disparity control unit 305g divides the data sequence Co into symbols (three bits each), seeks the disparity corresponding to the value of each symbol thus divided, and calculates the total sum of the resulting disparities of the ten symbols as a candidate code word disparity. In this modification, mapping is performed so that a symbol value of "000" is assigned a disparity of −7, a symbol value of "001" is assigned a disparity of −5, a symbol value of "011" is assigned a disparity of −3, a symbol value of "010" is assigned a disparity of −1, a symbol value of "110" is assigned a disparity of +1, a symbol value of "111" is assigned a disparity of +3, a symbol value of "101" is assigned a disparity of +5, and a symbol value of "100" is assigned a disparity of +7.

Using the same determination method as in Embodiment 1, the disparity control unit 305g determines whether to invert or non-invert the data sequence Cg12. Furthermore, in accordance with the determination results, the disparity control unit generates inversion control information and a code word disparity. The generation methods for the inversion control information and code word disparity are the same as in Embodiment 1, and thus an explanation thereof is omitted.

The disparity control unit 305g outputs the generated inversion control information to the inversion unit 306g and updates the cumulative disparity by adding the generated code word disparity to the cumulative disparity stored in the disparity control unit 305g.

(Inversion Unit 306G)

In accordance with the value indicated by the inversion control information, the inversion unit 306g generates a data sequence Cg1 by either performing inversion or non-inversion on the data sequence Cg12.

(3-5) Combination Unit 304g

The combination unit 304g generates a 36-bit encoded data sequence C by alternately combining the data sequences Cg1, S2, and S3.

(3-6) Reception Device

The reception device only differs from Modification 2 in that one symbol is three bits; other processing follows similar procedures as in Modification 2. Namely, upon reconstructing the data sequences S1, S2, and S3, the reception device reconstructs the 32-bit data sequence S whose most significant eight bits are the data sequence S1, whose middle 12 bits are the data sequence S2, and whose least significant 12 bits are the data sequence S3.

(3-7) Summary

From the above description, it is clear that when performing 2^n level amplitude modulation, the following operations are performed.

The separation unit in the transmission device separates an 8×n+4 (n−1) bit data sequence into an eight-bit data sequence S1 and n−1 12-bit data sequences.

The attachment unit attaches two control bits to the first data sequence to generate a 10-bit attached data sequence.

The conversion unit applies 8B/10B encoding processing to the attached data sequence to generate a 12-bit encoded data sequence.

The disparity control unit alternately combines the encoded data sequence and the n−1 12-bit data sequences to generate an 8×n+4(n−1) bit data sequence Co. The disparity control unit calculates a candidate code word disparity for the generated data sequence Co. Furthermore, the disparity control unit determines whether to perform inversion using the same determination method as in Embodiment 1 and generates inversion control information and a code word disparity using the same generation methods for inversion control information and code word disparity as in Embodiment 1. The disparity control unit then updates cumulative disparity using the same updating method as in Embodiment 1.

In accordance with the value shown by the inversion control information, the inversion unit performs either inversion or non-inversion control on the encoded data sequence to generate a data sequence C1.

The combination unit generates an 8×n+4×n bit data sequence C by alternately combining the data sequence C1 and the n−1 12-bit data sequences.

(4) Summary

As described above, in the case of performing $2^n$ level amplitude modulation as well, disparity can be guaranteed by performing, on the data sequence consisting of bits that determine whether the disparity will be positive or negative when each symbol is $2^n$ level amplitude modulated, inversion control that takes disparity into consideration.

3.4 Other Modifications (1) In Embodiments 1 and 2 and each modification, explanation was provided using an example in which the conversion unit 302 performs 8B/10B encoding, but the present invention is not limited in this way. Many other encoding schemes to apply encoding limiting the run length to a predetermined value or less have been proposed for binary bit sequences. In accordance with the desired shortness of the run length, the desired encoding ratio, etc., an appropriate encoding scheme may be selected from among these proposals.

An example is 4B/5B encoding used in 100BASE-TX (100 megabit Ethernet).

(2) In Embodiments 1 and 2 and each modification, the attachment unit attaches two control bits to the top of the data sequences, but the present invention is not limited in this way. For example, the control bits may be attached to the end of the data sequence.

(3) In Embodiments 1 and 2 and each modification, when performing $2^n$ level amplitude modulation (n being an integer greater than or equal to two), the separation unit separates the input data sequence into n data sequences, but the present invention is not limited in this way. The separation unit may separate the input data sequence into between two and n−1 data sequences. It is necessary, however, for the combination unit to make the bit length of each data sequence the same.

(4) In Embodiments 1 and 2 and each modification, the value of the cumulative disparity was set to an initial value of 0 during processing to initialize communication, but the present invention is not limited in this way.

For each packet to be transmitted, the cumulative disparity may be reset.

(5) In Embodiment 2, the transmission device 100a performed control to invert/non-invert the data sequence Cb11 in accordance with the determination results from the determination unit 402b, but the present invention is not limited in this way.

In accordance with the determination results from the determination unit 402b, the transmission device 100a may output one of the 20-bit data sequences used in determination, i.e. data sequence Cb31 (=[Cb11(0), 0, Cb11(1), 1, . . . , S(15)]) or data sequence Cb32 (=[Cb11'(0), 1, Cb11'(1), 1, . . . , S(15)]).

In this case, the encoding unit 101 comprises a separation unit, first and second attachment units, conversion unit, and disparity control unit.

The only difference with Embodiment 2 is the information (data) that the disparity control unit outputs.

The separation unit in this modification is the same as the separation unit 300a in Embodiment 2; the first and second attachment units in this modification are the same as the attachment units 301a and 301b in Embodiment 2; and the conversion unit in this modification is the same as the conversion unit 302a in Embodiment 2.

The following is an explanation only of the disparity control unit.

As in Embodiment 2, the disparity control unit in the present modification generates 20-bit data sequences Cb31 (=[Cb11(0), 0, Cb11(1), 1, . . . , S(15)]) and Cb32 (=[Cb11'(0), 1, Cb11'(1), 1, . . . , S(15)]), calculates a non-inversion code word disparity from data sequence Cb31, and calculates an inversion code word disparity from data sequence Cb32. Using the same determination method as in Embodiment 2, the disparity control unit in the present modification outputs data sequence Cb31 to the four-level modulation unit when the absolute value of the sum of the cumulative disparity and the non-inversion code word disparity is smaller than the absolute value of the sum of the cumulative disparity and the inversion code word disparity, whereas the disparity control unit outputs data sequence Cb32 to the four-level modulation unit when the absolute value of the sum of the cumulative disparity and the non-inversion code word disparity is larger than the absolute value of the sum of the cumulative disparity and the inversion code word disparity.

(6) In Embodiments 1 and 2 and each modification, the data transmission and reception signal between the transmission device and the reception device is an optical signal, but the present invention is not limited in this way.

A signal in any form that can transmit and receive data between the transmission device and the reception device is possible, and communication is not limited to wire communication, but may also be wireless.

(7) Programs in which the procedures for the methods explained in Embodiments 1 and 2 and each modification are recorded may be stored in memory, and a Central Processing Unit (CPU) or the like may read the programs from memory and execute the read programs to implement the methods.

(8) Programs in which the procedures for the methods explained in Embodiments 1 and 2 and each modification are recorded may be stored on a recording medium and distributed.

(9) Each block provided in each device explained in Embodiments 1 and 2 and each modification is typically implemented as an LSI, which is an integrated circuit. These blocks may be integrated on individual chips, or part or all of the blocks may be integrated on one chip. While referred to as an LSI here, depending on the degree of integration, the terms IC, system LSI, super LSI, or ultra LSI are also used.

In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used. Furthermore, if technology for forming integrated circuits that replaces LSIs emerges, owing to advances in semiconductor technology or to another derivative technology, the integration of function blocks and components may naturally be accomplished using such technology. The application of biotechnology or the like is possible.

(10) The embodiments and modifications may be combined with one another.

(11) Note that bias in the output amplitude in the present invention at least includes the concept of whether the output amplitude is above or below the standard value (mean voltage level).

In particular, bias in the output amplitude in the second through the eighth transmission devices described above refers to both the above-described concept and to the amount of deviation from the standard value of the voltage.

4. Other (1) A transmission device that is an embodiment of the present invention comprises a separation unit operable to separate a piece of data for transmission into n data sequences; a conversion unit operable to convert a data sequence by applying encoding processing to the data sequence so that a same value is continuous a predetermined number of times or less; an attachment unit operable to generate a first attached data sequence by attaching, to one data sequence among n−1 unprocessed data sequences, a first control data sequence indicating inversion of the converted data sequence, and to generate a second attached data sequence by attaching, to the one data sequence, a second control data sequence indicating non-inversion of the converted data sequence; a control unit operable (i) to generate a first candidate data, which includes the first attached data sequence, n−2 unprocessed data sequences, and the converted data sequence, and a second candidate data, which includes the second attached data sequence, the n−2 unprocessed data sequences, and an inverted data sequence which is an inversion of the converted data sequence, and (ii) to specify candidate data in accordance with which of a first new cumulative value and a second new cumulative value approaches a standard value, the first new cumulative value being calculated from a total sum of disparities of the first candidate data and from a cumulative value of disparities in output amplitude for one or more transmitted pieces of data up until a present time, and the second new cumulative value being calculated from a total sum of disparities of the second candidate data and from the cumulative value; and a modulation unit operable to perform $2^n$ level amplitude modulation on the specified candidate data.

With the above-described structure, the transmission device converts one of n data sequences into a converted data sequence by applying encoding processing so that a same value is continuous a predetermined number of times or less. Also, the transmission device uses a first and second updated cumulative value to specify candidate data that does not produce a bias in output amplitude. Accordingly, the transmission device can guarantee both run length and DC balance for $2^n$ level amplitude modulation.

(2) As an embodiment of the present invention, a program for transmitting data to which $2^n$ level amplitude modulation has been applied (n being an integer greater than or equal to two) comprises the steps of: separating a piece of data for transmission into n data sequences; converting a data sequence from among the n data sequences by applying encoding processing to the data sequence so that a same value is continuous a predetermined number of times or less; determining whether a new cumulative value approaches a standard value, the new cumulative value being calculated from (a) a cumulative value of disparities in output amplitude for one or more transmitted pieces of data up until a present time and (b) a total sum of disparities of a plurality of n-bit symbols of candidate data that includes the converted data sequence and remaining n−1 data sequences, and obtaining an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and performing $2^n$ level amplitude modulation on n-bit symbols, each of which has a bit in the intermediate data sequence as the most significant bit and corresponding bits in the converted data sequence and the remaining n−1 data sequences, excluding the specific data sequence, as subsequent bits.

In this way, the program causes the computer to convert one of n data sequences into a converted data sequence by applying encoding processing so that a same value is continuous a predetermined number of times or less and to invert or non-invert a specific data sequence according to a determination as to whether or not an updated cumulative value approaches a standard value. Since an n-bit symbol to be amplitude modulated includes a bit in the specific data sequence as a most significant bit and always includes a bit in the converted data sequence, the run length of each symbol to be amplitude modulated is guaranteed. Also, by either inverting or non-inverting the specific data sequence in accordance with the determination as to whether the updated cumulative value approaches the standard value, the output amplitude approaches the standard value, which means that the output amplitude is not biased towards a particular value. In other words, the DC balance is also guaranteed for each symbol to be amplitude modulated. Accordingly, the program can guarantee both run length and DC balance for $2^n$ level amplitude modulation.

(3) An encoding device that is an embodiment of the present invention comprises a separation unit operable to separate a piece of data for transmission into n data sequences; a conversion unit operable to convert a data sequence from among the n data sequences by applying encoding processing to the data sequence so that a same value is continuous a predetermined number of times or less; an inversion control unit operable (i) to determine whether a new cumulative value approaches a standard value, the new cumulative value being calculated from (a) a cumulative value of disparities in output amplitude for one or more transmitted pieces of data up until a present time and (b) a total sum of disparities of a plurality of n-bit symbols of candidate data that includes the converted data sequence and remaining n−1 data sequences, and (ii) to obtain an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and a generation unit operable to generate data for modulation by connecting, in order of a position of structural bits in the intermediate data sequence, n-bit symbols that each include a structural bit from the intermediate data sequence and a bit, with a same position as the structural bit, from the attached data sequence in accordance with the determination results.

With the above-described structure, the encoding device converts one of n data sequences into a converted data sequence by applying encoding processing so that a same value is continuous a predetermined number of times or less. The encoding device then inverts or non-inverts a specific data sequence according to a determination as to whether or not an updated cumulative value approaches a standard value. Since an n-bit symbol to be amplitude modulated includes a bit in the specific data sequence as a most significant bit and always includes a bit in the converted data sequence, the run length of each symbol to be amplitude modulated is guaranteed. Also, by either inverting or non-inverting the specific data sequence in accordance with the determination as to whether the updated cumulative value approaches the standard value, the output amplitude approaches the standard value, which means that the output amplitude is not biased towards a particular value. In other words, the DC balance is also guaranteed for each symbol to be amplitude modulated. Accordingly, the encoding device can guarantee both run length and DC balance for $2^n$ level amplitude modulation.

(4) An encoding method that is an embodiment of the present invention comprises the steps of separating a piece of data for transmission into n data sequences; converting a data sequence from among the n data sequences by applying encoding processing to the data sequence so that a same value is continuous a predetermined number of times or less; determining whether a new cumulative value approaches a standard value, the new cumulative value being calculated from (a) a cumulative value of disparities in output amplitude for one or more transmitted pieces of data up until a present time and (b) a total sum of disparities of a plurality of n-bit symbols of candidate data that includes the converted data sequence and remaining n−1 data sequences, and obtaining an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and generating data for modulation by connecting, in order of a position of structural bits in the intermediate data sequence, n-bit symbols that each include a structural bit from the intermediate data sequence and a bit, with a same position as the structural bit, from the attached data sequence in accordance with the determination results.

With the above-described structure, the encoding method converts one of n data sequences into a converted data sequence by applying encoding processing so that a same value is continuous a predetermined number of times or less. The encoding method then inverts or non-inverts a specific data sequence according to a determination as to whether or not an updated cumulative value approaches a standard value. Since an n-bit symbol to be amplitude modulated includes a bit in the specific data sequence as a most significant bit and always includes abit in the converted data sequence, the run length of each symbol to be amplitude modulated is guaranteed. Also, by either inverting or non-inverting the specific data sequence in accordance with the determination as to whether the updated cumulative value approaches the standard value, the output amplitude approaches the standard value, which means that the output amplitude is not biased towards a particular value. In other words, the DC balance is also guaranteed for each symbol to be amplitude modulated. Accordingly, the encoding method can guarantee both run length and DC balance for $2^n$ level amplitude modulation.

5. Industrial Applicability

The present invention can be used in a transmission device and transmission method that use a multilevel modulation system to transmit and receive data and control information via a wire or wireless channel. The present invention can also be used in an encoding device and encoding method used in such a transmission device or transmission method.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A transmission device to transmit data in which $2^n$ level amplitude modulation has been applied, wherein n is an integer greater than or equal to two, the transmission device comprising:
 a separation unit configured to separate a piece of data for transmission into n data sequences;
 a conversion unit configured to convert a data sequence from among the n data sequences by applying encoding processing to the data sequence so that a same value is continuous no more than a predetermined number of times;
 an inversion control unit configured (i) to determine whether a new cumulative value approaches a standard value, the new cumulative value being calculated from (a) a cumulative value of amplitude disparities for one or more pieces of data transmitted up until a present time and (b) a total sum of disparities of a plurality of n-bit symbols of candidate data that includes the converted data sequence and related remaining n−1 data sequences of the n data sequences, and (ii) to obtain an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and
 a modulation unit configured to perform $2^n$ level amplitude modulation on n-bit symbols, each of the n-bit symbols having a bit in the intermediate data sequence as a most significant bit and corresponding bits in the converted data sequence and the remaining n−1 data sequences, excluding the specific data sequence, as subsequent bits.

2. The transmission device in claim 1, further comprising:
 an attachment unit configured to generate a first attached data sequence by attaching, to one data sequence among remaining n−1 data sequences of the n data sequences, a first control data sequence, and to generate a second attached data sequence by attaching, to the one data sequence, a second control data sequence, wherein
 the specific data sequence is the converted data sequence, the inversion control unit is configured to:
  generate the candidate data so as to include the first attached data sequence, remaining n−2 data sequences of the n data sequences, and the converted data sequence, and generates a separate candidate data, which includes the second attached data sequence, the remaining n−2 data sequences, and an inverted data sequence which is an inversion of the converted data sequence,
  calculate a first new cumulative value from the cumulative value and a total sum of disparities of the candidate data, and calculate a second new cumulative value from the cumulative value and a total sum of disparities of the separate candidate data, and compare the first new cumulative value and the second new cumulative value to determine if the first new cumulative value approaches the standard value, and to obtain the intermediate data sequence by inverting the converted data sequence when the comparison is negative and not inverting the converted data sequence when the comparison is positive, and the modulation unit is configured to perform $2^n$ level amplitude modulation on n-bit symbols, each of which includes a bit in the intermediate data sequence and corresponding bits in one of the first and second attached data sequences, in accordance with inversion or non-inversion of the converted data sequence, and in the remaining n−2 data sequences.

3. The transmission device in claim 2, wherein the value of n is two, the separation unit is configured to separate the piece of data for transmission into a first data sequence and a second data sequence, the conversion unit is configured to apply the encoding processing to the first data sequence to generate the converted data sequence, the attachment unit is configured to use the second data sequence to generate the first attached data sequence and the second attached data sequence, the inversion control unit is configured to generate the candidate data so as to include the converted data sequence and the first attached data sequence, and to generate the separate candidate data so as to include the inverted data sequence and the second attached data sequence, and the modulation unit is configured to perform $2^2$ level amplitude modulation on one or more two-bit symbols, each of the one or more two-bit symbols having one bit from the intermediate data sequence and another bit, with a same position as the one bit, from the first attached data sequence when the first new cumulative value is determined to approach the standard value and from the second attached data sequence when the first new cumulative value is determined not to approach the standard value.

4. The transmission device in claim 3, wherein the conversion unit is configured to apply the encoding processing using 8B/10B encoding, the piece of data for transmission is 16 bits, the first and second data sequences are each eight bits, and the first and second control data sequences are each two bits.

5. The transmission device in claim 4, wherein the inversion control unit is further configured to:

generate the candidate data so as to comprise 10 two-bit symbols, each having a converted bit from the converted data sequence and a bit in the first attached data sequence that has a same position as the converted bit, and to generate the separate candidate data to comprise 10 two-bit symbols, each of the 10 two-bit symbols having an inverted bit from the inverted data sequence and a bit in the second attached data sequence that has a same position as the converted bit, calculate a first total disparity indicating a total of disparities of the 10 two-bit symbols in the candidate data and a second total disparity indicating a total of disparities for each of the 10 two-bit symbols in the separate candidate data, calculate the first new cumulative total from the cumulative value and the first total disparity and the second new cumulative total from the cumulative value and the second total disparity, and determine that the first new cumulative value approaches the standard value when an absolute value of the first new cumulative value is smaller than an absolute value of the second new cumulative value, otherwise determining that the first new cumulative value does not approach the standard value.

6. The transmission device in claim 5, further comprising:

a generation unit configured to generate data for modulation by connecting, in order of a position of structural bits in the intermediate data sequence, 10 two-bit symbols that each include a structural bit from the intermediate data sequence and a bit, with a same position as the structural bit, from the first attached data sequence when the first new cumulative value is determined to approach the standard value and from the second attached data sequence when the first new cumulative value is determined not to approach the standard value, wherein the modulation unit is configured to obtain the two-bit symbols by dividing the data for modulation generated by the generation unit every two bits in order from a top, and perform $2^2$ level amplitude modulation on the obtained symbols in order.

7. The transmission device in claim 6, wherein two-bit symbols in the candidate data have, as a most significant bit, a bit included in the converted data sequence, and as a least significant bit, a bit included in the first attached data sequence, two-bit symbols in the separate candidate data have, as a most significant bit, a bit included in the converted data sequence that has been inverted, and as a least significant bit, a bit included in the second attached data sequence, two-bit symbols in the data for modulation have, as a most significant bit, the structural bit from the intermediate data sequence, and as a least significant bit, a bit included in an attached data sequence in accordance with inversion or non-inversion in the inversion control unit, and the modulation unit is configured to perform control so that an amplitude exceeds the standard value by an amount corresponding to a value of the least significant bit of the two-bit symbols in the data for modulation when the most significant bit of the two-bit symbols in the data for modulation is 1, and an amplitude falls below the standard value by an amount corresponding to the value of the least significant bit of the two-bit symbols in the data for modulation when the most significant bit of the two-bit symbols in the data for modulation is 0.

8. The transmission device in claim 6, wherein the inversion control unit is configured to:

store the cumulative value, update the cumulative value by adding the first total disparity to the cumulative value when the converted data sequence is not inverted, and update the cumulative value by adding the second total disparity to the cumulative value when the converted data sequence is inverted.

9. The transmission device in claim 1, further comprising an attachment unit configured to generate an attached data sequence by attaching, to one data sequence among remaining n−1 data sequences of the n data sequences, a control data sequence, wherein the specific data sequence is the attached data sequence, the inversion control unit is configured to not invert the attached data sequence when the new cumulative value, calculated from the cumulative value and a total sum of disparities of the candidate data that includes the converted data sequence, the attached data sequence and remaining n−2 data sequences of the n data sequences, is determined to approach the standard value, otherwise inverting the attached data sequence, thereby obtaining the intermediate data sequence, and the modulation unit is configured to perform $2^n$ level amplitude modulation on n-bit symbols, each of which includes a bit in the intermediate data sequence and corresponding bits in the converted data sequence and in the remaining n−2 data sequences.

10. The transmission device in claim 9, wherein
the value of n is two,
the separation unit is configured to separate the piece of data for transmission into a first data sequence and a second data sequence,
the conversion unit is configured to apply the encoding processing to the first data sequence to generate the converted data sequence,
the attachment unit is configured to attach the control data sequence to the second data sequence to generate the attached data sequence, and
the modulation unit is configured to perform $2^2$ level amplitude modulation on one or more two-bit symbols each having one bit from the intermediate data sequence and another bit, with a same position as the one bit, from the converted data sequence.

11. The transmission device in claim 10, wherein
the conversion unit is configured to apply the encoding processing using 8B/10B encoding,
the piece of data for transmission is 16 bits,
the first and second data sequences are each eight bits, and
the control data sequence is two bits.

12. The transmission device in claim 11, wherein the inversion control unit is configured to:
generate the candidate data to comprise 10 two-bit symbols, each having a converted bit from the converted data sequence and a bit in the attached data sequence that has a same position as the converted bit,
calculate a total disparity indicating a total of disparities for each of the 10 two-bit symbols in the candidate data,
calculate a candidate cumulative value indicating a result of multiplying the cumulative value by the total disparity, and
determine that the new cumulative value does not approach the standard value when the candidate cumulative value is larger than zero, otherwise determining that the new cumulative value approaches the standard value.

13. The transmission device in claim 12, further comprising:
a generation unit configured to generate data for modulation by connecting, in order of a position of structural bits in the intermediate data sequence, 10 two-bit symbols that each include a structural bit from the intermediate data sequence and a bit, with a same position as the structural bit, from the converted data sequence, wherein
the modulation unit is configure to obtain the two-bit symbols by dividing the data for modulation generated by the generation unit every two bits in ascending order from a top and performs $2^2$ level amplitude modulation on the obtained symbols in order.

14. The transmission device in claim 13, wherein the inversion control unit is configured to:
store the cumulative value,
update the cumulative value by subtracting the total disparity from the cumulative value when the attached data sequence is inverted, and
update the cumulative value by adding the total disparity to the cumulative value when the attached data sequence is not inverted.

15. The transmission device in claim 1, further comprising:
an attachment unit configured to generate an attached data sequence by attaching, to the converted data sequence, a control data sequence, wherein
the specific data sequence is the attached data sequence,
the inversion control unit is configured to not invert the attached data sequence when the new cumulative value, calculated from the cumulative value and a total sum of disparities of the candidate data that includes the attached data sequence and remaining n−1 data sequences of the n data sequences, is determined to approach the standard value, otherwise inverting the attached data sequence, thereby obtaining the intermediate data sequence, and
the modulation unit is configured to perform $2^n$ level amplitude modulation on n-bit symbols, each of the n-bit symbols including a bit in the intermediate data sequence and corresponding bits in the remaining n−1 data sequences.

16. The transmission device in claim 15, wherein
the value of n is two,
the separation unit is configured to separate the piece of data for transmission into a first data sequence and a second data sequence,
the conversion unit is configured to apply the encoding processing to the first data sequence to generate the converted data sequence, and
the modulation unit is configured to perform $2^2$ level amplitude modulation on one or more two-bit symbols each having one bit from the intermediate data sequence and another bit, with a same position as the one bit, from the second data sequence.

17. The transmission device in claim 16, wherein
the conversion unit is configured to apply encoding processing using 8B/10B encoding,
the piece of data for transmission is 20 bits,
the first data sequence is eight bits,
the second data sequence is 12 bits, and
the control data sequence is two bits.

18. The transmission device in claim 17, wherein the inversion control unit is configured to:
generate the candidate data to comprise 12 two-bit symbols, each having a bit from the attached data sequence and a bit in the second data sequence corresponding to a position of the bit in the attached data sequence,
calculate a total disparity indicating a total of disparities for each of the 12 two-bit symbols in the candidate data,
calculate a candidate cumulative value indicating a result of multiplying the cumulative value by the total disparity, and
determine that the new cumulative value does not approach the standard value when the candidate cumulative value is larger than zero, otherwise determining that the new cumulative value approaches the standard value.

19. The transmission device in claim 18, further comprising:
a generation unit configured to generate data for modulation by connecting, in order of a position of structural bits in the intermediate data sequence, 12 two-bit symbols that each include a structural bit from the intermediate data sequence and a bit, with a same position as the structural bit, from the second data sequence, wherein the modulation unit is configured to obtain the two-bit symbols by dividing the data for modulation generated by the generation unit every two bits in ascending order from a top and performs 2^2 level amplitude modulation on the obtained symbols in order.

20. A transmission method used in a transmission device to transmit data in which 2^n level amplitude modulation has been applied, wherein n is an integer greater than or equal to two, the transmission method comprising the steps of:

separating a piece of data for transmission into n data sequences;

converting a data sequence from among the n data sequences by applying encoding processing to the data sequence so that a same value is continuous no more than a predetermined number of times;

determining whether a new cumulative value approaches a standard value, the new cumulative value being calculated from (a) a cumulative value of amplitude disparities for one or more pieces of data transmitted up until a present time and (b) a total sum of disparities of a plurality of n-bit symbols of candidate data that includes the converted data sequence and related remaining n−1 data sequences of the n data sequences, and obtaining an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and performing 2^n level amplitude modulation on n-bit symbols, each of the n-bit symbols having a bit in the intermediate data sequence as a most significant bit and corresponding bits in the converted data sequence and the remaining n−1 data sequences, excluding the specific data sequence, as subsequent bits.

21. An integrated circuit used in a transmission device to transmit data in which 2^n level amplitude modulation has been applied, wherein n is an integer greater than or equal to two, the integrated circuit comprising:

a separation unit configured to separate a piece of data for transmission into n data sequences;

a conversion unit configured to convert a data sequence from among the n data sequences by applying encoding processing to the data sequence so that a same value is continuous no more than a predetermined number of times;

an inversion control unit configured (i) to determine whether a new cumulative value approaches a standard value, the new cumulative value being calculated from (a) a cumulative value of amplitude disparities for one or more pieces of data transmitted up until a present time and (b) a total sum of disparities of a plurality of n-bit symbols of candidate data that includes the converted data sequence and related remaining n−1 data sequences of the n data sequences, and (ii) to obtain an intermediate data sequence from a specific data sequence by inverting the specific data sequence when the determination is negative and not inverting the specific data sequence when the determination is positive, the specific data sequence being a data sequence from among the converted data sequence and the remaining n−1 data sequences and comprising a most significant bit of each symbol; and a modulation unit configured to perform 2^n level amplitude modulation on n-bit symbols, each of the n-bit symbols having a bit in the intermediate data sequence as a most significant bit and corresponding bits in the converted data sequence and the remaining n−1 data sequences, excluding the specific data sequence, as subsequent bits.

* * * * *